United States Patent
Gurel et al.

(10) Patent No.: US 12,417,377 B2
(45) Date of Patent: Sep. 16, 2025

(54) USING DECAY PARAMETERS FOR INFERENCING WITH NEURAL NETWORKS

(71) Applicant: Nvidia Corporation, Santa Clara, CA (US)

(72) Inventors: Tayfun Gurel, Vantaa (FI); Pekka Janis, Uusimaa (FI); Jarmo Lunden, Uusimaa (FI); Joonas Haapala, Espoo (FI)

(73) Assignee: NVIDIA CORPORATION, Santa Clara, CA (US)

( * ) Notice: Subject to any disclaimer, the term of this patent is extended or adjusted under 35 U.S.C. 154(b) by 0 days.

(21) Appl. No.: 16/412,122

(22) Filed: May 14, 2019

(65) Prior Publication Data

US 2020/0364508 A1 Nov. 19, 2020

(51) Int. Cl.
| | |
|---|---|
| G06V 20/00 | (2022.01) |
| G05D 1/00 | (2006.01) |
| G06F 18/21 | (2023.01) |
| G06F 18/214 | (2023.01) |
| G06N 3/044 | (2023.01) |
| G06N 3/045 | (2023.01) |
| G06N 3/063 | (2023.01) |
| G06V 20/40 | (2022.01) |
| G06V 20/58 | (2022.01) |

(52) U.S. Cl.
CPC ........... *G06N 3/063* (2013.01); *G05D 1/0221* (2013.01); *G05D 1/0246* (2013.01); *G06F 18/214* (2023.01); *G06F 18/217* (2023.01); *G06N 3/044* (2023.01); *G06N 3/045* (2023.01); *G06V 20/41* (2022.01); *G06V 20/58* (2022.01)

(58) Field of Classification Search
CPC ............ G06K 9/6262; G06K 9/00718; G06K 9/00805; G06K 9/6256; G05D 1/0221; G05D 1/0246; G05D 2201/0213; G06N 3/0445; G06N 3/0454
See application file for complete search history.

(56) References Cited

U.S. PATENT DOCUMENTS

| | | | |
|---|---|---|---|
| 2017/0364733 A1* | 12/2017 | Estrada | ................ G06N 3/0454 |
| 2018/0005676 A1 | 1/2018 | Neil | |
| 2018/0268285 A1 | 9/2018 | Dasgupta | |
| 2018/0322391 A1 | 11/2018 | Wu et al. | |
| 2019/0228495 A1* | 7/2019 | Tremblay | .............. G06T 1/0014 |
| 2019/0382007 A1* | 12/2019 | Casas | ................. G06K 9/00335 |

(Continued)

FOREIGN PATENT DOCUMENTS

| | | |
|---|---|---|
| CN | 108734649 A | 11/2018 |
| WO | 2016/156236 | 10/2016 |
| WO | 2019040091 A1 | 2/2019 |

OTHER PUBLICATIONS

Extended European Search Report issued EP Application No. 20165566.9, dated Oct. 14, 2020.

(Continued)

*Primary Examiner* — Ping Y Hsieh
(74) *Attorney, Agent, or Firm* — Davis Wright Tremaine LLP

(57) ABSTRACT

Apparatuses, systems, and techniques to identify objects with in an image. In at least one embodiment, objects are identified in an image using one or more neural networks, in which the one or more neural networks are trained using one or more decay parameters.

35 Claims, 40 Drawing Sheets

(56) References Cited

U.S. PATENT DOCUMENTS

| | | | | |
|---|---|---|---|---|
| 2019/0392333 | A1* | 12/2019 | Vega | G06N 7/005 |
| 2020/0184037 | A1* | 6/2020 | Zatloukal | G06F 21/105 |
| 2020/0202548 | A1* | 6/2020 | Wang | G06V 10/82 |
| 2020/0226418 | A1* | 7/2020 | Dorai-Raj | G06F 11/3447 |
| 2020/0242446 | A1* | 7/2020 | Katsuki | G06N 5/046 |

OTHER PUBLICATIONS

Zhengping Che et al: "Recurrent Neural Networks for Multivariate Time Series with 15 Missing Values", Scientific Reports, vol. 8, No. 1, Apr. 17, 2018 (Apr. 17, 2018), XP055666934, DOI: 10.1038/s41598-018-24271-9 *Section GRU-D model with trainable decays; figure 3b.

IEEE, "IEEE Standard 754-2008 (Revision of IEEE Standard 754-1985): IEEE Standard for Floating-Point Arithmetic," Aug. 29, 2008, 70 pages.

Kornjcuk et al., Leaky Integrate-and-Fire Neuron Circuit Based on Floating-Gate Integrator, Frontiers in Neuroscience, vol. 10, May 23, 2016, 16 Pages.

Neil et al., "Phased LSTM: Accelerating Recurrent Network Training for Long or Event-based Sequences", Oct. 29, 2016, 10 Pages.

Office Action for Chinese Application No. 202010400986.7, mailed Jan. 18, 2024, 5 pages.

Office Action for Chinese Application No. 202010400986.7, mailed May 15, 2023, 39 pages.

Society of Automotive Engineers On-Road Automated Vehicle Standards Committee, "Taxonomy and Definitions for Terms Related to Driving Automation Systems for On-Road Motor Vehicles," Standard No. J3016-201609, Sep. 30, 2016, 30 pages.

Society of Automotive Engineers On-Road Automated Vehicle Standards Committee, "Taxonomy and Definitions for Terms Related to Driving Automation Systems for On-Road Motor Vehicles," Standard No. J3016-201806, issued Jan. 2014, revised Jun. 2018, 35 pages.

Office Action for Chinese Application No. 202010400986.7, mailed Jun. 24, 2024, 9 pages.

Office Action for Chinese Application No. 202010400986.7, mailed Sep. 14, 2024, 9 pages.

* cited by examiner

USING DECAY PARAMETERS FOR INFERENCING WITH NEURAL NETWORKS

BACKGROUND

Machine learning is being utilized across an ever-increasing variety of industries and applications, and is being used to process an increasing variety of input data. In some cases, this input may correspond to a stream of data, such as a live video feed from at least one camera. In such a situation, it may be desirable to use a sequential machine learning model in order to exploit the similarity of adjacent frames in the video feed. In order to train such a sequential model using conventional approaches, however, the input training data must be labeled, which can be very expensive and time consuming. To reduce costs only a portion of the video frames may be labeled, but this sparse data can result in difficulty training the relevant model.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the training of machine learning, such as may involve one or more recurrent neural networks (RNNs), for tasks such as performing recursive object detection and/or frame segmentation for long data sequences (e.g., continuous video streams). These approaches can be particularly useful when training using sparsely labeled training data. State information can be held over between frames of the long data sequence in order to improve accuracy. In some embodiments, state information is reset during training using short blocks before every block. The state information can be stored, and never reset, for leakage hyper-optimization and during inference. In order to prevent older state data from unduly influencing the training for a current frame, leakage can be applied to the state data at inference time. This leakage can take the form of a decay, such as an exponential decay, that can be applied to the state data so that the weighting or impact of prior state data decreases over time, causing more recent state information to be weighted more heavily in network inferences.

Various other functions can be implemented within the various embodiments as well as discussed and suggested elsewhere herein.

Figure 1A:
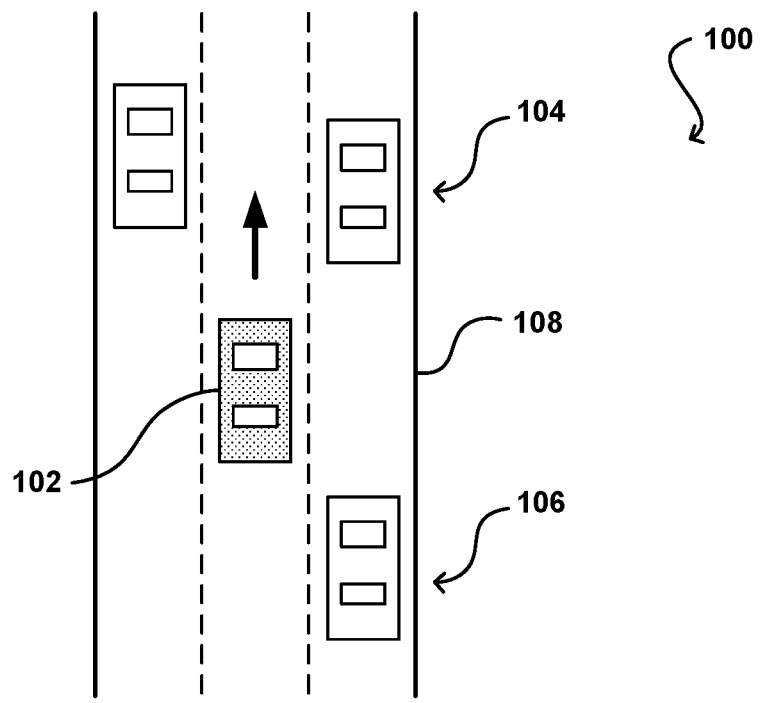
FIGS. 1A and 1B illustrate an example set of data inputs to be processed for path planning of a vehicle, according to at least one embodiment.

There are various situations where supervised machine learning can be used to infer information about an environment or predict useful signals from a stream of data input, among other such options. One such situation or use case relates to autonomous (or semi-autonomous) driving, where static and dynamic objects need to be determined from the input in real time, and the coordinates of those objects need to be precisely estimated, in order to determine the appropriate drivable path(s) for the vehicle. For example, in the overhead view 100 of FIG. 1A a vehicle is illustrated to be traveling along a three-lane roadway 108. There are a number of other cars 104, 106 along the roadway. At a minimum, the autonomous navigation system needs to be able to determine a navigation path of the vehicle such that the autonomous vehicle 102 can travel along the road without colliding with any of the other vehicles, as well as any other objects such as pedestrians or bicycles, etc.

Figure 1B:
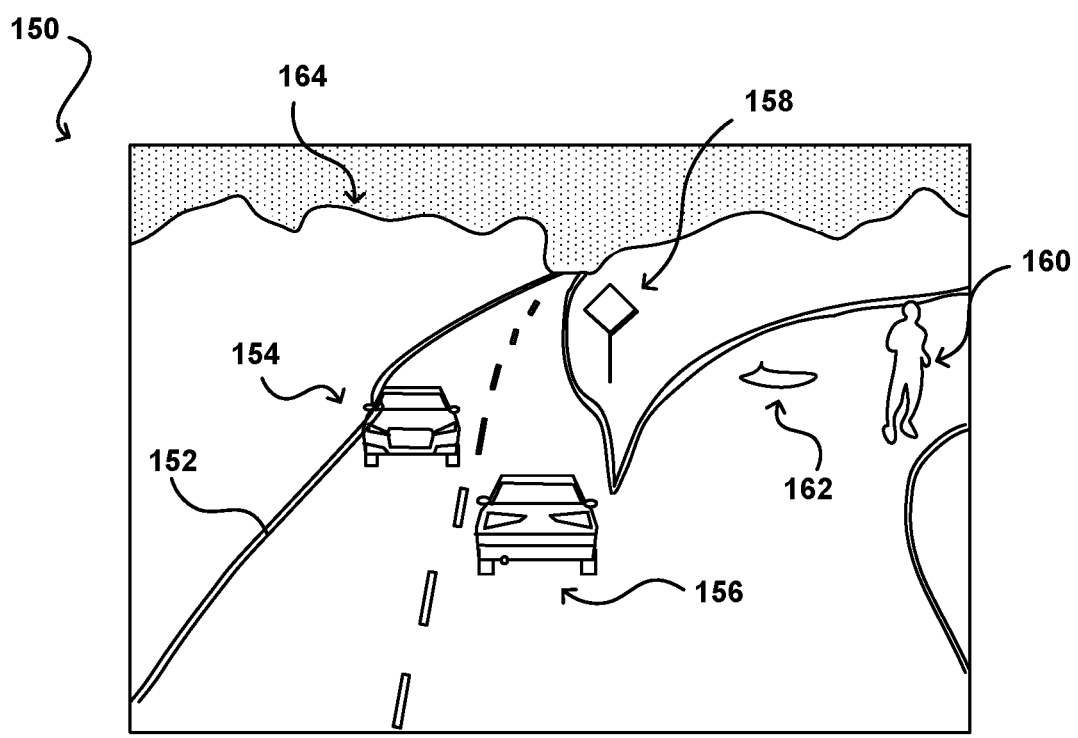

In order to infer such a navigation path, the vehicle will often capture a stream of video data from at least one camera (or other sensor) on the vehicle. The stream of video data can include a series of frames or image portions that include a representation of a portion of the environment in which the vehicle is navigating. FIG. 1B illustrates one such image or video frame 150 that might be captured from a camera on the front of such a vehicle. As illustrated, there are many different types of objects within the video frame, and it can be necessary in at least some systems to identify various types of objects and determine their relative location to, or distance from, the vehicle. These objects can include, for example, other vehicles 154, 156 and pedestrians 160 in or near the roadway, as well as potential dangers or obstacles such as potholes 162 and the like. In some embodiments the vehicles and pedestrians need to be classified in order to determine that these obstacles can, and are likely to, move over time, and at different rates, such that a path can be determined to avoid these objects even with their potential future movement. Other objects such as road signs 158 can be identified as stationary objects that are to be avoided, and background objects such as far away mountains 164 can be identified as being part of the background that may not be relevant for navigation purposes at the current time. The image will also have to be analyzed to determine the location of the road 152, as well as the lanes of the road and the direction of traffic flow on those lanes, in order to determine properly navigable paths.

Various computer vision-based approaches can be used to identify the various objects in an image frame. At least some of these approaches can utilize machine learning to infer the various types of objects represented in the image, as well as their relative position or coordinates (at least with respect to the vehicle or object of reference). As mentioned, however, for a task such as real time navigation the determination must be done in real time, which may require the determination to be performed using a video stream that captures at 30 or 60 frames per second, for example.

In order to perform such inferencing in real time, many object and path detectors in autonomous driving are based on feed-forward Deep Neural Networks (DNN). These detectors operate frame by frame, performing an inference for each frame independently without using any information from other recently-processed frames. A sequential model, on the other hand, has the potential to exploit similarities between consecutive frames of a sequence. A sequential model can take the form of, for example, a DNN-based feature extractor that is enhanced by a recurrent neural network (RNN)-based temporal processor. The sequential model can accumulate the evidence for its predictions temporally by maintaining state information between time steps, where the state information can comprise an internal representation for the dynamics of the relevant features in the video input.

As mentioned, a significant amount of cost and effort needed to train a sequential model for such purposes relates to labeling of the input training data, such as one or more video streams or files. In some conventional approaches, only a subset of the video frames is labeled in order to reduce the associated costs, which can result in training using sparsely labeled data. For example, a human labeler might label the bounding boxes for various types of objects once a second for different classes of objects present in a data stream, but the other frames captured during that second will remain unlabeled sequential data. Sparsely labeled data, as referred to herein, is a form of sequential data where only a small portion of the data points in a given sequence have labels for supervised training. For a 30 frames per second (fps) video file, this might be one frame per second or $\frac{1}{30}^{th}$ of the data, among other such options, values, or approaches. In such an approach, only about one frame in a second of video recording is passed to the labelers, who generate ground truths to use for training deep learning algorithms. This low labeling frequency contributes to diversity of the input frames for a non-sequential (frame-by-frame) model. The low labeling frequency also, however, poses important challenges when training sequence models, such as RNNs. Training a recurrent neural network (RNN) from scratch in a stateful manner is not practical when using sparsely labeled data. Using a conventional approach, one would need to process a determined number of frames per a single sample of cost function, where the determined number can correspond to the ratio of all frames to labeled frames. The memory requirement for such an approach would be very high due to the long sequence length and amount of data available. Further, the cost function for the network will also be sampled very sparsely.

One approach to reducing the cost and complexity would be to train using smaller blocks of several consecutive frames, which can provide a reasonable undersampling in order to achieve faster training. Such an approach, however, can break the continuity of processing the frames in a sequence. The initial state of the RNN within the block does not reflect the progress, or change in state of objects, in a continuous video. When a such trained RNN is applied for inference and presented with a continuous stream of frames in a real world application, its recursive state update diverges from training conditions and object detection accuracy degrades dramatically.

Accordingly, approaches in accordance with various embodiments can provide for the training of neural networks for tasks such as recursive object detection and/or frame segmentation for long data sequences, such as continuous video streams. These approaches can be particularly useful when training using sparsely labeled training data. State information can be held over between frames of the long data sequence in order to improve accuracy. In order to prevent older state data from unduly influencing the inference for a current frame, however, a leakage can be applied to the state data. This leakage can take the form of a decay, such as an exponential decay, that can be applied to the state data so that the weighting or impact of prior state data decreases over time, causing more recent state information to be weighted more heavily in network decisions.

Approaches in accordance with various embodiments utilize a number of different training and/or optimization phases. In one embodiment, a first phase in involves the training of a network (such as an RNN) using small, isolated sequences of frames, wherein at least one frame is labeled in each sequence. Thus, the training sequences can be generated around those frames where the data has been labeled in at least some embodiments. Information about the network state can be kept within a given sequence, reflecting progress within that sequence. Information about the network state is not maintained or transferred between sequences in this embodiment. Thus, each sequence functions as a separate and independent training example. In this phase, the extent of the gradients through frames, or the Backpropagation-Through-Time (BPTT) steps, covers the whole sequence example. In other words, the number of BPTT steps in this example equals the respective sequence length. The cost function can then be determined using the labeled frame.

Figure 2:
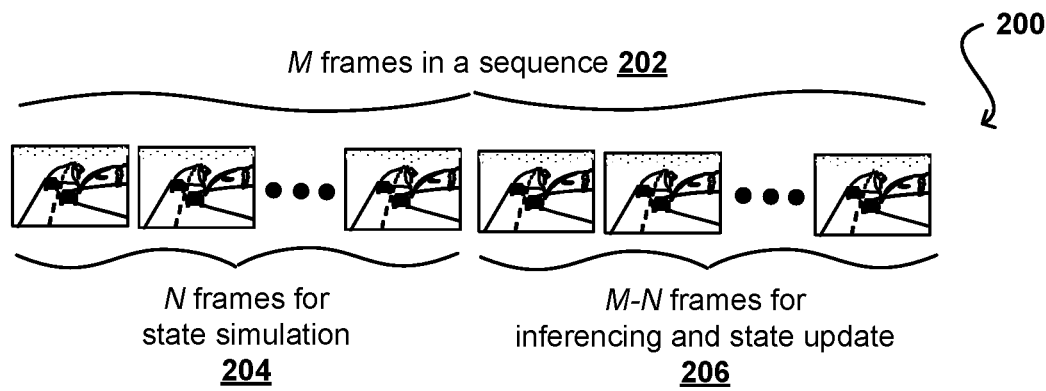
FIG. 2 illustrates an example video sequence that can be utilized, according to at least one embodiment.

Continuing with this example, a second phase can involve fine-tuning the network using longer sequences. In this example, as illustrated in the example input data 200 of FIG. 2, a number N of initial frames 204 of a given sequence 202 (of length M) are provided as input to the network, in order to cause the network to be placed, or operate, in a realistic state. In other words, the initial frames are used to help the network determine which portions of the video data likely corresponds to background objects, as well as to "calibrate" to the brightness, color palette, and other aspects of the input image data in order to better identify objects, positions, and changes in the state of the environment, among other such aspects. A remaining portion of the frames 206 (of number M-N) can then be used for two purposes. First, the frames can be provided individually as input for purposes of inferring information about objects represented in the data. Second, the frames can be used to update the state information for the network, as each frame as it is received represents a "current" state, allowing some elapsing of actual time for image capture and analysis, etc. These remaining frames are thus used for computing the backward gradient, with BPTT being performed only using the remaining subset of frames 206. In such an example, if the sequence length is given by M, the gradient flow will be computed for the last M-N frames, using the cost function at the last frame. The first N frames are used for the forward pass only, in order to set the network to a realistic state.

Figure 3:
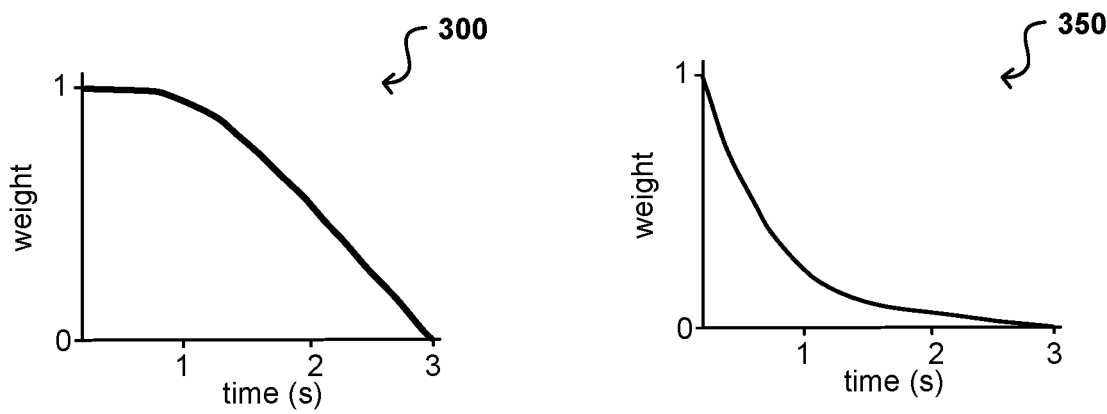
FIG. 3 illustrates example exponential decay functions that can be utilized to determine a highest value navigation option, according to at least one embodiment.

In a third phase for this example, a model (such as a model resulting from stages one and two) can be utilized statefully for recursive inferencing on a continuous data source, such as a video file or data stream. The stateful approach can utilize inference-time state leakage, in order to enable recent state data to impact the inferencing decisions more than old state information in at least some embodiments. As mentioned, relevant frames that are similar to the current frame can be helpful in positively influencing the object detection inferences for the current frame, but older frames that are not sufficiently similar should not impact the detection. There can be different types of state leakage introduced, such as through a leakage function or leakage parameter. In some embodiments, the leakage can be introduced using an exponential decay function, such as illustrated in FIG. 3. The exponential decay can be selected using a first function 300 that causes recent state information to be heavily weighted for an initial period of time, then drop off more quickly over time. In the example 300 illustrated, the plot shows almost a full weighting (a value near 1 on a scale of 0 to 1) for the first second, then dropping off more rapidly until the state information has little to no weighting after three seconds. In other example delay function 350 as illustrated, the function could be selected such that state information is only highly weighted for a very short period of time, with the weighting dropping off very quickly and then leveling off as the weighting approaches the three second mark. Various other such decay functions, parameters, or weightings can be used as well within the scope of the various embodiments. In at least some embodiments the training of all other parameters is turned off in this phase, as well as BPTT (in order to prevent the network from compensating for the introduced leakage).

In one embodiment, state leakage as an exponential decay of network state can be given by:

$$h_{t+i} \leftarrow h_t e^{-i/\tau},$$

in continuous time. Some embodiments a discrete time exponential decay can be applied, as given by:

$$h_t \leftarrow m_\tau h_{t-1},$$

where $h_t$ is the network state, and $\tau$ and $m_\tau$ are decay constants, and $m_\tau$ can be optimized by evaluating the detection accuracy at various values of $m_\tau[0,1]$.

In such a process, the first phase can be used during training to produce a network that can, for example, perform object detection (or inference) on sequence inputs, such as is useful for autonomous vehicles as discussed above. Such a process can be time and memory efficient as it uses small blocks of consecutive frames where there is a labeled frame. Such an approach, however, is limited to a similar number of input frames at inference time. A network trained using only the process of phase one cannot detect objects accurately if the presented sequence length is longer than the sequence lengths used for training. The second phase uses several unlabeled samples, such as frames of a continuous frame stream to simulate the real network state, and several more frames as input to gradient computation to teach the network to detect the objects from that realistic state on. The second phase is used to train the network to infer the objects using a longer sequence than that with which the network is trained in the first phase. The third phase, or hyper-optimization phase, can be used to determine the optimal leakage. This happens in isolation (and posterior to) training the rest of the network parameters. As mentioned, BPTT is turned off and the network is not training in this phase. The third phase can also attempt to remove any artifacts of the long history of state information. The results of the second phase can yield good accuracies up to long sequence lengths, but infinite history (or recursive) detection accuracy still degrades. Phase three helps to solve this problem by determining a proper amount of leakage (i.e., a correct leakage parameter) that enables distant inputs in the history to be forgotten over time. Leakage, realized as exponential decay in the network state in at least some embodiments, can help to ensure that the network forgets the far distant inputs in time and ensures that those inputs have only negligible effect on object detection.

Figure 4:
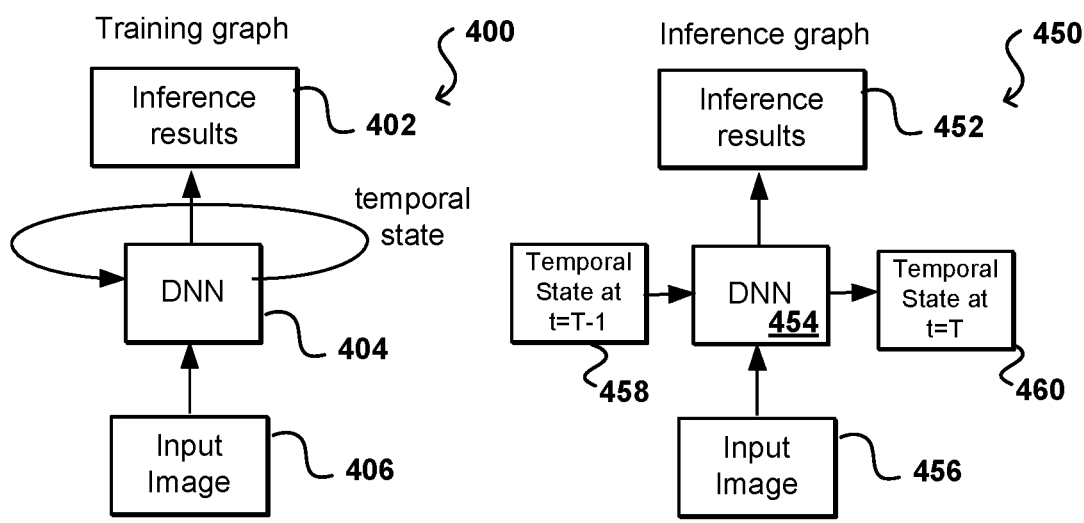
FIG. 4 illustrates example training and inference graphs that can be utilized, according to at least one embodiment.

Approaches in accordance with various embodiments can also take advantage of recurrent loop cutting. At inference time, a trained RNN can be deployed to an optimized environment for real time inference. The recurrent loop in the RNN can be broken so that the network becomes a directed acyclic graph (DAG). The state of the RNN can be maintained externally by the run-time environment and individually fed to the network at each inference time-step. This is illustrated in the example of FIG. 4. In a training graph portion 400, it is illustrated that an input image (or video frame) is fed to the network, which then generates inference results 402 using the recurrent temporal state. The inference graph portion 450 illustrates a situation taking advantage of recurrent loop cutting, where the input image 456 is still fed to the network 454 to produce inference results 452, but the recurrent nature of the temporal state is broken. Instead, the previous state 458 (e.g., the temporal state at time T−1) is provided to the network 454 as an additional input. The network can then produce the inference results 452, as well as the next or current state 460 (e.g., the temporal state at time T) as an additional output. Such an approach can help the process be deployed to environments that do not necessarily support within-the-network recurrence.

Such approaches can provide for the efficient training of recursive inference RNNs, for applications such as object detection, under sparsely labeled data. Such approaches allow for block-of-frames training for performing non-recursive inference on limited length sequences, as well as fine-tuning for extending the inference sequence length. Training with an input sequence portion and a gradient extent portion can result in accurate detection for sequence lengths that are much longer than those of the training sequences. Such approaches also provide for inference time leakage and its hyper-optimization for recursive stateful inference on infinitely long sequences, such as continuous video streams. As mentioned, during hyper-optimization different leakage parameters are used and the performance of the network analyzed to determine optimal leakage parameter. Cutting the recurrent loop can help to form a feed-forward network suitable for real-time inference.

Further, using such an approach enables training of a recurrent neural network (RNN) using sparse labels, with the model still being able to be applied to recursive stateful inference on continuous video streams. Such approaches not only ensure accuracy gains for a sequential model with respect to those trained using conventional approaches, but also allow for online recursive inference with the trained model without losing that accuracy gain. Approaches in accordance with various embodiments can improve accuracy and/or quality for cases such as the detection of objects of various classes in a continuous video stream in near-real time, such as for an autonomous vehicle or on a mobile robot, with a higher accuracy than a frame-by-frame approach. Accuracy can also be improved for pixelwise estimation numeric values and pixelwise classification on images from a video stream, such as for semantic image segmentation. The network can locate the image regions that belong to target classes such as paths, lanes, lane marks, and freely drivable spaces on the frames of a video. It should be noted that such processes can also be applied to offline data or video files, among other such options.

Figure 5:
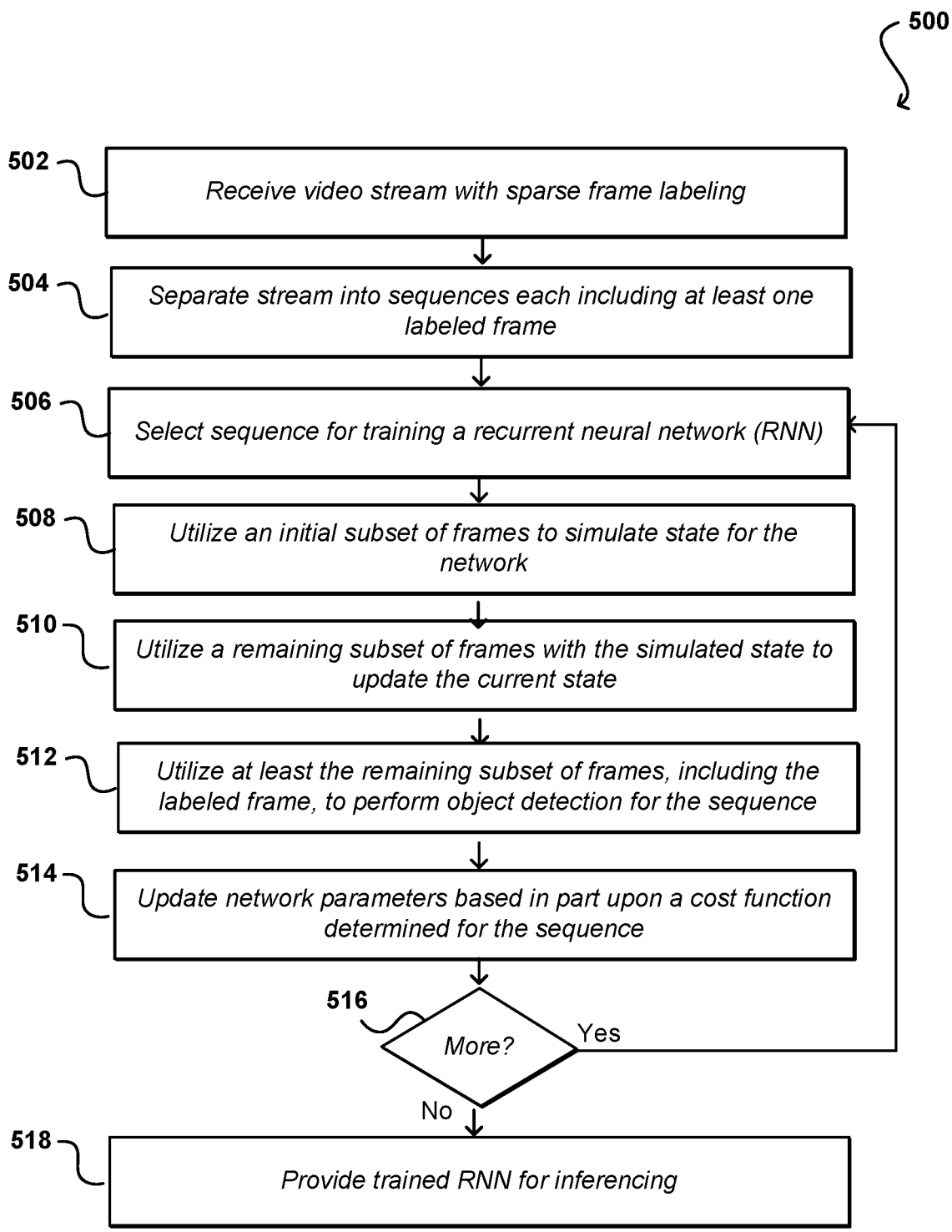
FIG. 5 illustrates an example process for training a neural network that can be utilized, according to at least one embodiment.

FIG. 5 illustrates an example process 500 for training a neural network that can be utilized in accordance with various embodiments. It should be understood for this and other processes discussed herein that there can be additional, alternative, or fewer steps performed in similar or alternative orders, or in parallel, within the scope of the various embodiments unless otherwise stated. Further, this example discusses training a recurrent neural network (RNN) using video data, but as discussed elsewhere herein there can be various types of models trained using a variety of different types of data within the scope of the various embodiments. In this example, a video stream (or other video file or content) is received 502 with sparse frame labeling. In this context, sparse frame labeling refers to the fact that a minority of the frames are labeled, such as one out of every thirty or sixty frames, among other such options. The labels can identify types of objects represented in a video frame, such as vehicles, people, animals, bicycles, buildings, and the like. The locations of the objects in the frame may be represented by bounding boxes, coordinates, edge boundaries, and the like. The labels in at least some embodiments are determined by human users, although computer vision or other automated (or semi-automated) techniques can be used as well within the scope of the various embodiments. The stream can be separated 504 into a number of video sequences, which may be of the same length or up to a maximum length, where each of the sequences will include at least one labeled frame.

A video sequence can be selected 506 for use in training a recurrent neural network (RNN) or other such network, model, algorithm, or process. In this example, an initial set of frames of the current sequence can be utilized 508 to simulate state information for the network. The initial set can include a determined number of frames of the sequence. This information can be used to determine a current state or point of reference, which can help to improve the accuracy of the object determinations for the sequence. The simulated state can include information about the types of objects represented, the general locations of those objects, information about the background, visual information about the contrast and brightness levels, and the like. Various other types of state information can be determined as well as would be apparent to one of ordinary skill in the art in light of the teachings and suggestions contained herein. A remaining subset of frames from the sequence can be utilized for two purposes in this example. First, the remaining subset can be utilized 510 with the simulated state information to update the current state, such as to update location or object detection information, among other state information discussed and suggested herein, to represent the state corresponding to the current frame or sequence being analyzed. Further, at least the remaining subset, including the labeled frame, can be utilized 512 to perform object detection for the sequence. The initial subset provides state simulation and thus impacts the detection as well. This object detection can take advantage of the current state information in order to improve accuracy. In this way, backpropagation is applied and gradients of the cost function with respect to learnable parameters of the network are determined using the remaining using the remaining subset of frames of the sequence including the labeled frame. The relevant network parameters can then be updated 514 based in part upon the evaluation of the cost function for the sequence. The cost function can be computed in some embodiments using the label of the labeled frame and the second subset of frames. If it is determined 516 that there are more sequences to use for training and/or a training termination criterion has not yet been met, such as by a convergence criterion being satisfied or a maximum number of training passes being met, then the process can continue with another sequence of the video stream. Otherwise, the trained network can be provided 518 for inferencing as discussed herein.

Figure 6:
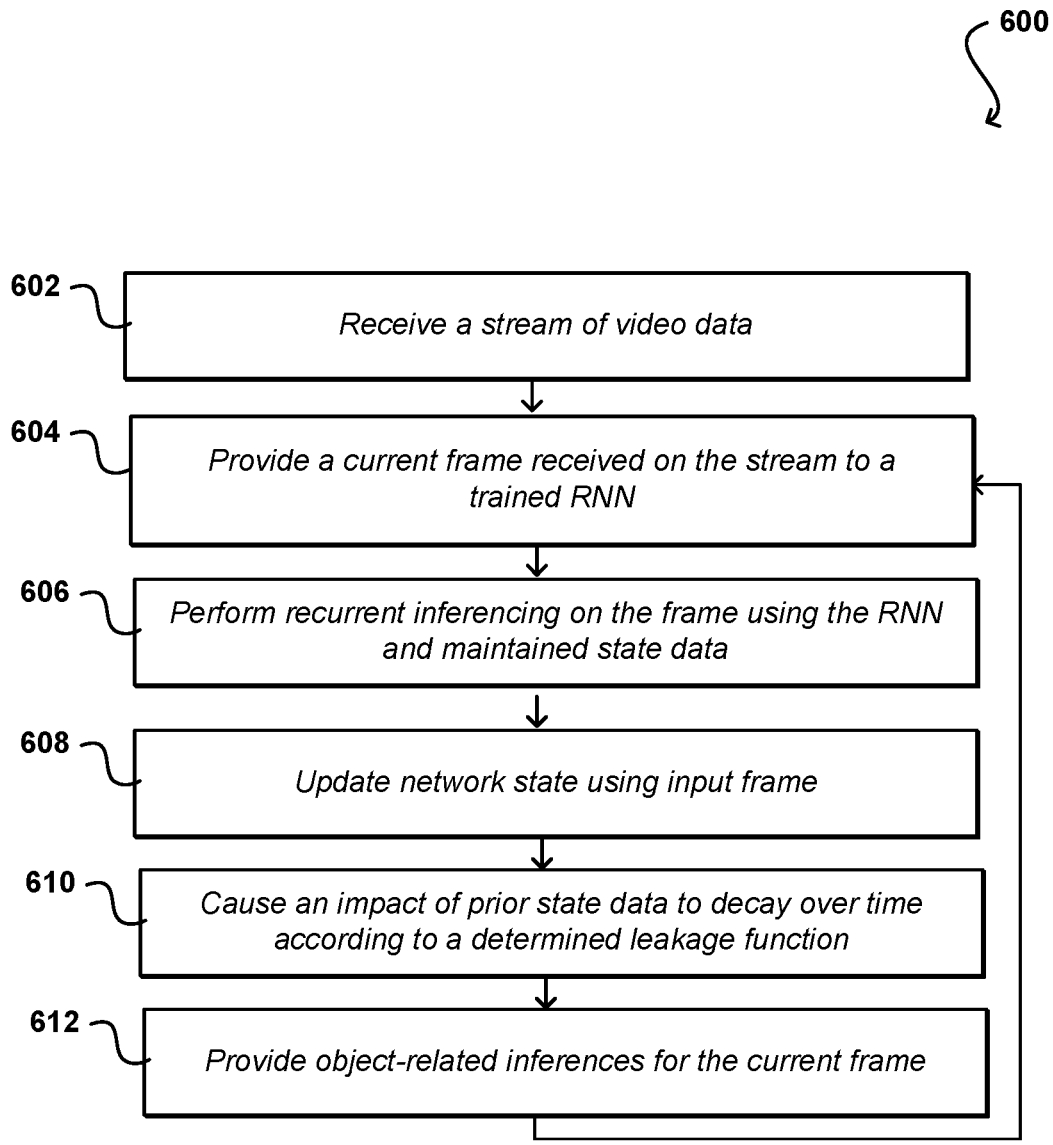
FIG. 6 illustrates an example process for generating inferences using a trained neural network that can be utilized, according to at least one embodiment.

FIG. 6 illustrates one such example process 600 for inferencing using a trained neural network that can be utilized in accordance with various embodiments. In this example, a stream of video data is received 602 for analysis. This can be a stream of camera data from an autonomous vehicle, or other such data, and may come in forms other than a data stream as well within the scope of various embodiments. The stream can include a continuous sequence of frames in this example, with a current or most recently received frame being provided 604 for processing by a trained RNN or other such network. In some embodiments not every frame will be analyzed, and in some embodiments there may be some buffering such that the frame being analyzed is not always (or ever) the most recently received frame on the stream. Using the frame, recurrent inferencing can be performed 606 using the trained RNN and maintained state data for the network. As discussed herein, the state data can be determined, maintained, and updated over time in order to improve the accuracy of the inferencing. The state information can also be updated 610 using the input frame. In order to avoid inaccuracies resulting from stale state information from the past, the impact of that prior state data can be caused 610 to decay over time according to a determined leakage function or parameter. Thus, when updating state information using information from the current frame, the network can also change the weighting applied to past state information such that older state information will have a lesser impact on the current determinations. As mentioned, a hyper-optimization process can be used in some embodiments to determine the optimal leakage parameter or function. Once determined, the object-related inferences for the current frame can be provided 612 as output from the trained RNN. As mentioned, the inferences can relate to aspects such as object type, location, coordinates, and the like. The process can continue for subsequently-received video frames of the stream.

As mentioned, an increasing variety of industries and applications are taking advantage of machine learning. As an example, deep neural networks (DNNs) developed on processors have been used for diverse use cases, from self-driving cars to faster drug development, from automatic image analysis for security systems to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system designed to accomplish a similar task would need to be trained for it to get smarter and more efficient at identifying basic objects, occluded objects, etc., while also assigning context to those objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptions (e.g., nodes) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher-level patterns such as wheels, windshields, and mirrors. The next layer identifies the type of vehicle, and the final few layers generate a label for the input image, identifying the model of a specific automobile brand. Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations, identifying, and classifying different types of automobiles, pedestrians, and road hazards in driverless cars, or translating human speech in near real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, a computing platform can deliver performance required for deep neural network-based artificial intelligence and machine learning applications.

Figure 7:
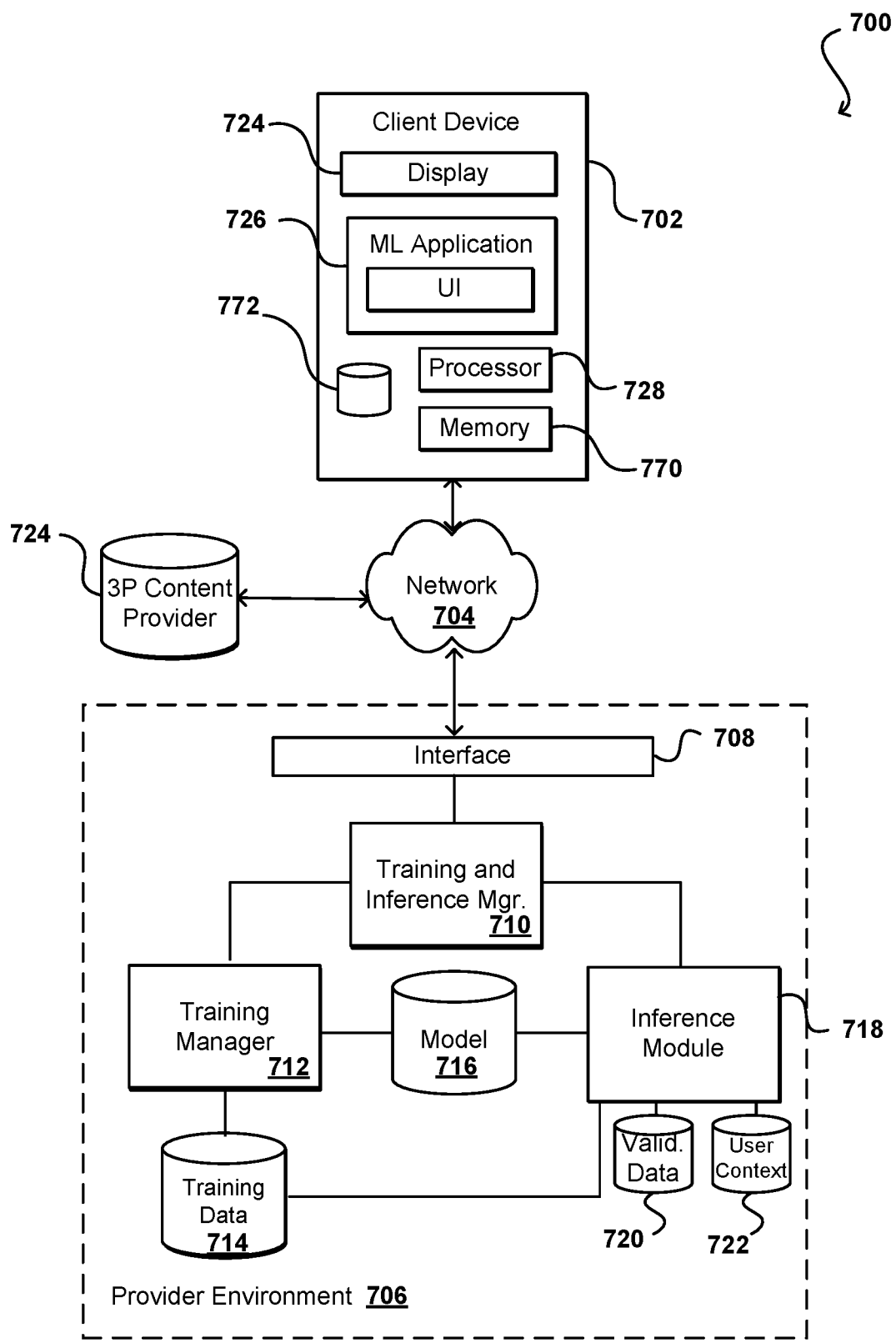
FIG. 7 illustrates an example environment in which aspects of the various embodiments can be implemented.

FIG. 7 illustrates components of an example system 700 that can be used to train and utilize machine learning in accordance with various embodiments. As will be discussed, the various components can be provided by various combinations of computing devices and resources, or a single computing system, which may be under the control of a single entity or multiple entities. Further, various aspects may be triggered, initiated, or requested by different entities. For example, in some embodiments the training of a neural network might be instructed by a provider associated with the provider environment 706, while in other embodiments the training might be requested by a customer or other user having access to the provider environment through a client device 702 or other such resource. The training data (or data to be analyzed by the trained neural network) can be provided by the provider, the user, or a third party content provider 724, among other such options. In some embodiments, the client device 702 may be a vehicle or object that is to be navigated on behalf of a user, for example, which can submit requests and/or receive instructions that assist in navigation of the device.

In this example, requests are able to be submitted across at least one network 704 to be received to a provider environment 706. The client device may be any appropriate electronic and/or computing devices enabling the user to generate and send such requests, as may include desktop computers, notebook computers, computer servers, smartphones, tablet computers, gaming consoles (portable or otherwise), computer processors, computing logic, and set-top boxes, among other such options. The network(s) 704 can include any appropriate network for transmitting the request or other such data, as may include the Internet, an intranet, an Ethernet, a cellular network, a local area network (LAN), a network of direct wireless connections among peers, and the like.

Requests can be received to an interface layer 708, which can forward the data to a training and inference manager 710 in this example. The manager can be a system or service including hardware and software for managing requests and service corresponding data or content in at least some embodiments. The manager can receive a request to train a neural network, and can provide data for the request to a training manger 712. The training manager 712 can select an appropriate model or network to be used, if not specified by the request, and can train the model using relevant training data. In some embodiments the training data can be a batch of data stored to a training data repository 714, received from the client device 702 or obtained from a third party provider 724, among other such options. The training manager 712 can be responsible for training the data, such as by using a LARC-based approach as discussed herein. The network can be any appropriate network, such as a recurrent neural network (RNN) or convolutional neural network (CNN), among other such options. Once a network is trained and successfully evaluated, the trained network can be stored to a model repository 716, for example, that may store different models or networks for users, applications, or services, etc. As mentioned, in some embodiments there may be multiple models for a single application or entity, as may be utilized based on a number of different factors.

At a subsequent point in time, a request may be received from the client device 702 (or another such device) for content (e.g., path determinations) or data that is at least partially determined or impacted by the trained neural network. The request can include, for example, input data to be processed using the neural network to obtain one or more inferences or other output values, classifications, or predictions. The input data can be received to the interface layer 708 and directed to the inference module 718, although a different system or service can be used as well in various embodiments. The inference module 718 can obtain the appropriate trained network, such as a trained deep neural network (DNN) as discussed herein, from the model repository 716 if not already stored locally to the inference module 718. The inference module 718 can provide the data as input to the trained network, which can then generate one or more inferences as output. This may include, for example, a classification of an instance of the input data. The inferences can then be transmitted to the client device 702 for display or other communication to the user. Context data for the user may also be stored to a user context data repository 722, which may include data about the user which may be useful as input to the network in generating the inferences, or determining the data to return to the user after obtaining the instances, among other such options. Relevant data, which may include at least some of the input or inference data, may also be stored to a local database 720 for processing future requests. In some embodiments, the user can use account or other information to access resources or functionality of the provider environment. If permitted and available, user data may also be collected and used to further train the models, in order to provide more accurate inferences for future requests. Requests may be received through a user interface to a machine learning application 726 executing on the client device 702 in some embodiments, and the results displayed through the same interface. The client device can include resources such as a processor 728 and memory 730 for generating the request and processing the results or response, as well as at least one data storage element 732 for storing data for the machine learning application 726.

In various embodiments a processor 728 (or a processor of the training manager 712 or inference module 718) will be a central processing unit (CPU). As mentioned, however, resources in such environments can utilize GPUs to process data for at least certain types of requests. With thousands of cores, GPUs are designed to handle substantial parallel workloads and, therefore, have become popular in deep learning for training neural networks and generating predictions. While the use of GPUs for offline builds has enabled faster training of larger and more complex models, generating predictions offline implies that either request-time input features cannot be used or predictions must be generated for all permutations of features and stored in a lookup table to serve real-time requests. If the deep learning framework supports a CPU-mode and the model is small and simple enough to perform a feed-forward on the CPU with a reasonable latency, then a service on a CPU instance could host the model. In this case, training can be done offline on the GPU and inference done in real-time on the CPU. If the CPU approach is not a viable option, then the service can run on a GPU instance. Because GPUs have different performance and cost characteristics than CPUs, however, running a service that offloads the runtime algorithm to the GPU can require it to be designed differently from a CPU based service.

Figure 8:
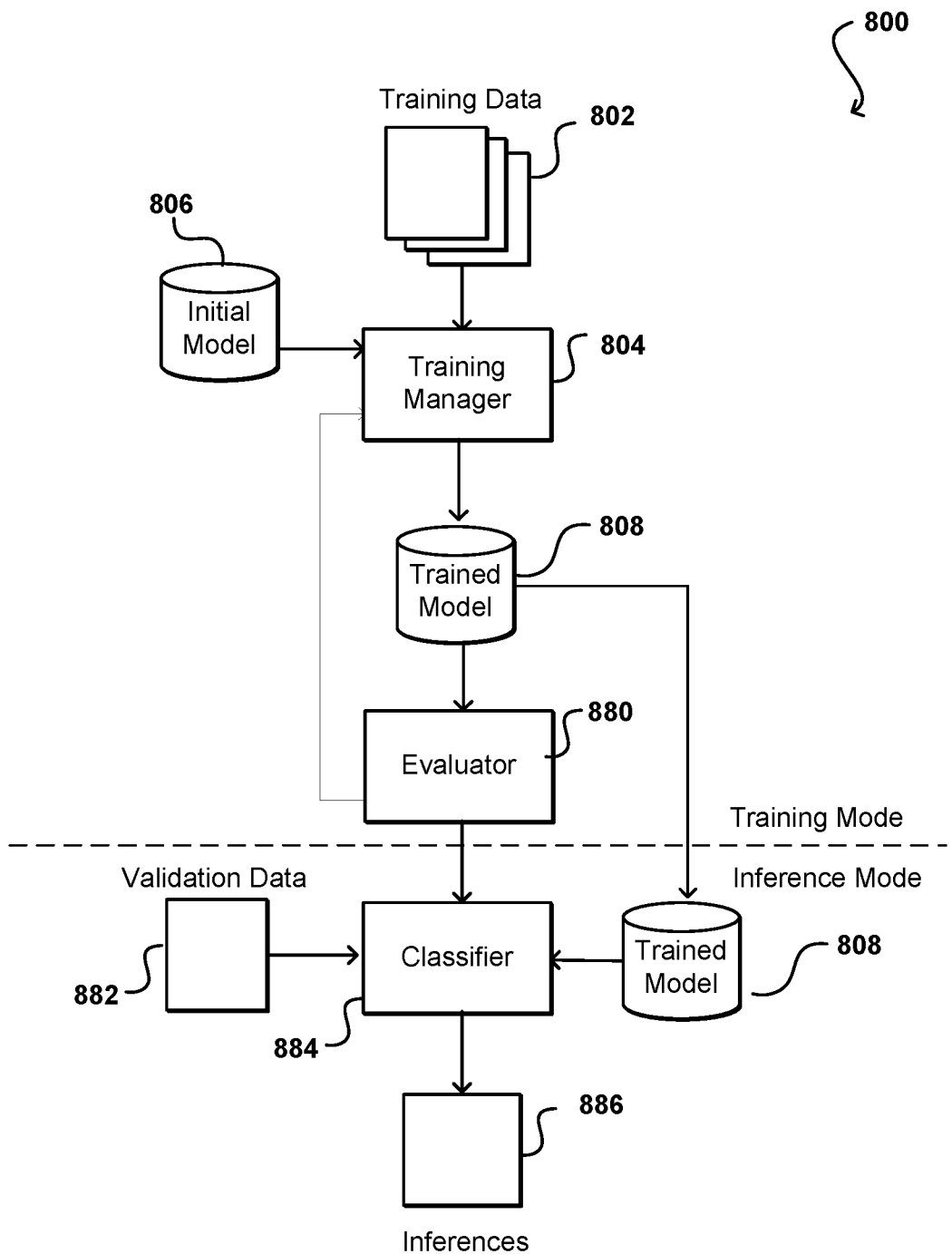
FIG. 8 illustrates an example system for training an image synthesis network that can be utilized, according to at least one embodiment.

FIG. 8 illustrates an example system 800 that can be used to classify data, or generate inferences, in accordance with various embodiments. Various types of predictions, labels, or other outputs can be generated for input data as well, as should be apparent in light of the teachings and suggestions contained herein. Further, both supervised and unsupervised training can be used in various embodiments discussed herein. In this example, a set of training data 802 (e.g., classified or labeled data) is provided as input to function as training data. The training data can include instances of at least one type of object for which a neural network is to be trained, as well as information that identifies that type of object. For example, the training data might include a set of images that each includes a representation of a type of object, where each image also includes, or is associated with, a label, metadata, classification, or other piece of information identifying the type of object represented in the respective image. Various other types of data may be used as training data as well, as may include text data, audio data, video data, and the like. The training data 802 in this example is provided as training input to a training manager 804. The training manager 804 can be a system or service that includes hardware and software, such as one or more computing devices executing a training application, for training the neural network (or other model or algorithm, etc.). In this example, the training manager 804 receives an instruction or request indicating a type of model to be used for the training. The model can be any appropriate statistical model, network, or algorithm useful for such purposes, as may include an artificial neural network, deep learning algorithm, learning classifier, Bayesian network, and the like. The training manager 804 can select an initial model, or other untrained model, from an appropriate repository 806 and utilize the training data 802 to train the model, generating a trained model 808 (e.g., trained deep neural network) that can be used to classify similar types of data, or generate other such inferences. In some embodiments where training data is not used, the appropriate initial model can still be selected for training on the input data per the training manager 804.

A model can be trained in a number of different ways, as may depend in part upon the type of model selected. For example, in one embodiment a machine learning algorithm can be provided with a set of training data, where the model is a model artifact created by the training process. Each instance of training data contains the correct answer (e.g., classification), which can be referred to as a target or target attribute. The learning algorithm finds patterns in the training data that map the input data attributes to the target, the answer to be predicted, and a machine learning model is output that captures these patterns. The machine learning model can then be used to obtain predictions on new data for which the target is not specified.

In one example, a training manager 804 can select from a set of machine learning models including binary classification, multiclass classification, and regression models. The type of model to be used can depend at least in part upon the type of target to be predicted. Machine learning models for binary classification problems predict a binary outcome, such as one of two possible classes. A learning algorithm such as logistic regression can be used to train binary classification models. Machine learning models for multiclass classification problems allow predictions to be generated for multiple classes, such as to predict one of more than two outcomes. Multinomial logistic regression can be useful for training multiclass models. Machine learning models for regression problems predict a numeric value. Linear regression can be useful for training regression models.

In order to train a machine learning model in accordance with one embodiment, the training manager must determine the input training data source, as well as other information such as the name of the data attribute that contains the target to be predicted, required data transformation instructions, and training parameters to control the learning algorithm. During the training process, a training manager 804 in some embodiments may automatically select the appropriate learning algorithm based on the type of target specified in the training data source. Machine learning algorithms can accept parameters used to control certain properties of the training process and of the resulting machine learning model. These are referred to herein as training parameters. If no training parameters are specified, the training manager can utilize default values that are known to work well for a large range of machine learning tasks. Examples of training parameters for which values can be specified include the maximum model size, maximum number of passes over training data, shuffle type, regularization type, learning rate, and regularization amount. Default settings may be specified, with options to adjust the values to fine-tune performance.

The maximum model size is the total size, in units of bytes, of patterns that are created during the training of model. A model may be created of a specified size by default, such as a model of 100 MB. If the training manager is unable to determine enough patterns to fill the model size, a smaller model may be created. If the training manager finds more patterns than will fit into the specified size, a maximum cut-off may be enforced by trimming the patterns that least affect the quality of the learned model. Choosing the model size provides for control of the trade-off between the predictive quality of a model and the cost of use. Smaller models can cause the training manager to remove many patterns to fit within the maximum size limit, affecting the quality of predictions. Larger models, on the other hand, may cost more to query for real-time predictions. Larger input data sets do not necessarily result in larger models because models store patterns, not input data. If the patterns are few and simple, the resulting model will be small. Input data that has a large number of raw attributes (input columns) or derived features (outputs of the data transformations) will likely have more patterns found and stored during the training process.

In some embodiments, the training manager 804 can make multiple passes or iterations over the training data to attempt to discover patterns. There may be a default number of passes, such as ten passes, while in some embodiments up to a maximum number of passes may be set, such as up to one hundred passes. In some embodiments there may be no maximum set, or there may be a convergence criterion or other factor set that will trigger an end to the training process. In some embodiments the training manager 804 can monitor the quality of patterns (i.e., the model convergence) during training, and can automatically stop the training when there are no more data points or patterns to discover. Data sets with only a few observations may require more passes over the data to obtain sufficiently high model quality. Larger data sets may contain many similar data points, which can reduce the need for a large number of passes. The potential impact of choosing more data passes over the data is that the model training can takes longer and cost more in terms of resources and system utilization.

In some embodiments the training data is shuffled before training, or between passes of the training. The shuffling in many embodiments is a random or pseudo-random shuffling to generate a truly random ordering, although there may be some constraints in place to ensure that there is no grouping of certain types of data, or the shuffled data may be reshuffled if such grouping exists, etc. Shuffling changes the order or arrangement in which the data is utilized for training so that the training algorithm does not encounter groupings of similar types of data, or a single type of data for too many observations in succession. For example, a model might be trained to predict an object. The data might be sorted by object type before uploading. The algorithm can then process the data alphabetically by object type, encountering only data for a certain object type first. The model will begin to learn patterns for that type of object. The model will then encounter only data for a second object type, and will try to adjust the model to fit that object type, which can degrade the patterns that fit that the first object type. This sudden switch from between object types can produce a model that does not learn how to predict object types accurately. Shuffling can be performed in some embodiments before the training data set is split into training and evaluation subsets, such that a relatively even distribution of data types is utilized for both stages. In some embodiments the training manager 804 can automatically shuffle the data using, for example, a pseudo-random shuffling technique.

When creating a machine learning model, the training manager 804 in some embodiments can enable a user to specify settings or apply custom options. For example, a user may specify one or more evaluation settings, indicating a portion of the input data to be reserved for evaluating the predictive quality of the machine learning model. The user may specify a policy that indicates which attributes and attribute transformations are available for model training. The user may also specify various training parameters that control certain properties of the training process and of the resulting model.

Once the training manager has determined that training of the model is complete, such as by using at least one end criterion discussed herein, the trained model 808 can be provided for use by a classifier 814 in classifying (or otherwise generating inferences for) validation data 812. As illustrated, this involves a logical transition between a training mode for the model and an inference mode for the model. In many embodiments, however, the trained model 808 will first be passed to an evaluator 810, which may include an application, process, or service executing on at least one computing resource (e.g., a CPU or GPU of at least one server) for evaluating the quality (or another such aspect) of the trained model. The model is evaluated to determine whether the model will provide at least a minimum acceptable or threshold level of performance in predicting the target on new and future data. If not, the training manager 804 can continue to train the model. Since future data instances will often have unknown target values, it can be desirable to check an accuracy metric of the machine learning on data for which the target answer is known, and use this assessment as a proxy for predictive accuracy on future data.

In some embodiments, a model is evaluated using a subset of the training data 802 that was provided for training. The subset can be determined using a shuffle and split approach as discussed above. This evaluation data subset will be labeled with the target, and thus can act as a source of ground truth for evaluation. Evaluating the predictive accuracy of a machine learning model with the same data that was used for training is not useful, as positive evaluations might be generated for models that remember the training data instead of generalizing from it. Once training has completed, the evaluation data subset is processed using the trained model 808 and the evaluator 810 can determine the accuracy of the model by comparing the ground truth data against the corresponding output (or predictions/observations) of the model. The evaluator 810 in some embodiments can provide a summary or performance metric indicating how well the predicted and true values match. If the trained model does not satisfy at least a minimum performance criterion, or other such accuracy threshold, then the training manager 804 can be instructed to perform further training, or in some instances try training a new or different model, among other such options. If the trained model 808 satisfies the relevant criteria, then the trained model can be provided for use by the classifier 814.

When creating and training a machine learning model, it can be desirable in at least some embodiments to specify model settings or training parameters that will result in a model capable of making the most accurate predictions. Example parameters include the number of passes to be performed (forward and/or backward), regularization, model size, and shuffle type. As mentioned, however, selecting model parameter settings that produce the best predictive performance on the evaluation data might result in an overfitting of the model. Overfitting occurs when a model has memorized patterns that occur in the training and evaluation data sources, but has failed to generalize the patterns in the data. Overfitting often occurs when the training data includes all of the data used in the evaluation. A model that has been over fit may perform well during evaluation, but may fail to make accurate predictions on new or otherwise validation data. To avoid selecting an over fitted model as the best model, the training manager can reserve additional data to validate the performance of the model. For example, the training data set might be divided into 60 percent for training, and 40 percent for evaluation or validation, which may be divided into two or more stages. After selecting the model parameters that work well for the evaluation data, leading to convergence on a subset of the validation data, such as half the validation data, a second validation may be executed with a remainder of the validation data to ensure the performance of the model. If the model meets expectations on the validation data, then the model is not overfitting the data. Alternatively, a test set or held-out set may be used for testing the parameters. Using a second validation or testing step helps to select appropriate model parameters to prevent overfitting. However, holding out more data from the training process for validation makes less data available for training. This may be problematic with smaller data sets as there may not be sufficient data available for training. One approach in such a situation is to perform cross-validation as discussed elsewhere herein.

There are many metrics or insights that can be used to review and evaluate the predictive accuracy of a given model. One example evaluation outcome contains a prediction accuracy metric to report on the overall success of the model, as well as visualizations to help explore the accuracy of the model beyond the prediction accuracy metric. The outcome can also provide an ability to review the impact of setting a score threshold, such as for binary classification, and can generate alerts on criteria to check the validity of the evaluation. The choice of the metric and visualization can depend at least in part upon the type of model being evaluated.

Once trained and evaluated satisfactorily, the trained machine learning model can be used to build or support a machine learning application. In one embodiment building a machine learning application is an iterative process that involves a sequence of steps. The core machine learning problem(s) can be framed in terms of what is observed and what answer the model is to predict. Data can then be collected, cleaned, and prepared to make the data suitable for consumption by machine learning model training algorithms. The data can be visualized and analyzed to run sanity checks to validate the quality of the data and to understand the data. It might be the case that the raw data (e.g., input variables) and answer data (e.g., the target) are not represented in a way that can be used to train a highly predictive model. Therefore, it may be desirable to construct more predictive input representations or features from the raw variables. The resulting features can be fed to the learning algorithm to build models and evaluate the quality of the models on data that was held out from model building. The model can then be used to generate predictions of the target answer for new data instances.

In the example system 800 of FIG. 8, the trained model 810 after evaluation is provided, or made available, to a classifier 814 that is able to use the trained model to process validation data. This may include, for example, data received from users or third parties that are not classified, such as query images that are looking for information about what is represented in those images. The validation data can be processed by the classifier using the trained model, and the results 816 (i.e., the classifications or predictions) that are produced can be sent back to the respective sources or otherwise processed or stored. In some embodiments, and where such usage is permitted, the now-classified data instances can be stored to the training data repository, which can be used for further training of the trained model 808 by the training manager. In some embodiments the model will be continually trained as new data is available, but in other embodiments the models will be retrained periodically, such as once a day or week, depending upon factors such as the size of the data set or complexity of the model.

The classifier 814 can include appropriate hardware and software for processing the validation data 812 using the trained model. In some instances the classifier will include one or more computer servers each having one or more graphics processing units (GPUs) that are able to process the data. The configuration and design of GPUs can make them more desirable to use in processing machine learning data than CPUs or other such components. The trained model in some embodiments can be loaded into GPU memory and a received data instance provided to the GPU for processing. GPUs can have a much larger number of cores than CPUs, and the GPU cores can also be much less complex. Accordingly, a given GPU may be able to process thousands of data instances concurrently via different hardware threads. A GPU can also be configured to maximize floating point throughput, which can provide significant additional processing advantages for a large data set.

Even when using GPUs, accelerators, and other such hardware to accelerate tasks such as the training of a model or classification of data using such a model, such tasks can still require significant time, resource allocation, and cost. For example, if the machine learning model is to be trained using 800 passes, and the data set includes 1,000,000 data instances to be used for training, then all million instances would need to be processed for each pass. Different portions of the architecture can also be supported by different types of devices. For example, training may be performed using a set of servers at a logically centralized location, as may be offered as a service, while classification of raw data may be performed by such a service or on a client device, among other such options. These devices may also be owned, operated, or controlled by the same entity or multiple entities in various embodiments.

Figure 9:
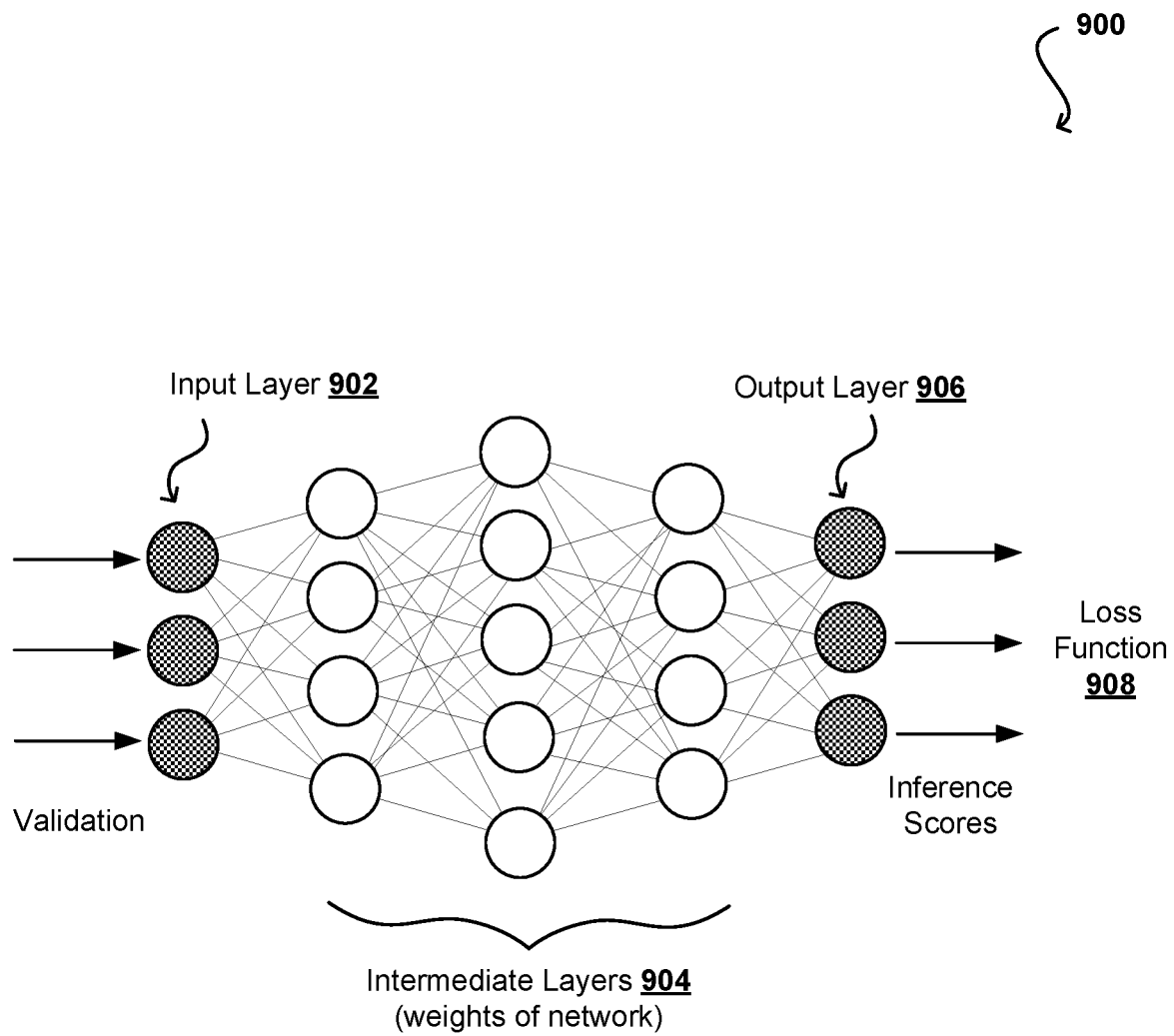
FIG. 9 illustrates layers of an example statistical model that can be utilized, according to at least one embodiment.

FIG. 9 illustrates an example neural network 900 that can be trained or otherwise utilized in accordance with various embodiments. In this example the statistical model is an artificial neural network (ANN) that includes a multiple layers of nodes, including an input layer 902, an output layer 906, and multiple layers 904 of intermediate nodes, often referred to as "hidden" layers, as the internal layers and nodes are typically not visible or accessible in conventional neural networks. Although only a few intermediate layers are illustrated for purposes of explanation, it should be understood that there is no limit to the number of intermediate layers that can be utilized, and any limit on the layers will often be a factor of the resources or time required for processed using the model. As discussed elsewhere herein, there can be additional types of models, networks, algorithms, or processes used as well, as may include other numbers or selections of nodes and layers, among other such options. Validation data can be processed by the layers of the network to generate a set of inferences, or inference scores, which can then be fed to a loss function 908.

In this example network 900, all nodes of a given layer are interconnected to all nodes of an adjacent layer. As illustrated, the nodes of an intermediate layer will then each be connected to nodes of two adjacent layers. The nodes are also referred to as neurons or connected units in some models, and connections between nodes are referred to as edges. Each node can perform a function for the inputs received, such as by using a specified function. Nodes and edges can obtain different weightings during training, and individual layers of nodes can perform specific types of transformations on the received input, where those transformations can also be learned or adjusted during training. The learning can be supervised or unsupervised learning, as may depend at least in part upon the type of information contained in the training data set. Various types of neural networks can be utilized, as may include a convolutional neural network (CNN) that includes a number of convolutional layers and a set of pooling layers, and have proven to be beneficial for applications such as image recognition. CNNs can also be easier to train than other networks due to a relatively small number of parameters to be determined.

In some embodiments, such a complex machine learning model can be trained using various tuning parameters. Choosing the parameters, fitting the model, and evaluating the model are parts of the model tuning process, often referred to as hyperparameter optimization. Such tuning can involve introspecting the underlying model or data in at least some embodiments. In a training or production setting, a robust workflow can be important to avoid overfitting of the hyperparameters as discussed elsewhere herein. Cross-validation and adding Gaussian noise to the training dataset are techniques that can be useful for avoiding overfitting to any one dataset. For hyperparameter optimization it may be desirable in some embodiments to keep the training and validation sets fixed. In some embodiments, hyperparameters can be tuned in certain categories, as may include data preprocessing (i.e., translating words to vectors), CNN architecture definition (for example, filter sizes, number of filters), stochastic gradient descent (SGD) parameters (for example, learning rate), and regularization (for example, dropout probability), among other such options.

In an example pre-processing step, instances of a dataset can be embedded into a lower dimensional space of a certain size. The size of this space is a parameter to be tuned. The architecture of the CNN contains many tunable parameters. A parameter for filter sizes can represent an interpretation of the information that corresponds to the size of a instance that will be analyzed. In computational linguistics, this is known as the n-gram size. An example CNN uses three different filter sizes, which represent potentially different n-gram sizes. The number of filters per filter size can correspond to the depth of the filter. Each filter attempts to learn something different from the structure of the instance, such as the sentence structure for textual data. In the convolutional layer, the activation function can be a rectified linear unit and the pooling type set as max pooling. The results can then be concatenated into a single dimensional vector, and the last layer is fully connected onto a two-dimensional output. This corresponds to the binary classification to which an optimization function can be applied. One such function is an implementation of a Root Mean Square (RMS) propagation method of gradient descent, where example hyperparameters can include learning rate, batch size, maximum gradient normal, and epochs. With neural networks, regularization can be an extremely important consideration. As mentioned, in some embodiments the input data may be relatively sparse. A main hyperparameter in such a situation can be the dropout at the penultimate layer, which represents a proportion of the nodes that will not "fire" at each training cycle. An example training process can suggest different hyperparameter configurations based on feedback for the performance of previous configurations. The model can be trained with a proposed configuration, evaluated on a designated validation set, and the performance reporting. This process can be repeated to, for example, trade off exploration (learning more about different configurations) and exploitation (leveraging previous knowledge to achieve better results).

As training CNNs can be parallelized and GPU-enabled computing resources can be utilized, multiple optimization strategies can be attempted for different scenarios. A complex scenario allows tuning the model architecture and the preprocessing and stochastic gradient descent parameters. This expands the model configuration space. In a basic scenario, only the preprocessing and stochastic gradient descent parameters are tuned. There can be a greater number of configuration parameters in the complex scenario than in the basic scenario. The tuning in a joint space can be performed using a linear or exponential number of steps, iteration through the optimization loop for the models. The cost for such a tuning process can be significantly less than for tuning processes such as random search and grid search, without any significant performance loss.

Some embodiments can utilize backpropagation to calculate a gradient used for determining the weights for the neural network. Backpropagation is a form of differentiation, and can be used by a gradient descent optimization algorithm to adjust the weights applied to the various nodes or neurons as discussed above. The weights can be determined in some embodiments using the gradient of the relevant loss function. Backpropagation can utilize the derivative of the loss function with respect to the output generated by the statistical model. As mentioned, the various nodes can have associated activation functions that define the output of the respective nodes. Various activation functions can be used as appropriate, as may include radial basis functions (RBFs) and sigmoids, which can be utilized by various support vector machines (SVMs) for transformation of the data. The activation function of an intermediate layer of nodes is referred to herein as the inner product kernel. These functions can include, for example, identity functions, step functions, sigmoidal functions, ramp functions, and the like. Activation functions can also be linear or non-linear, among other such options.

Inference and Training Logic

Figure 10A:
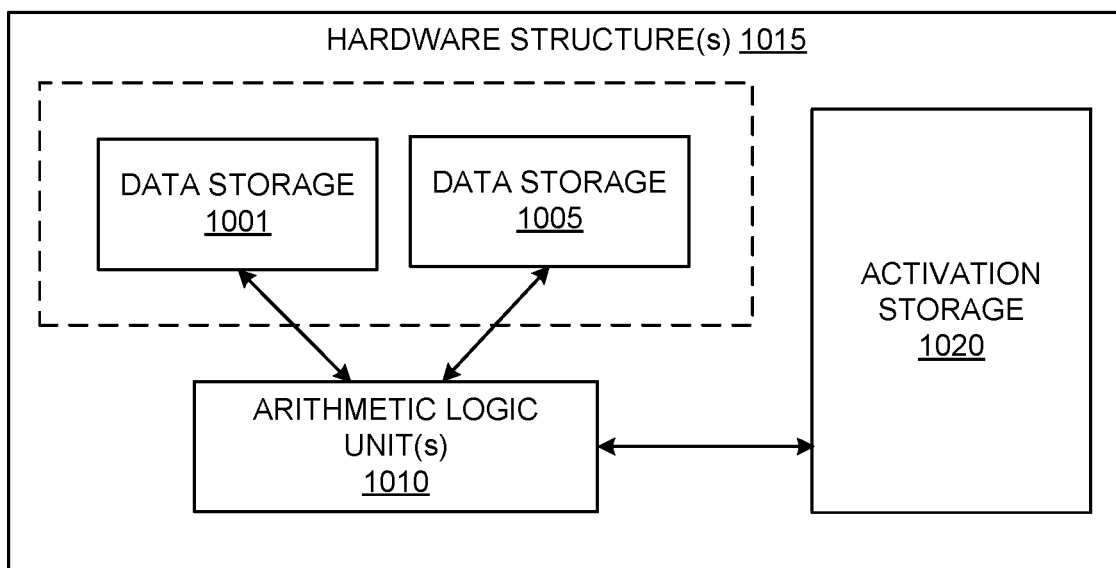
FIG. 10A illustrates inference and/or training logic, according to at least one embodiment.

FIG. 10 illustrates inference and/or training logic 1015 used to perform inferencing and/or training operations associated with one or more embodiments. Details regarding inference and/or training logic 1015 are provided below in conjunction with FIGS. 10A and/or 10B.

In at least one embodiment, inference and/or training logic 1015 may include, without limitation, a data storage 1001 to store forward and/or output weight and/or input/output data corresponding to neurons or layers of a neural network trained and/or used for inferencing in aspects of one or more embodiments. In at least one embodiment data storage 1001 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of data storage 1001 may be included with other on-chip or off-chip data storage, including a processor's L1, L2, or L3 cache or system memory.

In at least one embodiment, any portion of data storage 1001 may be internal or external to one or more processors or other hardware logic devices or circuits. In at least one embodiment, data storage 1001 may be cache memory, dynamic randomly addressable memory ("DRAM"), static randomly addressable memory ("SRAM"), non-volatile memory (e.g., Flash memory), or other storage. In at least one embodiment, choice of whether data storage 1001 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 1015 may include, without limitation, a data storage 1005 to store backward and/or output weight and/or input/output data corresponding to neurons or layers of a neural network trained and/or used for inferencing in aspects of one or more embodiments. In at least one embodiment, data storage 1005 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, any portion of data storage 1005 may be included with other on-chip or off-chip data storage, including a processor's L1, L2, or L3 cache or system memory. In at least one embodiment, any portion of data storage 1005 may be internal or external to on one or more processors or other hardware logic devices or circuits. In at least one embodiment, data storage 1005 may be cache memory, DRAM, SRAM, non-volatile memory (e.g., Flash memory), or other storage. In at least one embodiment, choice of whether data storage 1005 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, data storage 1001 and data storage 1005 may be separate storage structures. In at least one embodiment, data storage 1001 and data storage 1005 may be same storage structure. In at least one embodiment, data storage 1001 and data storage 1005 may be partially same storage structure and partially separate storage structures. In at least one embodiment, any portion of data storage 1001 and data storage 1005 may be included with other on-chip or off-chip data storage, including a processor's L1, L2, or L3 cache or system memory.

In at least one embodiment, inference and/or training logic 1015 may include, without limitation, one or more arithmetic logic unit(s) ("ALU(s)") 1010 to perform logical and/or mathematical operations based, at least in part on, or indicated by, training and/or inference code, result of which may result in activations (e.g., output values from layers or neurons within a neural network) stored in an activation storage 1020 that are functions of input/output and/or weight parameter data stored in data storage 1001 and/or data storage 1005. In at least one embodiment, activations stored in activation storage 1020 are generated according to linear algebraic and or matrix-based mathematics performed by ALU(s) 1010 in response to performing instructions or other code, wherein weight values stored in data storage 1005 and/or data 1001 are used as operands along with other values, such as bias values, gradient information, momentum values, or other parameters or hyperparameters, any or all of which may be stored in data storage 1005 or data storage 1001 or another storage on or off-chip. In at least one embodiment, ALU(s) 1010 are included within one or more processors or other hardware logic devices or circuits, whereas in another embodiment, ALU(s) 1010 may be external to a processor or other hardware logic device or circuit that uses them (e.g., a co-processor). In at least one embodiment, ALUs 1010 may be included within a processor's execution units or otherwise within a bank of ALUs accessible by a processor's execution units either within same processor or distributed between different processors of different types (e.g., central processing units, graphics processing units, fixed function units, etc.). In at least one embodiment, data storage 1001, data storage 1005, and activation storage 1020 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 1020 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 1020 may be cache memory, DRAM, SRAM, non-volatile memory (e.g., Flash memory), or other storage. In at least one embodiment, activation storage 1020 may be completely or partially within or external to one or more processors or other logical circuits. In at least one embodiment, choice of whether activation storage 1020 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 1015 illustrated in FIG. 10 may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10A may be used in conjunction with central processing unit ("CPU") hardware, graphics processing unit ("GPU") hardware or other hardware, such as field programmable gate arrays ("FPGAs").

Figure 10B:
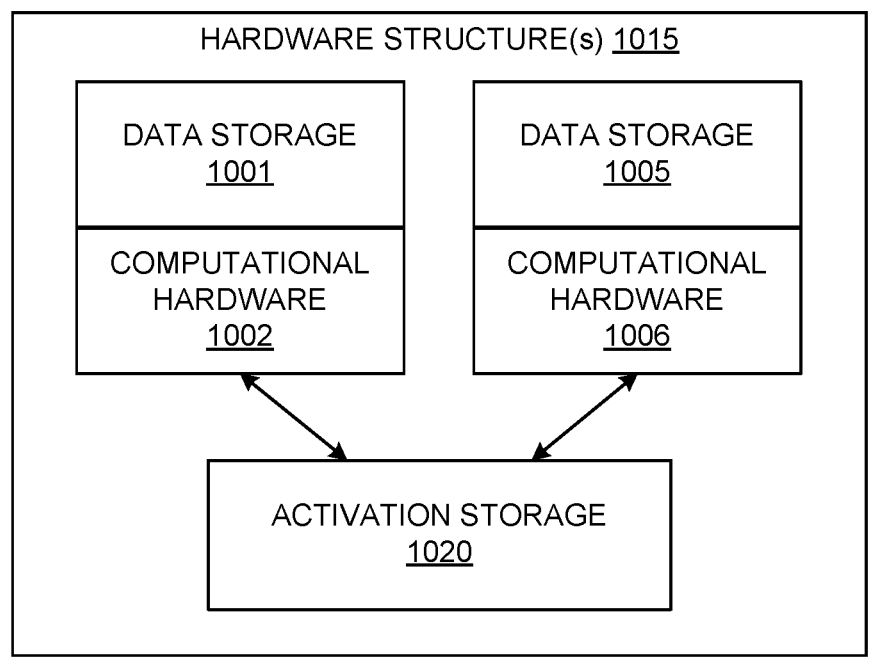
FIG. 10B illustrates inference and/or training logic, according to at least one embodiment.

FIG. 10B illustrates inference and/or training logic 1015, according to at least one embodiment various. In at least one embodiment, inference and/or training logic 1015 may include, without limitation, hardware logic in which computational resources are dedicated or otherwise exclusively used in conjunction with weight values or other information corresponding to one or more layers of neurons within a neural network. In at least one embodiment, inference and/or training logic 1015 illustrated in FIG. 10B may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 1015 illustrated in FIG. 10B may be used in conjunction with central processing unit (CPU) hardware, graphics processing unit (GPU) hardware or other hardware, such as field programmable gate arrays (FPGAs). In at least one embodiment, inference and/or training logic 1015 includes, without limitation, data storage 1001 and data storage 1005, which may be used to store weight values and/or other information, including bias values, gradient information, momentum values, and/or other parameter or hyperparameter information. In at least one embodiment illustrated in FIG. 10.B, each of data storage 1001 and data storage 1005 is associated with a dedicated computational resource, such as computational hardware 1002 and computational hardware 1006, respectively. In at least one embodiment, each of computational hardware 1002 and computational hardware 1006 comprises one or more ALUs that perform mathematical functions, such as linear algebraic functions, only on information stored in data storage 1001 and data storage 1005, respectively, result of which is stored in activation storage 1020.

In at least one embodiment, each of data storage 1001 and 1005 and corresponding computational hardware 1002 and 1006, respectively, correspond to different layers of a neural network, such that resulting activation from one "storage/computational pair 1001/1002" of data storage 1001 and computational hardware 1002 is provided as an input to next "storage/computational pair 1005/1006" of data storage 1005 and computational hardware 1006, in order to mirror conceptual organization of a neural network. In at least one embodiment, each of storage/computational pairs 1001/1002 and 1005/1006 may correspond to more than one neural network layer. In at least one embodiment, additional storage/computation pairs (not shown) subsequent to or in parallel with storage computation pairs 1001/1002 and 1005/1006 may be included in inference and/or training logic 1015.

Neural Network Training and Deployment

Figure 11:
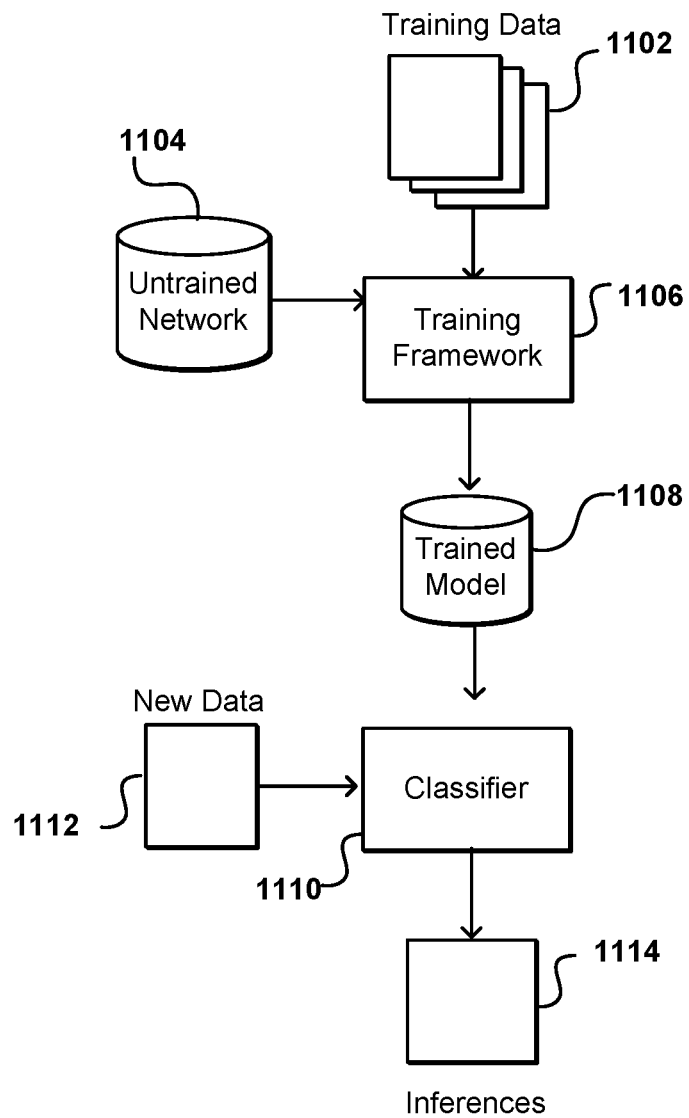
FIG. 11 illustrates training and deployment of a neural network, according to at least one embodiment.

FIG. 11 illustrates training and deployment of a deep neural network, according to at least one embodiment. In at least one embodiment, untrained neural network 1106 is trained using a training dataset 1102. In at least one embodiment, training framework 1104 is a PyTorch framework, whereas in other embodiments, training framework 1104 is a Tensorflow, Boost, Caffe, Microsoft Cognitive Toolkit/CNTK, MXNet, Chainer, Keras, Deeplearning4j, or other training framework. In at least one embodiment training framework 1104 trains an untrained neural network 1106 and enables it to be trained using processing resources described herein to generate a trained neural network 1108. In at least one embodiment, weights may be chosen randomly or by pre-training using a deep belief network. In at least one embodiment, training may be performed in either a supervised, partially supervised, or unsupervised manner.

In at least one embodiment, untrained neural network 1106 is trained using supervised learning, wherein training dataset 1102 includes an input paired with a desired output for an input, or where training dataset 1102 includes input having known output and the output of the neural network is manually graded. In at least one embodiment, untrained neural network 1106 is trained in a supervised manner processes inputs from training dataset 1102 and compares resulting outputs against a set of expected or desired outputs. In at least one embodiment, errors are then propagated back through untrained neural network 1106. In at least one embodiment, training framework 1104 adjusts weights that control untrained neural network 1106. In at least one embodiment, training framework 1104 includes tools to monitor how well untrained neural network 1106 is converging towards a model, such as trained neural network 1108, suitable to generating correct answers, such as in result 1114, based on known input data, such as new data 1112. In at least one embodiment, training framework 1104 trains untrained neural network 1106 repeatedly while adjust weights to refine an output of untrained neural network 1106 using a loss function and adjustment algorithm, such as stochastic gradient descent. In at least one embodiment, training framework 1104 trains untrained neural network 1106 until untrained neural network 1106 achieves a desired accuracy. In at least one embodiment, trained neural network 1108 can then be deployed to implement any number of machine learning operations.

In at least one embodiment, untrained neural network 1106 is trained using unsupervised learning, wherein untrained neural network 1106 attempts to train itself using unlabeled data. In at least one embodiment, unsupervised learning training dataset 1102 will include input data without any associated output data or "ground truth" data. In at least one embodiment, untrained neural network 1106 can learn groupings within training dataset 1102 and can determine how individual inputs are related to untrained dataset 1102. In at least one embodiment, unsupervised training can be used to generate a self-organizing map, which is a type of trained neural network 1108 capable of performing operations useful in reducing dimensionality of new data 1112. In at least one embodiment, unsupervised training can also be used to perform anomaly detection, which allows identification of data points in a new dataset 1112 that deviate from normal patterns of new dataset 1112.

In at least one embodiment, semi-supervised learning may be used, which is a technique in which in training dataset 1102 includes a mix of labeled and unlabeled data. In at least one embodiment, training framework 1104 may be used to perform incremental learning, such as through transferred learning techniques. In at least one embodiment, incremental learning enables trained neural network 1108 to adapt to new data 1112 without forgetting knowledge instilled within network during initial training.

Data Center

Figure 12:
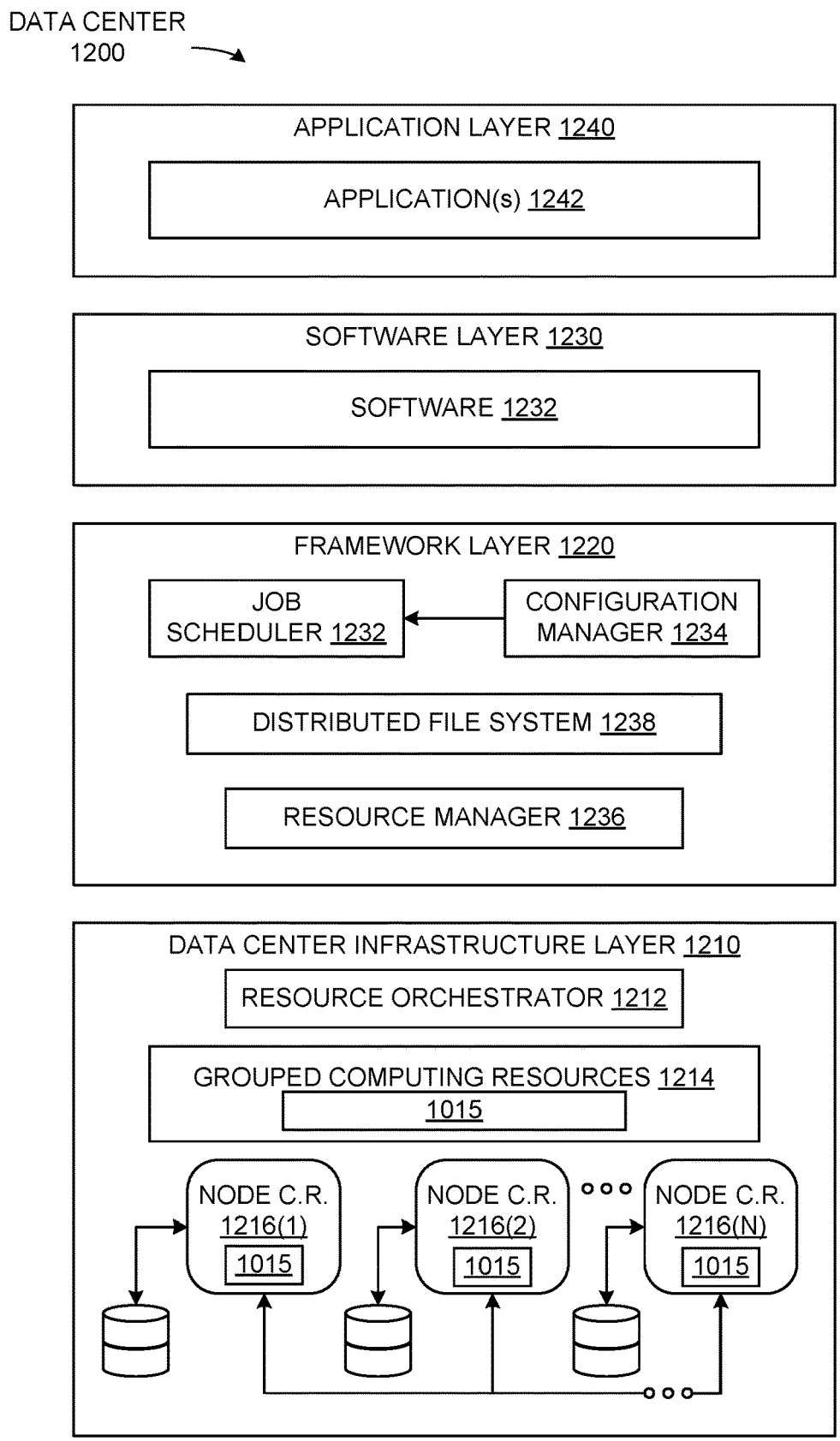
FIG. 12 illustrates an example data center system, according to at least one embodiment.

FIG. 12 illustrates an example data center 1200, in which at least one embodiment may be used. In at least one embodiment, data center 1200 includes a data center infrastructure layer 1210, a framework layer 1220, a software layer 1230 and an application layer 1240.

In at least one embodiment, as shown in FIG. 12, data center infrastructure layer 1210 may include a resource orchestrator 1212, grouped computing resources 1214, and node computing resources ("node C.R.s") 1216(1)-1216(N), where "N" represents any whole, positive integer. In at least one embodiment, node C.R.s 1216(1)-1216(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 1216(1)-1216(N) may be a server having one or more of above-mentioned computing resources.

In at least one embodiment, grouped computing resources 1214 may include separate groupings of node C.R.s housed within one or more racks (not shown), or many racks housed in data centers at various geographical locations (also not shown). separate groupings of node C.R.s within grouped computing resources 1214 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1222 may configure or otherwise control one or more node C.R.s 1216(1)-1216(N) and/or grouped computing resources 1214. In at least one embodiment, resource orchestrator 1222 may include a software design infrastructure ("SDI") management entity for data center 1200. In at least one embodiment, resource orchestrator may include hardware, software or some combination thereof.

In at least one embodiment, as shown in FIG. 12, framework layer 1220 includes a job scheduler 1232, a configuration manager 1234, a resource manager 1236 and a distributed file system 1238. In at least one embodiment, framework layer 1220 may include a framework to support software 1232 of software layer 1230 and/or one or more application(s) 1242 of application layer 1240. In at least one embodiment, software 1232 or application(s) 1242 may respectively include web-based service software or applications, such as those provided by Amazon Web Services, Google Cloud and Microsoft Azure. In at least one embodiment, framework layer 1220 may be, but is not limited to, a type of free and open-source software web application framework such as Apache Spark™ (hereinafter "Spark") that may utilize distributed file system 1238 for large-scale data processing (e.g., "big data"). In at least one embodiment, job scheduler 1232 may include a Spark driver to facilitate scheduling of workloads supported by various layers of data center 1200. In at least one embodiment, configuration manager 1234 may be capable of configuring different layers such as software layer 1230 and framework layer 1220 including Spark and distributed file system 1238 for supporting large-scale data processing. In at least one embodiment, resource manager 1236 may be capable of managing clustered or grouped computing resources mapped to or allocated for support of distributed file system 1238 and job scheduler 1232. In at least one embodiment, clustered or grouped computing resources may include grouped computing resource 1214 at data center infrastructure layer 1210. In at least one embodiment, resource manager 1236 may coordinate with resource orchestrator 1212 to manage these mapped or allocated computing resources.

In at least one embodiment, software 1232 included in software layer 1230 may include software used by at least portions of node C.R.s 1216(1)-1216(N), grouped computing resources 1214, and/or distributed file system 1238 of framework layer 1220. one or more types of software may include, but are not limited to, Internet web page search software, e-mail virus scan software, database software, and streaming video content software.

In at least one embodiment, application(s) 1242 included in application layer 1240 may include one or more types of applications used by at least portions of node C.R.s 1216(1)-1216(N), grouped computing resources 1214, and/or distributed file system 1238 of framework layer 1220. one or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 1234, resource manager 1236, and resource orchestrator 1212 may implement any number and type of self-modifying actions based on any amount and type of data acquired in any technically feasible fashion. In at least one embodiment, self-modifying actions may relieve a data center operator of data center 1200 from making possibly bad configuration decisions and possibly avoiding underutilized and/or poor performing portions of a data center.

In at least one embodiment, data center 1200 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 1200. In at least one embodiment, trained machine learning models corresponding to one or more neural networks may be used to infer or predict information using resources described above with respect to data center 1200 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 1015 are used to perform inferencing and/or training operations associated with one or more embodiments. Details regarding inference and/or training logic 1015 are provided below in conjunction with FIGS. 10 and/or 10B. In at least one embodiment, inference and/or training logic 1015 may be used in system FIG. 12 for inferencing or predicting operations based, at least in part, on weight parameters calculated using neural network training operations, neural network functions and/or architectures, or neural network use cases described herein.

In accordance with at least one embodiment, the data center infrastructure 1210 can receive the video stream, or other content, and cause that stream to be directed to the corresponding components of the application layer 1240 and software layer 1230 for purposes of training and/or inferencing as discussed herein.

Autonomous Vehicle

Figure 13A:
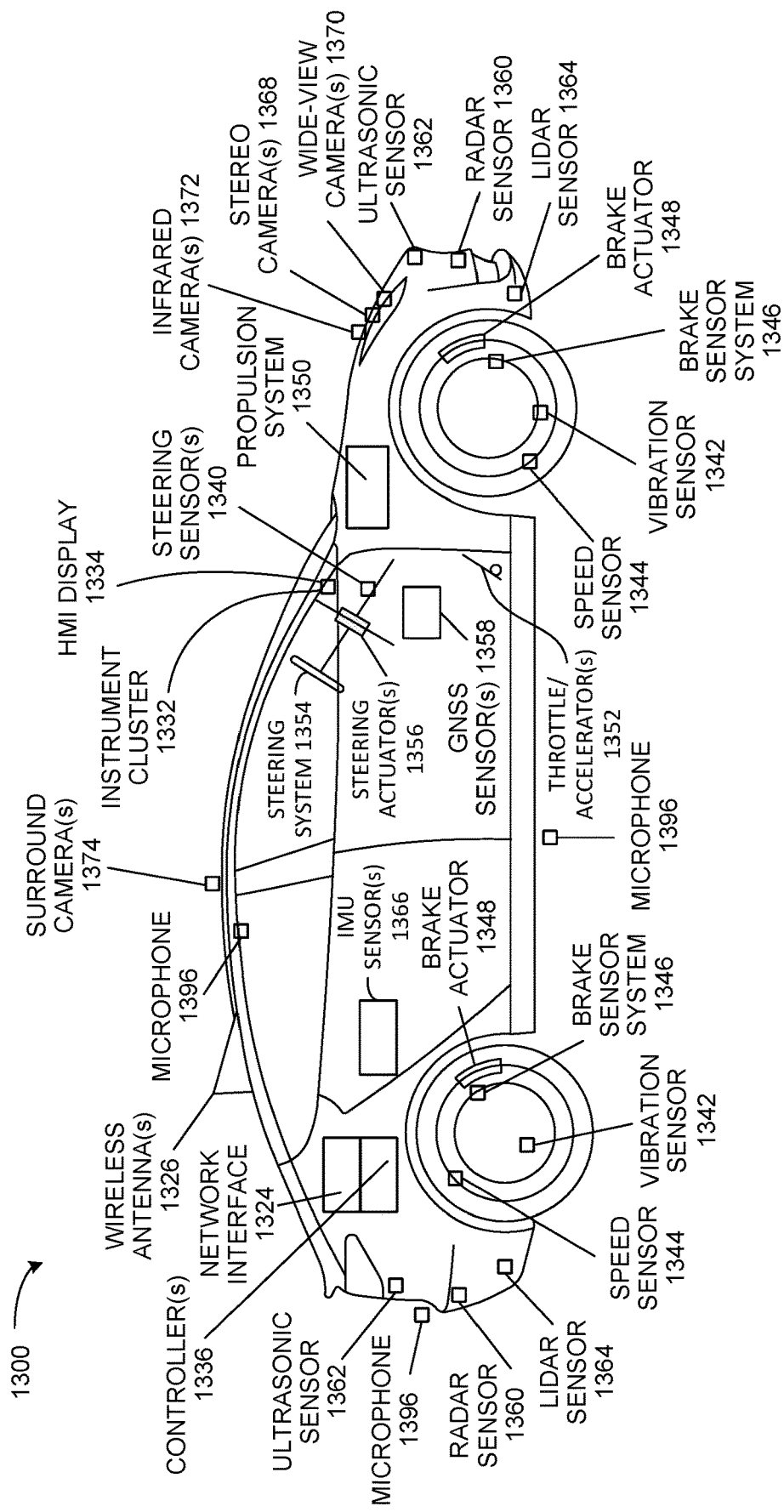
FIG. 13A illustrates an example of an autonomous vehicle, according to at least one embodiment.

FIG. 13A illustrates an example of an autonomous vehicle 1300, according to at least one embodiment. In at least one embodiment, autonomous vehicle 1300 (alternatively referred to herein as "vehicle 1300") may be, without limitation, a passenger vehicle, such as a car, a truck, a bus, and/or another type of vehicle that accommodates one or more passengers. In at least one embodiment, vehicle 1300 may be a semi-tractor-trailer truck used for hauling cargo. In at least one embodiment, vehicle 1300 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1300 may be capable of functionality in accordance with one or more of level 1-level 5 of autonomous driving levels. For example, in at least one embodiment, vehicle 1300 may be capable of conditional automation (Level 3), high automation (Level 4), and/or full automation (Level 5), depending on embodiment.

In at least one embodiment, vehicle 1300 may include, without limitation, components such as a chassis, a vehicle body, wheels (e.g., 2, 4, 6, 8, 18, etc.), tires, axles, and other components of a vehicle. In at least one embodiment, vehicle 1300 may include, without limitation, a propulsion system 1350, such as an internal combustion engine, hybrid electric power plant, an all-electric engine, and/or another propulsion system type. In at least one embodiment, propulsion system 1350 may be connected to a drive train of vehicle 1300, which may include, without limitation, a transmission, to enable propulsion of vehicle 1300. In at least one embodiment, propulsion system 1350 may be controlled in response to receiving signals from a throttle/accelerator(s) 1352.

In at least one embodiment, a steering system 1354, which may include, without limitation, a steering wheel, is used to steer a vehicle 1300 (e.g., along a desired path or route) when a propulsion system 1350 is operating (e.g., when vehicle is in motion). In at least one embodiment, a steering system 1354 may receive signals from steering actuator(s) 1356. steering wheel may be optional for full automation (Level 5) functionality. In at least one embodiment, a brake sensor system 1346 may be used to operate vehicle brakes in response to receiving signals from brake actuator(s) 1348 and/or brake sensors.

In at least one embodiment, controller(s) 1336, which may include, without limitation, one or more system on chips ("SoCs") (not shown in FIG. 13A) and/or graphics processing unit(s) ("GPU(s)"), provide signals (e.g., representative of commands) to one or more components and/or systems of vehicle 1300. For instance, in at least one embodiment, controller(s) 1336 may send signals to operate vehicle brakes via brake actuators 1348, to operate steering system 1354 via steering actuator(s) 1356, to operate propulsion system 1350 via throttle/accelerator(s) 1352. Controller(s) 1336 may include one or more onboard (e.g., integrated) computing devices (e.g., supercomputers) that process sensor signals, and output operation commands (e.g., signals representing commands) to enable autonomous driving and/or to assist a human driver in driving vehicle 1300. In at least one embodiment, controller(s) 1336 may include a first controller 1336 for autonomous driving functions, a second controller 1336 for functional safety functions, a third controller 1336 for artificial intelligence functionality (e.g., computer vision), a fourth controller 1336 for infotainment functionality, a fifth controller 1336 for redundancy in emergency conditions, and/or other controllers. In at least one embodiment, a single controller 1336 may handle two or more of above functionalities, two or more controllers 1336 may handle a single functionality, and/or any combination thereof.

In at least one embodiment, controller(s) 1336 provide signals for controlling one or more components and/or systems of vehicle 1300 in response to sensor data received from one or more sensors (e.g., sensor inputs). In at least one embodiment, sensor data may be received from, for example and without limitation, global navigation satellite systems ("GNSS") sensor(s) 1358 (e.g., Global Positioning System sensor(s)), RADAR sensor(s) 1360, ultrasonic sensor(s) 1362, LIDAR sensor(s) 1364, inertial measurement unit ("IMU") sensor(s) 1366 (e.g., accelerometer(s), gyroscope(s), magnetic compass(es), magnetometer(s), etc.), microphone(s) 1396, stereo camera(s) 1368, wide-view camera(s) 1370 (e.g., fisheye cameras), infrared camera(s) 1372, surround camera(s) 1374 (e.g., 360 degree cameras), long-range cameras (not shown in FIG. 13A), mid-range camera(s) (not shown in FIG. 13A), speed sensor(s) 1344 (e.g., for measuring speed of vehicle 1300), vibration sensor(s) 1342, steering sensor(s) 1340, brake sensor(s) (e.g., as part of brake sensor system 1346), and/or other sensor types.

In at least one embodiment, one or more of controller(s) 1336 may receive inputs (e.g., represented by input data) from an instrument cluster 1332 of vehicle 1300 and provide outputs (e.g., represented by output data, display data, etc.) via a human-machine interface ("HMI") display 1334, an audible annunciator, a loudspeaker, and/or via other components of vehicle 1300. In at least one embodiment, outputs may include information such as vehicle velocity, speed, time, map data (e.g., a High Definition map (not shown in FIG. 13A), location data (e.g., vehicle's 1300 location, such as on a map), direction, location of other vehicles (e.g., an occupancy grid), information about objects and status of objects as perceived by controller(s) 1336, etc. For example, in at least one embodiment, HMI display 1334 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1300 further includes a network interface 1324 which may use wireless antenna(s) 1326 and/or modem(s) to communicate over one or more networks. For example, in at least one embodiment, network interface 1324 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1326 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 13A for inferencing or predicting operations based, at least in part, on weight parameters calculated using neural network training operations, neural network functions and/or architectures, or neural network use cases described herein.

In accordance with at least one embodiment, video data captured from any of the various cameras can be captured and analyzed using a trained RNN, including state leakage as discussed herein, for purposes such as object detection.

Figure 13B:
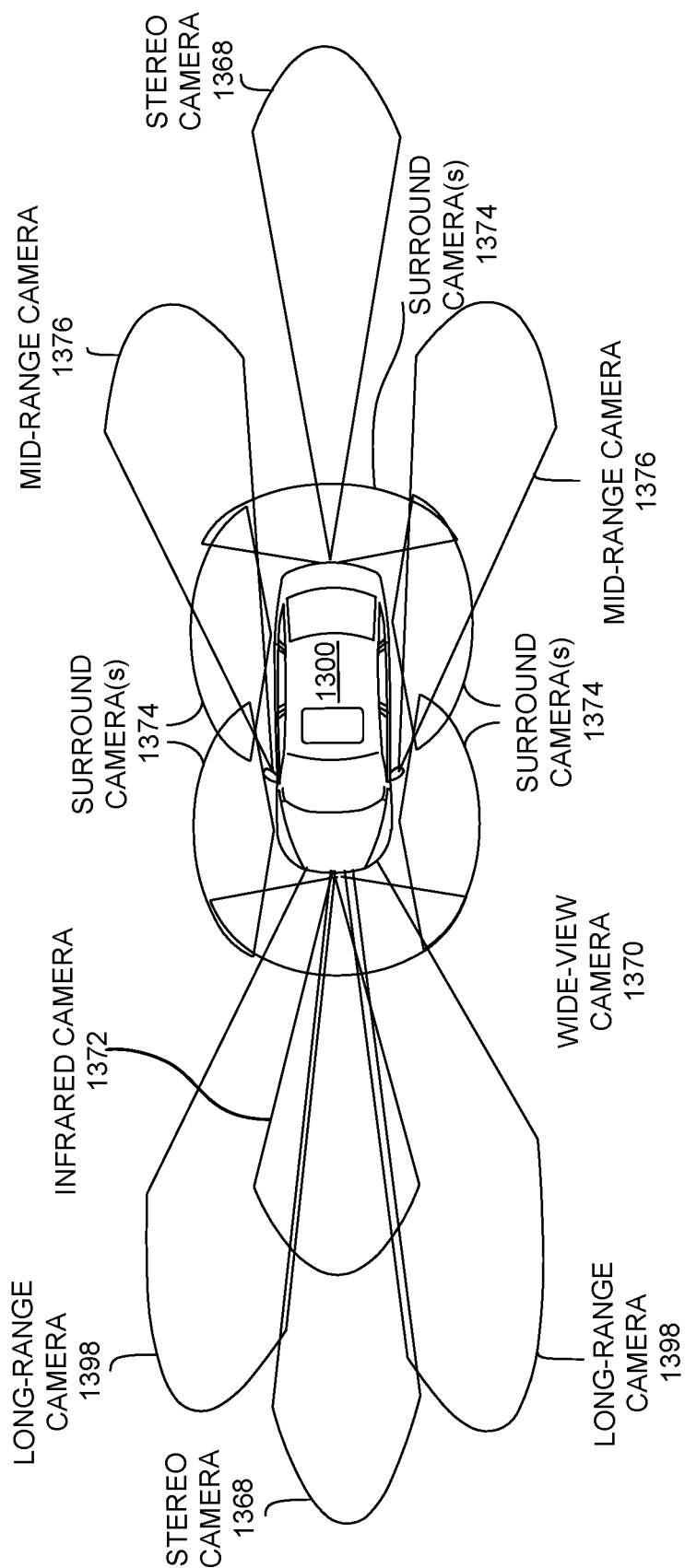
FIG. 13B illustrates an example of camera locations and fields of view for the autonomous vehicle of FIG. 13A, according to at least one embodiment.

FIG. 13B illustrates an example of camera locations and fields of view for autonomous vehicle 1300 of FIG. 13A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1300.

In at least one embodiment, camera types for cameras may include, but are not limited to, digital cameras that may be adapted for use with components and/or systems of vehicle 1300. camera(s) may operate at automotive safety integrity level ("ASIL") B and/or at another ASIL. In at least one embodiment, camera types may be capable of any image capture rate, such as 60 frames per second (fps), 1220 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner of cab.

In at least one embodiment, cameras with a field of view that include portions of environment in front of vehicle 1300 (e.g., front-facing cameras) may be used for surround view, to help identify forward facing paths and obstacles, as well as aid in, with help of one or more of controllers 1336 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1370 may be used to perceive objects coming into view from periphery (e.g., pedestrians, crossing traffic or bicycles). Although only one wide-view camera 1370 is illustrated in FIG. 13B, in other embodiments, there may be any number (including zero) of wide-view camera(s) 1370 on vehicle 1300. In at least one embodiment, any number of long-range camera(s) 1398 (e.g., a long-view stereo camera pair) may be used for depth-based object detection, especially for objects for which a neural network has not yet been trained. In at least one embodiment, long-range camera(s) 1398 may also be used for object detection and classification, as well as basic object tracking.

In at least one embodiment, any number of stereo camera(s) 1368 may also be included in a front-facing configuration. In at least one embodiment, one or more of stereo camera(s) 1368 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1300, including a distance estimate for all points in image. In at least one embodiment, one or more of stereo camera(s) 1368 may include, without limitation, compact stereo vision sensor(s) that may include, without limitation, two camera lenses (one each on left and right) and an image processing chip that may measure distance from vehicle 1300 to target object and use generated information (e.g., metadata) to activate autonomous emergency braking and lane departure warning functions. In at least one embodiment, other types of stereo camera(s) 1368 may be used in addition to, or alternatively from, those described herein.

In at least one embodiment, cameras with a field of view that include portions of environment to side of vehicle 1300 (e.g., side-view cameras) may be used for surround view, providing information used to create and update occupancy grid, as well as to generate side impact collision warnings. For example, in at least one embodiment, surround camera(s) 1374 (e.g., four surround cameras 1374 as illustrated in FIG. 13B) could be positioned on vehicle 1300. Surround camera(s) 1374 may include, without limitation, any number and combination of wide-view camera(s) 1370, fisheye camera(s), 360 degree camera(s), and/or like. For instance, in at least one embodiment, four fisheye cameras may be positioned on front, rear, and sides of vehicle 1300. In at least one embodiment, vehicle 1300 may use three surround camera(s) 1374 (e.g., left, right, and rear), and may leverage one or more other camera(s) (e.g., a forward-facing camera) as a fourth surround-view camera.

In at least one embodiment, cameras with a field of view that include portions of environment to rear of vehicle 1300 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s) (e.g., long-range cameras 1398 and/or mid-range camera(s) 1376, stereo camera(s) 1368), infrared camera(s) 1372, etc.), as described herein.

Inference and/or training logic 1015 are used to perform inferencing and/or training operations associated with one or more embodiments. Details regarding inference and/or training logic 1015 are provided below in conjunction with FIGS. 10 and/or 10B. In at least one embodiment, inference and/or training logic 1015 may be used in system FIG. 13B for inferencing or predicting operations based, at least in part, on weight parameters calculated using neural network training operations, neural network functions and/or architectures, or neural network use cases described herein.

Figure 13C:
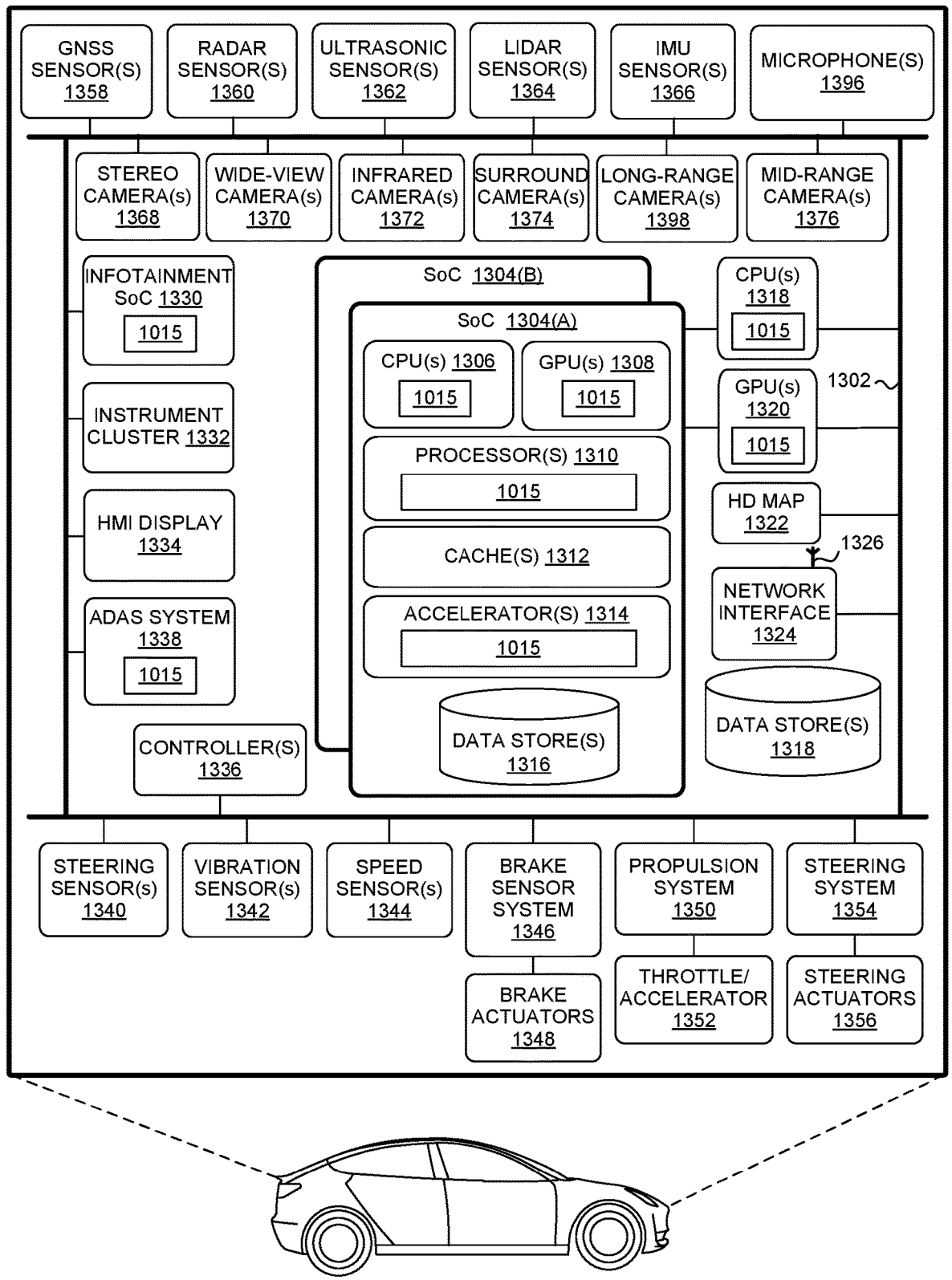
FIG. 13C is a block diagram illustrating an example system architecture for the autonomous vehicle of FIG. 13A, according to at least one embodiment.

FIG. 13C is a block diagram illustrating an example system architecture for autonomous vehicle 1300 of FIG. 13A, according to at least one embodiment. In at least one embodiment, each of components, features, and systems of vehicle 1300 in FIG. 13C are illustrated as being connected via a bus 1302. In at least one embodiment, bus 1302 may include, without limitation, a CAN data interface (alternatively referred to herein as a "CAN bus"). In at least one embodiment, a CAN may be a network inside vehicle 1300 used to aid in control of various features and functionality of vehicle 1300, such as actuation of brakes, acceleration, braking, steering, windshield wipers, etc. In at least one embodiment, bus 1302 may be configured to have dozens or even hundreds of nodes, each with its own unique identifier (e.g., a CAN ID). In at least one embodiment, bus 1302 may be read to find steering wheel angle, ground speed, engine revolutions per minute ("RPMs"), button positions, and/or other vehicle status indicators. In at least one embodiment, bus 1302 may be a CAN bus that is ASIL B compliant.

In at least one embodiment, in addition to, or alternatively from CAN, FlexRay and/or Ethernet may be used. In at least one embodiment, there may be any number of busses 1302, which may include, without limitation, zero or more CAN busses, zero or more FlexRay busses, zero or more Ethernet busses, and/or zero or more other types of busses using a different protocol. In at least one embodiment, two or more busses 1302 may be used to perform different functions, and/or may be used for redundancy. For example, a first bus 1302 may be used for collision avoidance functionality and a second bus 1302 may be used for actuation control. In at least one embodiment, each bus 1302 may communicate with any of components of vehicle 1300, and two or more busses 1302 may communicate with same components. In at least one embodiment, each of any number of system(s) on chip(s) ("SoC(s)") 1304, each of controller(s) 1336, and/or each computer within vehicle may have access to same input data (e.g., inputs from sensors of vehicle 1300), and may be connected to a common bus, such CAN bus.

In at least one embodiment, vehicle 1300 may include one or more controller(s) 1336, such as those described herein with respect to FIG. 13A. Controller(s) 1336 may be used for a variety of functions. In at least one embodiment, controller(s) 1336 may be coupled to any of various other components and systems of vehicle 1300, and may be used for control of vehicle 1300, artificial intelligence of vehicle 1300, infotainment for vehicle 1300, and/or like.

In at least one embodiment, vehicle 1300 may include any number of SoCs 1304. Each of SoCs 1304 may include, without limitation, central processing units ("CPU(s)") 1306, graphics processing units ("GPU(s)") 1308, processor(s) 1310, cache(s) 1312, accelerator(s) 1314, data store(s) 1316, and/or other components and features not illustrated. In at least one embodiment, SoC(s) 1304 may be used to control vehicle 1300 in a variety of platforms and systems. For example, in at least one embodiment, SoC(s) 1304 may be combined in a system (e.g., system of vehicle 1300) with a High Definition ("HD") map 1322 which may obtain map refreshes and/or updates via network interface 1324 from one or more servers (not shown in FIG. 13C).

In at least one embodiment, CPU(s) 1306 may include a CPU cluster or CPU complex (alternatively referred to herein as a "CCPLEX"). In at least one embodiment, CPU(s) 1306 may include multiple cores and/or level two ("L2") caches. For instance, in at least one embodiment, CPU(s) 1306 may include eight cores in a coherent multi-processor configuration. In at least one embodiment, CPU(s) 1306 may include four dual-core clusters where each cluster has a dedicated L2 cache (e.g., a 2 MB L2 cache). In at least one embodiment, CPU(s) 1306 (e.g., CCPLEX) may be configured to support simultaneous cluster operation enabling any combination of clusters of CPU(s) 1306 to be active at any given time.

In at least one embodiment, one or more of CPU(s) 1306 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1306 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1308 may include an integrated GPU (alternatively referred to herein as an "iGPU"). In at least one embodiment, GPU(s) 1308 may be programmable and may be efficient for parallel workloads. In at least one embodiment, GPU(s) 1308, in at least one embodiment, may use an enhanced tensor instruction set. In on embodiment, GPU(s) 1308 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1308 may include at least eight streaming microprocessors. In at least one embodiment, GPU(s) 1308 may use compute application programming interface(s) (API(s)). In at least one embodiment, GPU(s) 1308 may use one or more parallel computing platforms and/or programming models (e.g., NVIDIA's CUDA).

In at least one embodiment, one or more of GPU(s) 1308 may be power-optimized for best performance in automotive and embedded use cases. For example, in on embodiment, GPU(s) 1308 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 16 FP32 cores, 8 FP64 cores, 16 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1308 may include a high bandwidth memory ("HBM") and/or a 16 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1308 may include unified memory technology. In at least one embodiment, address translation services ("ATS") support may be used to allow GPU(s) 1308 to access CPU(s) 1306 page tables directly. In at least one embodiment, embodiment, when GPU(s) 1308 memory management unit ("MMU") experiences a miss, an address translation request may be transmitted to CPU(s) 1306. In response, CPU(s) 1306 may look in its page tables for virtual-to-physical mapping for address and transmits translation back to GPU(s) 1308, in at least one embodiment. In at least one embodiment, unified memory technology may allow a single unified virtual address space for memory of both CPU(s) 1306 and GPU(s) 1308, thereby simplifying GPU(s) 1308 programming and porting of applications to GPU(s) 1308.

In at least one embodiment, GPU(s) 1308 may include any number of access counters that may keep track of frequency of access of GPU(s) 1308 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1304 may include any number of cache(s) 1312, including those described herein. For example, in at least one embodiment, cache(s) 1312 could include a level three ("L3") cache that is available to both CPU(s) 1306 and GPU(s) 1308 (e.g., that is connected both CPU(s) 1306 and GPU(s) 1308). In at least one embodiment, cache(s) 1312 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1304 may include one or more accelerator(s) 1314 (e.g., hardware accelerators, software accelerators, or a combination thereof). In at least one embodiment, SoC(s) 1304 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1308 and to off-load some of tasks of GPU(s) 1308 (e.g., to free up more cycles of GPU(s) 1308 for performing other tasks). In at least one embodiment, accelerator(s) 1314 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1314 (e.g., hardware acceleration cluster) may include a deep learning accelerator(s) ("DLA). DLA(s) may include, without limitation, one or more Tensor processing units ("TPUs) that may be configured to provide an additional ten trillion operations per second for deep learning applications and inferencing. In at least one embodiment, TPUs may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1396; a CNN for facial recognition and vehicle owner identification using data from camera sensors; and/or a CNN for security and/or safety related events.

In at least one embodiment, DLA(s) may perform any function of GPU(s) 1308, and by using an inference accelerator, for example, a designer may target either DLA(s) or GPU(s) 1308 for any function. For example, in at least one embodiment, designer may focus processing of CNNs and floating point operations on DLA(s) and leave other functions to GPU(s) 1308 and/or other accelerator(s) 1314.

In at least one embodiment, accelerator(s) 1314 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1338, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1306. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU core may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1314 (e.g., hardware acceleration cluster) may include a computer vision network on-chip and static random-access memory ("SRAM"), for providing a high-bandwidth, low latency SRAM for accelerator(s) 1314. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1304 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1314 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1300, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1366 that correlates with vehicle 1300 orientation, distance, 3D location estimates of object obtained from neural network and/or other sensors (e.g., LIDAR sensor(s) 1364 or RADAR sensor(s) 1360), among others.

In at least one embodiment, one or more of SoC(s) 1304 may include data store(s) 1316 (e.g., memory). In at least one embodiment, data store(s) 1316 may be on-chip memory of SoC(s) 1304, which may store neural networks to be executed on GPU(s) 1308 and/or DLA. In at least one embodiment, data store(s) 1316 may be large enough in capacity to store multiple instances of neural networks for redundancy and safety. In at least one embodiment, data store(s) 1312 may comprise L2 or L3 cache(s).

In at least one embodiment, one or more of SoC(s) 1304 may include any number of processor(s) 1310 (e.g., embedded processors). Processor(s) 1310 may include a boot and power management processor that may be a dedicated processor and subsystem to handle boot power and management functions and related security enforcement. In at least one embodiment, boot and power management processor may be a part of SoC(s) 1304 boot sequence and may provide runtime power management services. In at least one embodiment, boot power and management processor may provide clock and voltage programming, assistance in system low power state transitions, management of SoC(s) 1304 thermals and temperature sensors, and/or management of SoC(s) 1304 power states. In at least one embodiment, each temperature sensor may be implemented as a ring-oscillator whose output frequency is proportional to temperature, and SoC(s) 1304 may use ring-oscillators to detect temperatures of CPU(s) 1306, GPU(s) 1308, and/or accelerator(s) 1314. In at least one embodiment, if temperatures are determined to exceed a threshold, then boot and power management processor may enter a temperature fault routine and put SoC(s) 1304 into a lower power state and/or put vehicle 1300 into a chauffeur to safe stop mode (e.g., bring vehicle 1300 to a safe stop).

In at least one embodiment, processor(s) 1310 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1310 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1310 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1310 may further include a real-time camera engine that may include, without limitation, a dedicated processor subsystem for handling real-time camera management. In at least one embodiment, processor(s) 1310 may further include a high-dynamic range signal processor that may include, without limitation, an image signal processor that is a hardware engine that is part of camera processing pipeline.

In at least one embodiment, processor(s) 1310 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1370, surround camera(s) 1374, and/or on in-cabin monitoring camera sensor(s). In at least one embodiment, in-cabin monitoring camera sensor(s) are preferably monitored by a neural network running on another instance of SoC 1304, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1308 are not required to continuously render new surfaces. In at least one embodiment, when GPU(s) 1308 are powered on and active doing 3D rendering, video image compositor may be used to offload GPU(s) 1308 to improve performance and responsiveness.

In at least one embodiment, one or more of SoC(s) 1304 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1304 may further include an input/output controller(s) that may be controlled by software and may be used for receiving I/O signals that are uncommitted to a specific role.

In at least one embodiment, one or more of SoC(s) 1304 may further include a broad range of peripheral interfaces to enable communication with peripherals, audio encoders/decoders ("codecs"), power management, and/or other devices. SoC(s) 1304 may be used to process data from cameras (e.g., connected over Gigabit Multimedia Serial Link and Ethernet), sensors (e.g., LIDAR sensor(s) 1364, RADAR sensor(s) 1360, etc. that may be connected over Ethernet), data from bus 1302 (e.g., speed of vehicle 1300, steering wheel position, etc.), data from GNSS sensor(s) 1358 (e.g., connected over Ethernet or CAN bus), etc. In at least one embodiment, one or more of SoC(s) 1304 may further include dedicated high-performance mass storage controllers that may include their own DMA engines, and that may be used to free CPU(s) 1306 from routine data management tasks.

In at least one embodiment, SoC(s) 1304 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1304 may be faster, more reliable, and even more energy-efficient and space-efficient than conventional systems. For example, in at least one embodiment, accelerator(s) 1314, when combined with CPU(s) 1306, GPU(s) 1308, and data store(s) 1316, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which is used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1320) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, sign itself may be identified as a traffic sign by a first deployed neural network (e.g., a neural network that has been trained), text "flashing lights indicate icy conditions" may be interpreted by a second deployed neural network, which informs vehicle's path planning software (preferably executing on CPU Complex) that when flashing lights are detected, icy conditions exist. In at least one embodiment, flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1308.

In at least one embodiment, a CNN for facial recognition and vehicle owner identification may use data from camera sensors to identify presence of an authorized driver and/or owner of vehicle 1300. In at least one embodiment, an always on sensor processing engine may be used to unlock vehicle when owner approaches driver door and turn on lights, and, in security mode, to disable vehicle when owner leaves vehicle. In this way, SoC(s) 1304 provide for security against theft and/or carjacking.

In at least one embodiment, a CNN for emergency vehicle detection and identification may use data from microphones 1396 to detect and identify emergency vehicle sirens. In at least one embodiment, SoC(s) 1304 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1358. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1362, until emergency vehicle(s) passes.

In at least one embodiment, vehicle 1300 may include CPU(s) 1318 (e.g., discrete CPU(s), or dCPU(s)), that may be coupled to SoC(s) 1304 via a high-speed interconnect (e.g., PCIe). In at least one embodiment, CPU(s) 1318 may include an X86 processor, for example. CPU(s) 1318 may be used to perform any of a variety of functions, including arbitrating potentially inconsistent results between ADAS sensors and SoC(s) 1304, and/or monitoring status and health of controller(s) 1336 and/or an infotainment system on a chip ("infotainment SoC") 1330, for example.

In at least one embodiment, vehicle 1300 may include GPU(s) 1320 (e.g., discrete GPU(s), or dGPU(s)), that may be coupled to SoC(s) 1304 via a high-speed interconnect (e.g., NVIDIA's NVLINK). In at least one embodiment, GPU(s) 1320 may provide additional artificial intelligence functionality, such as by executing redundant and/or different neural networks, and may be used to train and/or update neural networks based at least in part on input (e.g., sensor data) from sensors of vehicle 1300.

In at least one embodiment, vehicle 1300 may further include network interface 1324 which may include, without limitation, wireless antenna(s) 1326 (e.g., one or more wireless antennas 1326 for different communication protocols, such as a cellular antenna, a Bluetooth antenna, etc.). In at least one embodiment, network interface 1324 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 130 and other vehicle and/or an indirect link may be established (e.g., across networks and over Internet). In at least one embodiment, direct links may be provided using a vehicle-to-vehicle communication link. Vehicle-to-vehicle communication link may provide vehicle 1300 information about vehicles in proximity to vehicle 1300 (e.g., vehicles in front of, on side of, and/or behind vehicle 1300). In at least one embodiment, aforementioned functionality may be part of a cooperative adaptive cruise control functionality of vehicle 1300.

In at least one embodiment, network interface 1324 may include an SoC that provides modulation and demodulation functionality and enables controller(s) 1336 to communicate over wireless networks. In at least one embodiment, network interface 1324 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, Zig-Bee, LoRaWAN, and/or other wireless protocols.

In at least one embodiment, vehicle 1300 may further include data store(s) 1328 which may include, without limitation, off-chip (e.g., off SoC(s) 1304) storage. In at least one embodiment, data store(s) 1328 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1300 may further include GNSS sensor(s) 1358 (e.g., GPS and/or assisted GPS sensors), to assist in mapping, perception, occupancy grid generation, and/or path planning functions. In at least one embodiment, any number of GNSS sensor(s) 1358 may be used, including, for example and without limitation, a GPS using a USB connector with an Ethernet to Serial (e.g., RS-232) bridge.

In at least one embodiment, vehicle 1300 may further include RADAR sensor(s) 1360. RADAR sensor(s) 1360 may be used by vehicle 1300 for long-range vehicle detection, even in darkness and/or severe weather conditions. In at least one embodiment, RADAR functional safety levels may be ASIL B. RADAR sensor(s) 1360 may use CAN and/or bus 1302 (e.g., to transmit data generated by RADAR sensor(s) 1360) for control and to access object tracking data, with access to Ethernet to access raw data in some examples. In at least one embodiment, wide variety of RADAR sensor types may be used. For example, and without limitation, RADAR sensor(s) 1360 may be suitable for front, rear, and side RADAR use. In at least one embodiment, one or more of RADAR sensors(s) 1360 are Pulse Doppler RADAR sensor(s).

In at least one embodiment, RADAR sensor(s) 1360 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1360 may help in distinguishing between static and moving objects, and may be used by ADAS system 1338 for emergency brake assist and forward collision warning. Sensors 1360(s) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle's 1300 surroundings at higher speeds with minimal interference from traffic in adjacent lanes. In at least one embodiment, other two antennae may expand field of view, making it possible to quickly detect vehicles entering or leaving vehicle's 1300 lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1360 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1338 for blind spot detection and/or lane change assist.

In at least one embodiment, vehicle 1300 may further include ultrasonic sensor(s) 1362. Ultrasonic sensor(s) 1362, which may be positioned at front, back, and/or sides of vehicle 1300, may be used for park assist and/or to create and update an occupancy grid. In at least one embodiment, a wide variety of ultrasonic sensor(s) 1362 may be used, and different ultrasonic sensor(s) 1362 may be used for different ranges of detection (e.g., 2.5 m, 4 m). In at least one embodiment, ultrasonic sensor(s) 1362 may operate at functional safety levels of ASIL B.

In at least one embodiment, vehicle 1300 may include LIDAR sensor(s) 1364. LIDAR sensor(s) 1364 may be used for object and pedestrian detection, emergency braking, collision avoidance, and/or other functions. In at least one embodiment, LIDAR sensor(s) 1364 may be functional safety level ASIL B. In at least one embodiment, vehicle 1300 may include multiple LIDAR sensors 1364 (e.g., two, four, six, etc.) that may use Ethernet (e.g., to provide data to a Gigabit Ethernet switch).

In at least one embodiment, LIDAR sensor(s) 1364 may be capable of providing a list of objects and their distances for a 360-degree field of view. In at least one embodiment, commercially available LIDAR sensor(s) 1364 may have an advertised range of approximately 100 m, with an accuracy of 2 cm-3 cm, and with support for a 100 Mbps Ethernet connection, for example. In at least one embodiment, one or more non-protruding LIDAR sensors 1364 may be used. In such an embodiment, LIDAR sensor(s) 1364 may be implemented as a small device that may be embedded into front, rear, sides, and/or corners of vehicle 1300. In at least one embodiment, LIDAR sensor(s) 1364, in such an embodiment, may provide up to a 120-degree horizontal and 35-degree vertical field-of-view, with a 200 m range even for low-reflectivity objects. In at least one embodiment, front-mounted LIDAR sensor(s) 1364 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1300 up to approximately 200 m. In at least one embodiment, a flash LIDAR unit includes, without limitation, a receptor, which records laser pulse transit time and reflected light on each pixel, which in turn corresponds to range from vehicle 1300 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1300. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device may use a 5 nanosecond class I (eye-safe) laser pulse per frame and may capture reflected laser light in form of 3D range point clouds and co-registered intensity data.

In at least one embodiment, vehicle may further include IMU sensor(s) 1366. In at least one embodiment, IMU sensor(s) 1366 may be located at a center of rear axle of vehicle 1300, in at least one embodiment. In at least one embodiment, IMU sensor(s) 1366 may include, for example and without limitation, accelerometer(s), magnetometer(s), gyroscope(s), magnetic compass(es), and/or other sensor types. In at least one embodiment, such as in six-axis applications, IMU sensor(s) 1366 may include, without limitation, accelerometers and gyroscopes. In at least one embodiment, such as in nine-axis applications, IMU sensor(s) 1366 may include, without limitation, accelerometers, gyroscopes, and magnetometers.

In at least one embodiment, IMU sensor(s) 1366 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1366 may enable vehicle 1300 to estimate heading without requiring input from a magnetic sensor by directly observing and correlating changes in velocity from GPS to IMU sensor(s) 1366. In at least one embodiment, IMU sensor(s) 1366 and GNSS sensor(s) 1358 may be combined in a single integrated unit.

In at least one embodiment, vehicle 1300 may include microphone(s) 1396 placed in and/or around vehicle 1300. In at least one embodiment, microphone(s) 1396 may be used for emergency vehicle detection and identification, among other things.

In at least one embodiment, vehicle 1300 may further include any number of camera types, including stereo camera(s) 1368, wide-view camera(s) 1370, infrared camera(s) 1372, surround camera(s) 1374, long-range camera(s) 1398, mid-range camera(s) 1376, and/or other camera types. In at least one embodiment, cameras may be used to capture image data around an entire periphery of vehicle 1300. In at least one embodiment, types of cameras used depends vehicle 1300. In at least one embodiment, any combination of camera types may be used to provide necessary coverage around vehicle 1300. In at least one embodiment, number of cameras may differ depending on embodiment. For example, in at least one embodiment, vehicle 1300 could include six cameras, seven cameras, ten cameras, twelve cameras, or another number of cameras. cameras may support, as an example and without limitation, Gigabit Multimedia Serial Link ("GMSL") and/or Gigabit Ethernet. In at least one embodiment, each of camera(s) is described with more detail previously herein with respect to FIG. 13A and FIG. 13B.

In at least one embodiment, vehicle 1300 may further include vibration sensor(s) 1342. vibration sensor(s) 1342 may measure vibrations of components of vehicle 1300, such as axle(s). For example, in at least one embodiment, changes in vibrations may indicate a change in road surfaces. In at least one embodiment, when two or more vibration sensors 1342 are used, differences between vibrations may be used to determine friction or slippage of road surface (e.g., when difference in vibration is between a power-driven axle and a freely rotating axle).

In at least one embodiment, vehicle 1300 may include ADAS system 1338. ADAS system 1338 may include, without limitation, an SoC, in some examples. In at least one embodiment, ADAS system 1338 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW)" system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1360, LIDAR sensor(s) 1364, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1300 and automatically adjust speed of vehicle 1300 to maintain a safe distance from vehicles ahead. In at least one embodiment, lateral ACC system performs distance keeping, and advises vehicle 1300 to change lanes when necessary. In at least one embodiment, lateral ACC is related to other ADAS applications such as LC and CW.

In at least one embodiment, CACC system uses information from other vehicles that may be received via network interface 1324 and/or wireless antenna(s) 1326 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1300), while I2V communication concept provides information about traffic further ahead. In at least one embodiment, CACC system may include either or both I2V and V2V information sources. In at least one embodiment, given information of vehicles ahead of vehicle 1300, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1360, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1360, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1300 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1300 if vehicle 1300 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1360, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1300 is backing up. In at least one embodiment, RCTW system includes AEB system to ensure that vehicle brakes are applied to avoid a crash. In at least one embodiment, RCTW system may use one or more rear-facing RADAR sensor(s) 1360, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1300 itself decides, in case of conflicting results, whether to heed result from a primary computer or a secondary computer (e.g., first controller 1336 or second controller 1336). For example, in at least one embodiment, ADAS system 1338 may be a backup and/or secondary computer for providing perception information to a backup computer rationality module. In at least one embodiment, backup computer rationality monitor may run redundant diverse software on hardware components to detect faults in perception and dynamic driving tasks. In at least one embodiment, outputs from ADAS system 1338 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment where the confidence score does not meet the relevant threshold, and where a primary and secondary computer indicate different results (e.g., a conflict), a supervisory MCU may arbitrate between computers to determine the appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1304.

In at least one embodiment, ADAS system 1338 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1338 may be fed into primary computer's perception block and/or primary computer's dynamic driving task block. For example, in at least one embodiment, if ADAS system 1338 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1300 may further include infotainment SoC 1330 (e.g., an in-vehicle infotainment system (IVI)). Although illustrated and described as an SoC, infotainment system 1330, in at least one embodiment, may not be an SoC, and may include, without limitation, two or more discrete components. In at least one embodiment, infotainment SoC 1330 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, Wi-Fi, etc.), and/or information services (e.g., navigation systems, rear-parking assistance, a radio data system, vehicle related information such as fuel level, total distance covered, brake fuel level, oil level, door open/close, air filter information, etc.) to vehicle 1300. For example, infotainment SoC 1330 could include radios, disk players, navigation systems, video players, USB and Bluetooth connectivity, carputers, in-car entertainment, Wi-Fi, steering wheel audio controls, hands free voice control, a heads-up display ("HUD"), HMI display 1334, a telematics device, a control panel (e.g., for controlling and/or interacting with various components, features, and/or systems), and/or other components. In at least one embodiment, infotainment SoC 1330 may further be used to provide information (e.g., visual and/or audible) to user(s) of vehicle, such as information from ADAS system 1338, autonomous driving information such as planned vehicle maneuvers, trajectories, surrounding environment information (e.g., intersection information, vehicle information, road information, etc.), and/or other information.

In at least one embodiment, infotainment SoC 1330 may include any amount and type of GPU functionality. In at least one embodiment, infotainment SoC 1330 may communicate over bus 1302 (e.g., CAN bus, Ethernet, etc.) with other devices, systems, and/or components of vehicle 1300. In at least one embodiment, infotainment SoC 1330 may be coupled to a supervisory MCU such that GPU of infotainment system may perform some self-driving functions in event that primary controller(s) 1336 (e.g., primary and/or backup computers of vehicle 1300) fail. In at least one embodiment, infotainment SoC 1330 may put vehicle 1300 into a chauffeur to safe stop mode, as described herein.

In at least one embodiment, vehicle 1300 may further include instrument cluster 1332 (e.g., a digital dash, an electronic instrument cluster, a digital instrument panel, etc.). Instrument cluster 1332 may include, without limitation, a controller and/or supercomputer (e.g., a discrete controller or supercomputer). In at least one embodiment, instrument cluster 1332 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1330 and instrument cluster 1332. In at least one embodiment, instrument cluster 1332 may be included as part of infotainment SoC 1330, or vice versa.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 13C for inferencing or predicting operations based, at least in part, on weight parameters calculated using neural network training operations, neural network functions and/or architectures, or neural network use cases described herein.

Figure 13D:
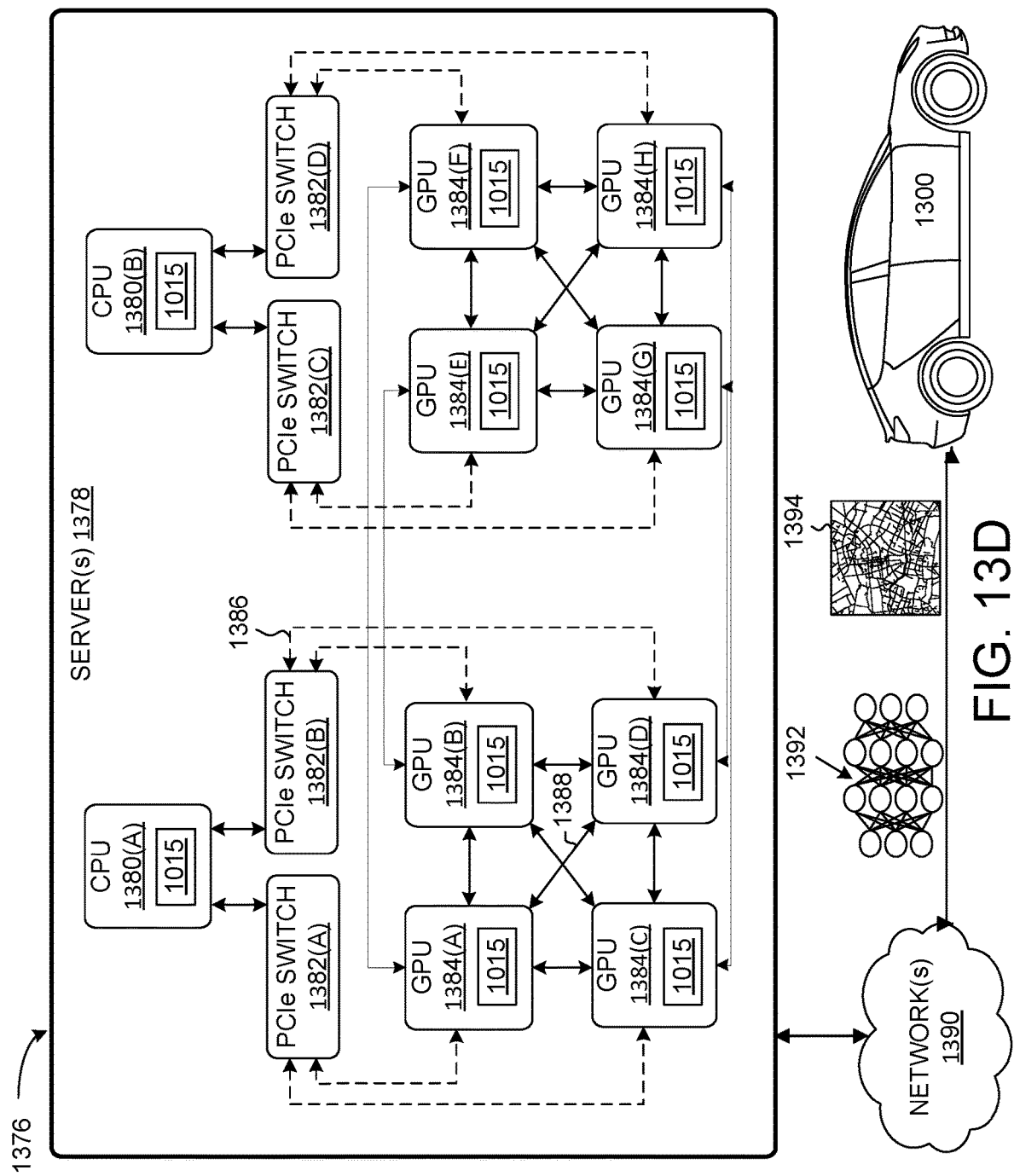
FIG. 13D is a diagram illustrating a system for communication between cloud-based server(s) and the autonomous vehicle of FIG. 13A, according to at least one embodiment.

FIG. 13D is a diagram of a system 1376 for communication between cloud-based server(s) and autonomous vehicle 1300 of FIG. 13A, according to at least one embodiment. In at least one embodiment, system 1376 may include, without limitation, server(s) 1378, network(s) 1390, and any number and type of vehicles, including vehicle 1300. server(s) 1378 may include, without limitation, a plurality of GPUs 1384(A)-1384(H) (collectively referred to herein as GPUs 1384), PCIe switches 1382(A)-1382(H) (collectively referred to herein as PCIe switches 1382), and/or CPUs 1380(A)-1380(B) (collectively referred to herein as CPUs 1380). GPUs 1384, CPUs 1380, and PCIe switches 1382 may be interconnected with high-speed interconnects such as, for example and without limitation, NVLink interfaces 1388 developed by NVIDIA and/or PCIe connections 1386. In at least one embodiment, GPUs 1384 are connected via an NVLink and/or NVSwitch SoC and GPUs 1384 and PCIe switches 1382 are connected via PCIe interconnects. In at least one embodiment, although eight GPUs 1384, two CPUs 1380, and four PCIe switches 1382 are illustrated, this is not intended to be limiting. In at least one embodiment, each of server(s) 1378 may include, without limitation, any number of GPUs 1384, CPUs 1380, and/or PCIe switches 1382, in any combination. For example, in at least one embodiment, server(s) 1378 could each include eight, sixteen, thirty-two, and/or more GPUs 1384.

In at least one embodiment, server(s) 1378 may receive, over network(s) 1390 and from vehicles, image data representative of images showing unexpected or changed road conditions, such as recently commenced road-work. In at least one embodiment, server(s) 1378 may transmit, over network(s) 1390 and to vehicles, neural networks 1392, updated neural networks 1392, and/or map information 1394, including, without limitation, information regarding traffic and road conditions. In at least one embodiment, updates to map information 1394 may include, without limitation, updates for HD map 1322, such as information regarding construction sites, potholes, detours, flooding, and/or other obstructions. In at least one embodiment, neural networks 1392, updated neural networks 1392, and/or map information 1394 may have resulted from new training and/or experiences represented in data received from any number of vehicles in environment, and/or based at least in part on training performed at a data center (e.g., using server(s) 1378 and/or other servers).

In at least one embodiment, server(s) 1378 may be used to train machine learning models (e.g., neural networks) based at least in part on training data. training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1390, and/or machine learning models may be used by server(s) 1378 to remotely monitor vehicles.

In at least one embodiment, server(s) 1378 may receive data from vehicles and apply data to up-to-date real-time neural networks for real-time intelligent inferencing. In at least one embodiment, server(s) 1378 may include deep-learning supercomputers and/or dedicated AI computers powered by GPU(s) 1384, such as a DGX and DGX Station machines developed by NVIDIA. However, in at least one embodiment, server(s) 1378 may include deep learning infrastructure that use CPU-powered data centers.

In at least one embodiment, deep-learning infrastructure of server(s) 1378 may be capable of fast, real-time inferencing, and may use that capability to evaluate and verify health of processors, software, and/or associated hardware in vehicle 1300. For example, in at least one embodiment, deep-learning infrastructure may receive periodic updates from vehicle 1300, such as a sequence of images and/or objects that vehicle 1300 has located in that sequence of images (e.g., via computer vision and/or other machine learning object classification techniques). In at least one embodiment, deep-learning infrastructure may run its own neural network to identify objects and compare them with objects identified by vehicle 1300 and, if results do not match and deep-learning infrastructure concludes that AI in vehicle 1300 is malfunctioning, then server(s) 1378 may transmit a signal to vehicle 1300 instructing a fail-safe computer of vehicle 1300 to assume control, notify passengers, and complete a safe parking maneuver.

In at least one embodiment, server(s) 1378 may include GPU(s) 1384 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing. In at least one embodiment, hardware structure(s) 1015 are used to perform one or more embodiments. Details regarding hardware structure(x) 1015 are provided below in conjunction with FIGS. 10A and/or 10B.

Computer Systems

Figure 14:
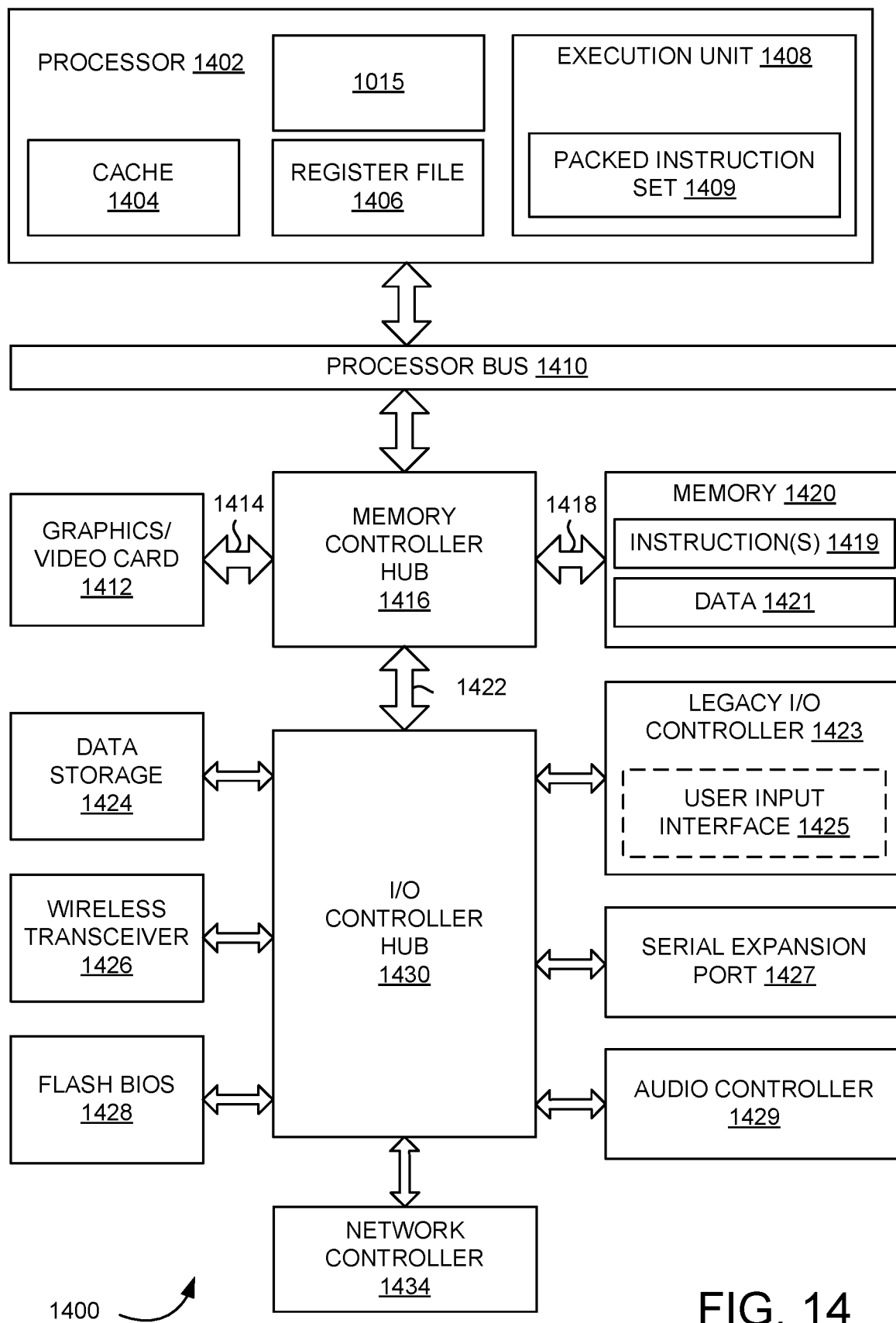
FIG. 14 is a block diagram illustrating a computer system, according to at least one embodiment.

FIG. 14 is a block diagram illustrating an exemplary computer system, which may be a system with interconnected devices and components, a system-on-a-chip (SOC) or some combination thereof 1400 formed with a processor that may include execution units to execute an instruction, according to at least one embodiment. In at least one embodiment, computer system 1400 may include, without limitation, a component, such as a processor 1402 to employ execution units including logic to perform algorithms for process data, in accordance with present disclosure, such as in embodiment described herein. In at least one embodiment, computer system 1400 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 1400 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 1400 may include, without limitation, processor 1402 that may include, without limitation, one or more execution units 1408 to perform machine learning model training and/or inferencing according to techniques described herein. In at least one embodiment, system 14A is a single processor desktop or server system, but in another embodiment system 14A may be a multiprocessor system. In at least one embodiment, processor 1402 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 1402 may be coupled to a processor bus 1410 that may transmit data signals between processor 1402 and other components in computer system 1400.

In at least one embodiment, processor 1402 may include, without limitation, a Level 1 ("L1") internal cache memory ("cache") 1404. In at least one embodiment, processor 1402 may have a single internal cache or multiple levels of internal cache. In at least one embodiment, cache memory may reside external to processor 1402. Other embodiments may also include a combination of both internal and external caches depending on particular implementation and needs. In at least one embodiment, register file 1406 may store different types of data in various registers including, without limitation, integer registers, floating point registers, status registers, and instruction pointer register.

In at least one embodiment, execution unit 1408, including, without limitation, logic to perform integer and floating point operations, also resides in processor 1402. Processor 1402 may also include a microcode ("ucode") read only memory ("ROM") that stores microcode for certain macro instructions. In at least one embodiment, execution unit 1408 may include logic to handle a packed instruction set 1409. In at least one embodiment, by including packed instruction set 1409 in instruction set of a general-purpose processor 1402, along with associated circuitry to execute instructions, operations used by many multimedia applications may be performed using packed data in a general-purpose processor 1402. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 1408 may also be used in microcontrollers, embedded processors, graphics devices, DSPs, and other types of logic circuits. In at least one embodiment, computer system 1400 may include, without limitation, a memory 1420. In at least one embodiment, memory 1420 may be implemented as a Dynamic Random Access Memory ("DRAM") device, a Static Random Access Memory ("SRAM") device, flash memory device, or other memory device. Memory 1420 may store instruction(s) 1419 and/or data 1421 represented by data signals that may be executed by processor 1402.

In at least one embodiment, system logic chip may be coupled to processor bus 1410 and memory 1420. In at least one embodiment, system logic chip may include, without limitation, a memory controller hub ("MCH") 1416, and processor 1402 may communicate with MCH 1416 via processor bus 1410. In at least one embodiment, MCH 1416 may provide a high bandwidth memory path 1418 to memory 1420 for instruction and data storage and for storage of graphics commands, data and textures. In at least one embodiment, MCH 1416 may direct data signals between processor 1402, memory 1420, and other components in computer system 1400 and to bridge data signals between processor bus 1410, memory 1420, and a system I/O 1422. In at least one embodiment, system logic chip may provide a graphics port for coupling to a graphics controller. In at least one embodiment, MCH 1416 may be coupled to memory 1420 through a high bandwidth memory path 1418 and graphics/video card 1412 may be coupled to MCH 1416 through an Accelerated Graphics Port ("AGP") interconnect 1414.

In at least one embodiment, computer system 1400 may use system I/O 1422 that is a proprietary hub interface bus to couple MCH 1416 to I/O controller hub ("ICH") 1430. In at least one embodiment, ICH 1430 may provide direct connections to some I/O devices via a local I/O bus. In at least one embodiment, local I/O bus may include, without limitation, a high-speed I/O bus for connecting peripherals to memory 1420, chipset, and processor 1402. Examples may include, without limitation, an audio controller 1429, a firmware hub ("flash BIOS") 1428, a wireless transceiver 1426, a data storage 1424, a legacy I/O controller 1423 containing user input and keyboard interfaces, a serial expansion port 1427, such as Universal Serial Bus ("USB"), and a network controller 1434. Data storage 1424 may comprise a hard disk drive, a floppy disk drive, a CD-ROM device, a flash memory device, or other mass storage device.

In at least one embodiment, FIG. 14A illustrates a system, which includes interconnected hardware devices or "chips", whereas in other embodiments, FIG. 14A may illustrate an exemplary System on a Chip ("SoC"). In at least one embodiment, devices illustrated in FIG. 14A may be interconnected with proprietary interconnects, standardized interconnects (e.g., PCIe) or some combination thereof. In at least one embodiment, one or more components of system 1400 are interconnected using compute express link (CXL) interconnects.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 14A for inferencing or predicting operations based, at least in part, on weight parameters calculated using neural network training operations, neural network functions and/or architectures, or neural network use cases described herein.

In some embodiments, the video data stream may be received over an expansion port 1427 or wireless transceiver 1426, for example, then directed to the processor 1402 and/or video graphics card 1412 for processing. Depending on whether the components are part of a device such as an autonomous vehicle or a separate device, the output could then go to a control system via the I/O or transmitted to the vehicle via the wireless transceiver, among other such options.

Figure 15:
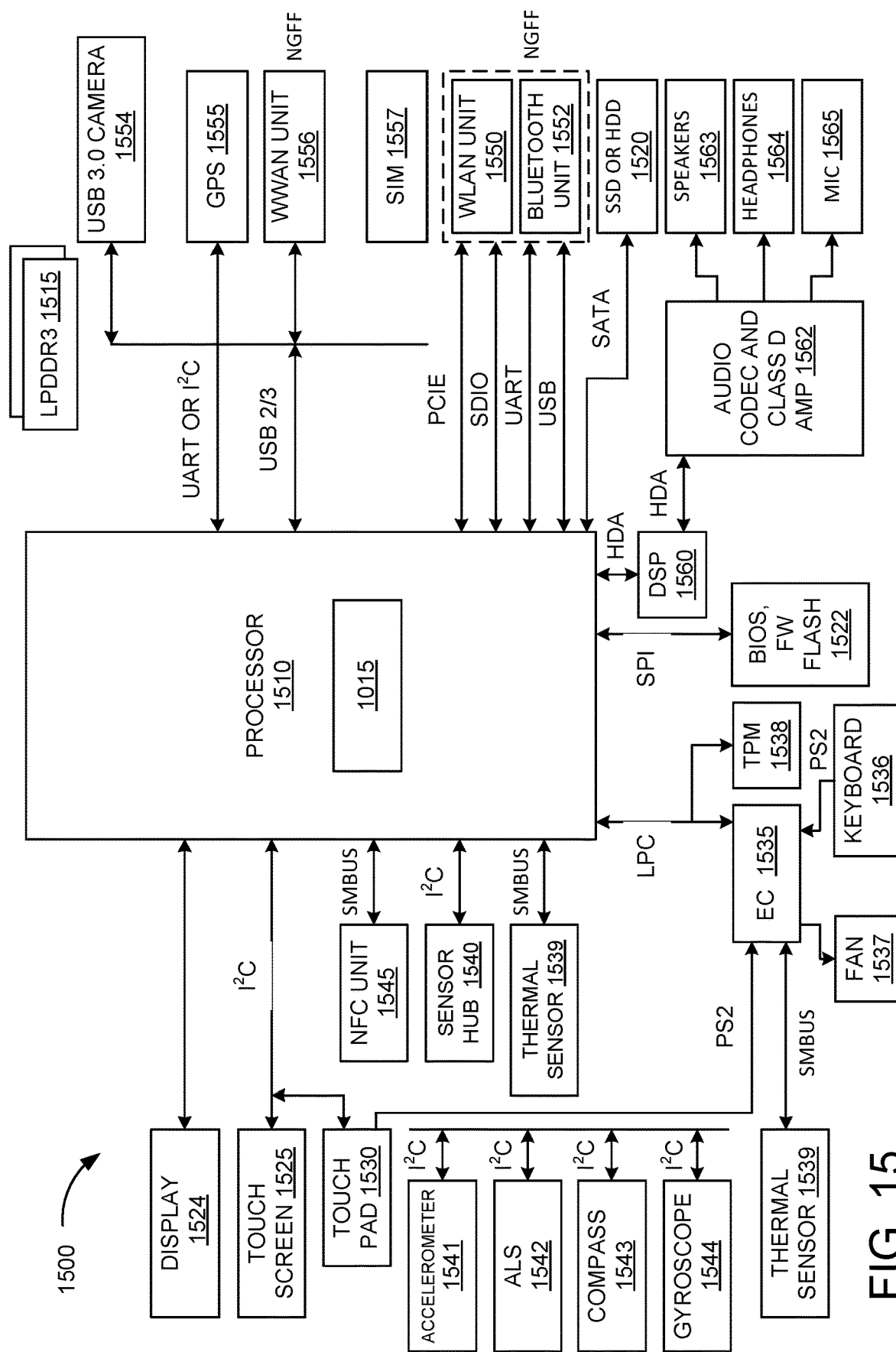
FIG. 15 is a block diagram illustrating computer system, according to at least one embodiment.

FIG. 15 is a block diagram illustrating an electronic device 1500 for utilizing a processor 1510, according to at least one embodiment. In at least one embodiment, electronic device 1500 may be, for example and without limitation, a notebook, a tower server, a rack server, a blade server, a laptop, a desktop, a tablet, a mobile device, a phone, an embedded computer, or any other suitable electronic device.

In at least one embodiment, system 1500 may include, without limitation, processor 1510 communicatively coupled to any suitable number or kind of components, peripherals, modules, or devices. In at least one embodiment, processor 1510 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 15 illustrates a system, which includes interconnected hardware devices or "chips", whereas in other embodiments, FIG. 15 may illustrate an exemplary System on a Chip ("SoC"). In at least one embodiment, devices illustrated in FIG. 15 may be interconnected with proprietary interconnects, standardized interconnects (e.g., PCIe) or some combination thereof. In at least one embodiment, one or more components of FIG. 15 are interconnected using compute express link (CXL) interconnects.

In at least one embodiment, FIG. 15 may include a display 1524, a touch screen 1525, a touch pad 1530, a Near Field Communications unit ("NFC") 1545, a sensor hub 1540, a thermal sensor 1546, an Express Chipset ("EC") 1535, a Trusted Platform Module ("TPM") 1538, BIOS/firmware/flash memory ("BIOS, FW Flash") 1522, a DSP 1560, a drive "SSD or HDD") 1520 such as a Solid State Disk ("SSD") or a Hard Disk Drive ("HDD"), a wireless local area network unit ("WLAN") 1550, a Bluetooth unit 1552, a Wireless Wide Area Network unit ("WWAN") 1556, a Global Positioning System (GPS) 1555, a camera ("USB 3.0 camera") 1554 such as a USB 3.0 camera, or a Low Power Double Data Rate ("LPDDR") memory unit ("LPDDR3") 1515 implemented in, for example, LPDDR3 standard. These components may each be implemented in any suitable manner.

In at least one embodiment, other components may be communicatively coupled to processor 1510 through components discussed above. In at least one embodiment, an accelerometer 1541, Ambient Light Sensor ("ALS") 1542, compass 1543, and a gyroscope 1544 may be communicatively coupled to sensor hub 1540. In at least one embodiment, thermal sensor 1539, a fan 1537, a keyboard 1546, and a touch pad 1530 may be communicatively coupled to EC 1535. In at least one embodiment, speaker 1563, a headphones 1564, and a microphone ("mic") 1565 may be communicatively coupled to an audio unit ("audio codec and class d amp") 1564, which may in turn be communicatively coupled to DSP 1560. In at least one embodiment, audio unit 1564 may include, for example and without limitation, an audio coder/decoder ("codec") and a class D amplifier. In at least one embodiment, SIM card ("SIM") 1557 may be communicatively coupled to WWAN unit 1556. In at least one embodiment, components such as WLAN unit 1550 and Bluetooth unit 1552, as well as WWAN unit 1556 may be implemented in a Next Generation Form Factor ("NGFF").

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 15 for inferencing or predicting operations based, at least in part, on weight parameters calculated using neural network training operations, neural network functions and/or architectures, or neural network use cases described herein.

Figure 16:
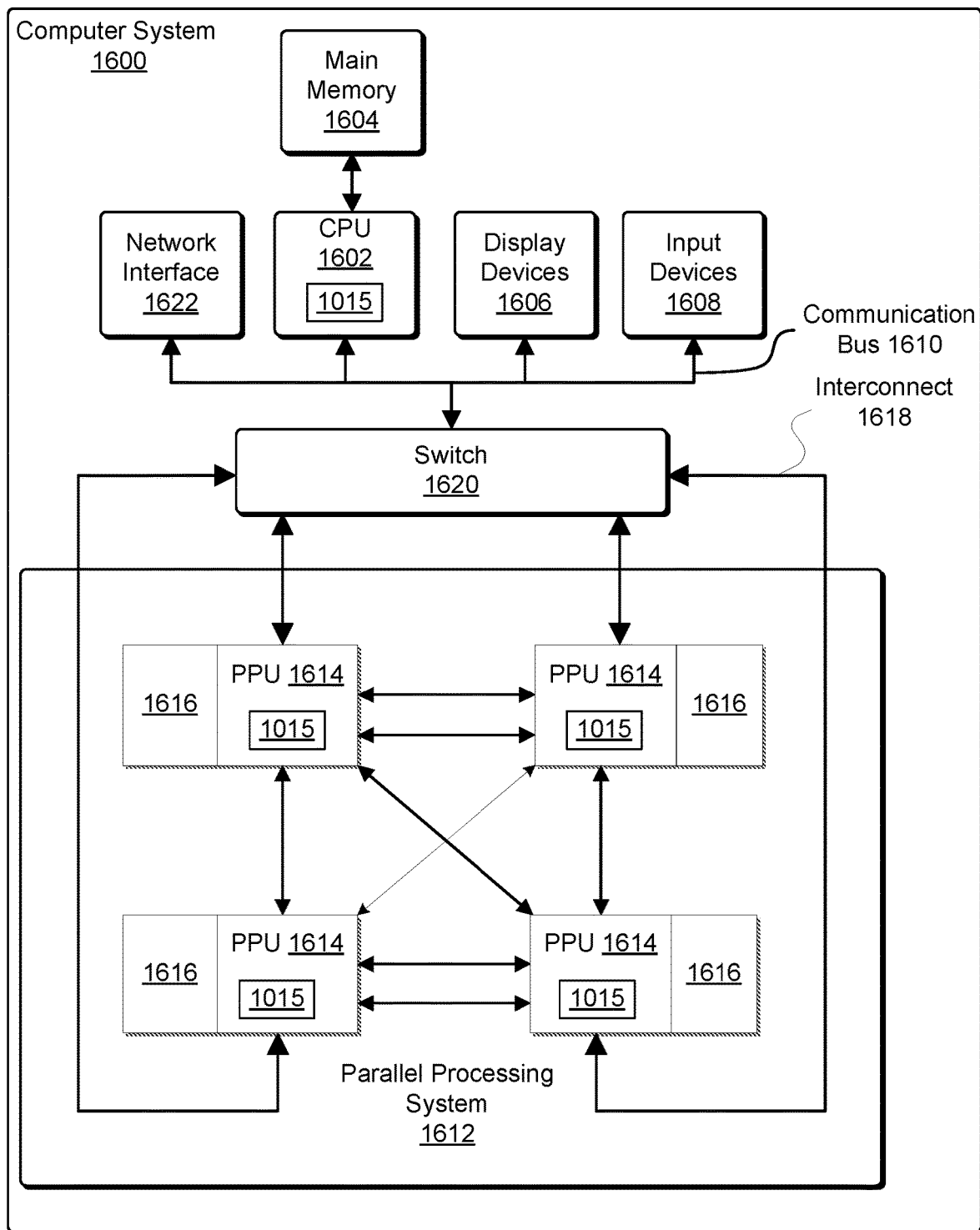
FIG. 16 illustrates a computer system, according to at least one embodiment.

FIG. 16 illustrates a computer system 1600, according to at least one embodiment. In at least one embodiment, computer system 1600 is configured to implement various processes and methods described throughout this disclosure.

In at least one embodiment, computer system 1600 comprises, without limitation, at least one central processing unit ("CPU") 1602 that is connected to a communication bus 1610 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1600 includes, without limitation, a main memory 1604 and control logic (e.g., implemented as hardware, software, or a combination thereof) and data are stored in main memory 1604 which may take form of random access memory ("RAM"). In at least one embodiment, a network interface subsystem ("network interface") 1622 provides an interface to other computing devices and networks for receiving data from and transmitting data to other systems from computer system 1600.

In at least one embodiment, computer system 1600, in at least one embodiment, includes, without limitation, input devices 1608, parallel processing system 1612, and display devices 1606 which can be implemented using a conventional cathode ray tube ("CRT"), liquid crystal display ("LCD"), light emitting diode ("LED"), plasma display, or other suitable display technologies. In at least one embodiment, user input is received from input devices 1608 such as keyboard, mouse, touchpad, microphone, and more. In at least one embodiment, each of foregoing modules can be situated on a single semiconductor platform to form a processing system.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 16 for inferencing or predicting operations based, at least in part, on weight parameters calculated using neural network training operations, neural network functions and/or architectures, or neural network use cases described herein.

Figure 17:
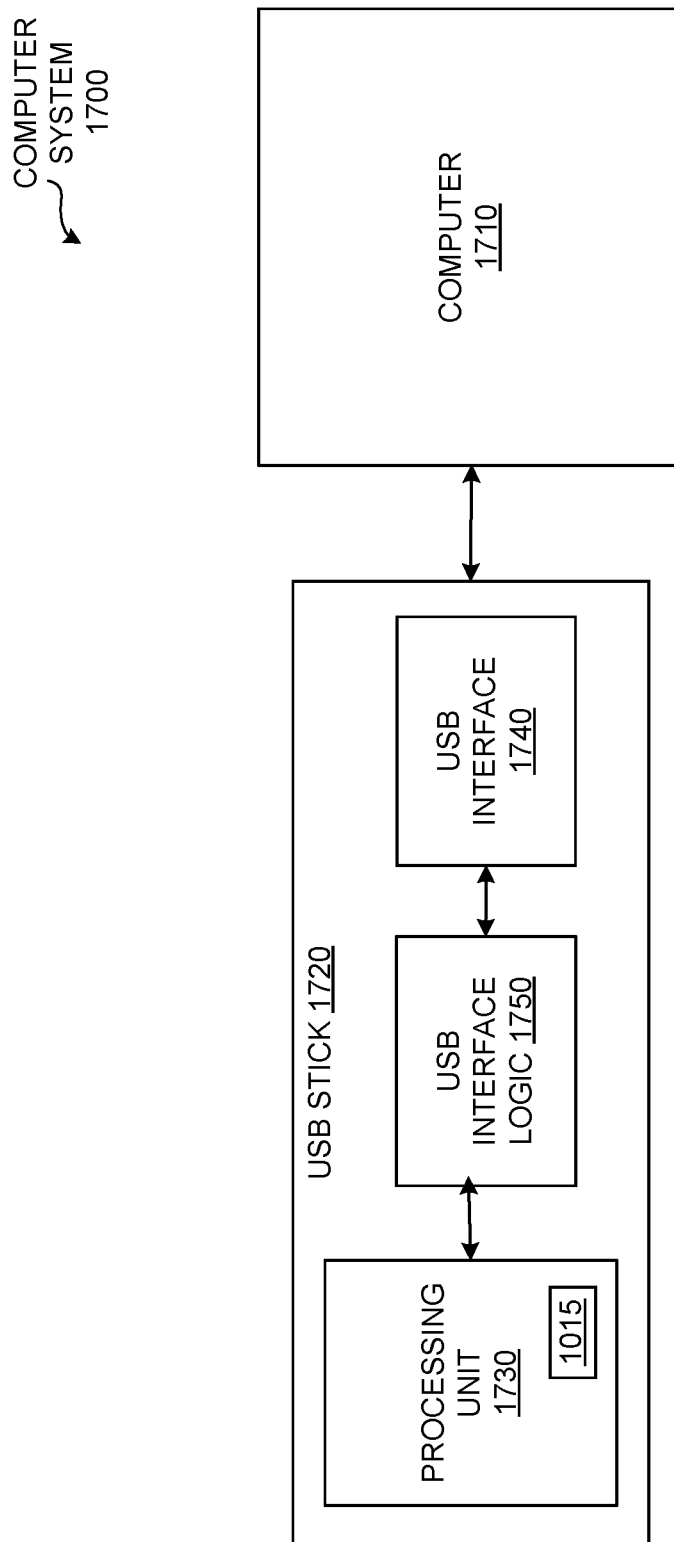
FIG. 17 illustrates a computer system, according at least one embodiment.

FIG. 17 illustrates a computer system 1700, according to at least one embodiment. In at least one embodiment, computer system 1700 includes, without limitation, a computer 1710 and a USB stick 1720. In at least one embodiment, computer 1710 may include, without limitation, any number and type of processor(s) (not shown) and a memory (not shown). In at least one embodiment, computer 1710 includes, without limitation, a server, a cloud instance, a laptop, and a desktop computer.

In at least one embodiment, USB stick 1720 includes, without limitation, a processing unit 1730, a USB interface 1740, and USB interface logic 1750. In at least one embodiment, processing unit 1730 may be any instruction execution system, apparatus, or device capable of executing instructions. In at least one embodiment, processing unit 1730 may include, without limitation, any number and type of processing cores (not shown). In at least one embodiment, processing core 1730 comprises an application specific integrated circuit ("ASIC") that is optimized to perform any amount and type of operations associated with machine learning. For instance, in at least one embodiment, processing core 1730 is a tensor processing unit ("TPC") that is optimized to perform machine learning inference operations. In at least one embodiment, processing core 1730 is a vision processing unit ("VPU") that is optimized to perform machine vision and machine learning inference operations.

In at least one embodiment, USB interface 1740 may be any type of USB connector or USB socket. For instance, in at least one embodiment, USB interface 1740 is a USB 3.0 Type-C socket for data and power. In at least one embodiment, USB interface 1740 is a USB 3.0 Type-A connector. In at least one embodiment, USB interface logic 1750 may include any amount and type of logic that enables processing unit 1730 to interface with or devices (e.g., computer 1710) via USB connector 1740.

Inference and/or training logic 1015 are used to perform inferencing and/or training operations associated with one or more embodiments. Details regarding inference and/or training logic 1015 are provided below in conjunction with FIGS. 10 and/or 10B. In at least one embodiment, inference and/or training logic 1015 may be used in system FIG. 17 for inferencing or predicting operations based, at least in part, on weight parameters calculated using neural network training operations, neural network functions and/or architectures, or neural network use cases described herein.

Figure 18:
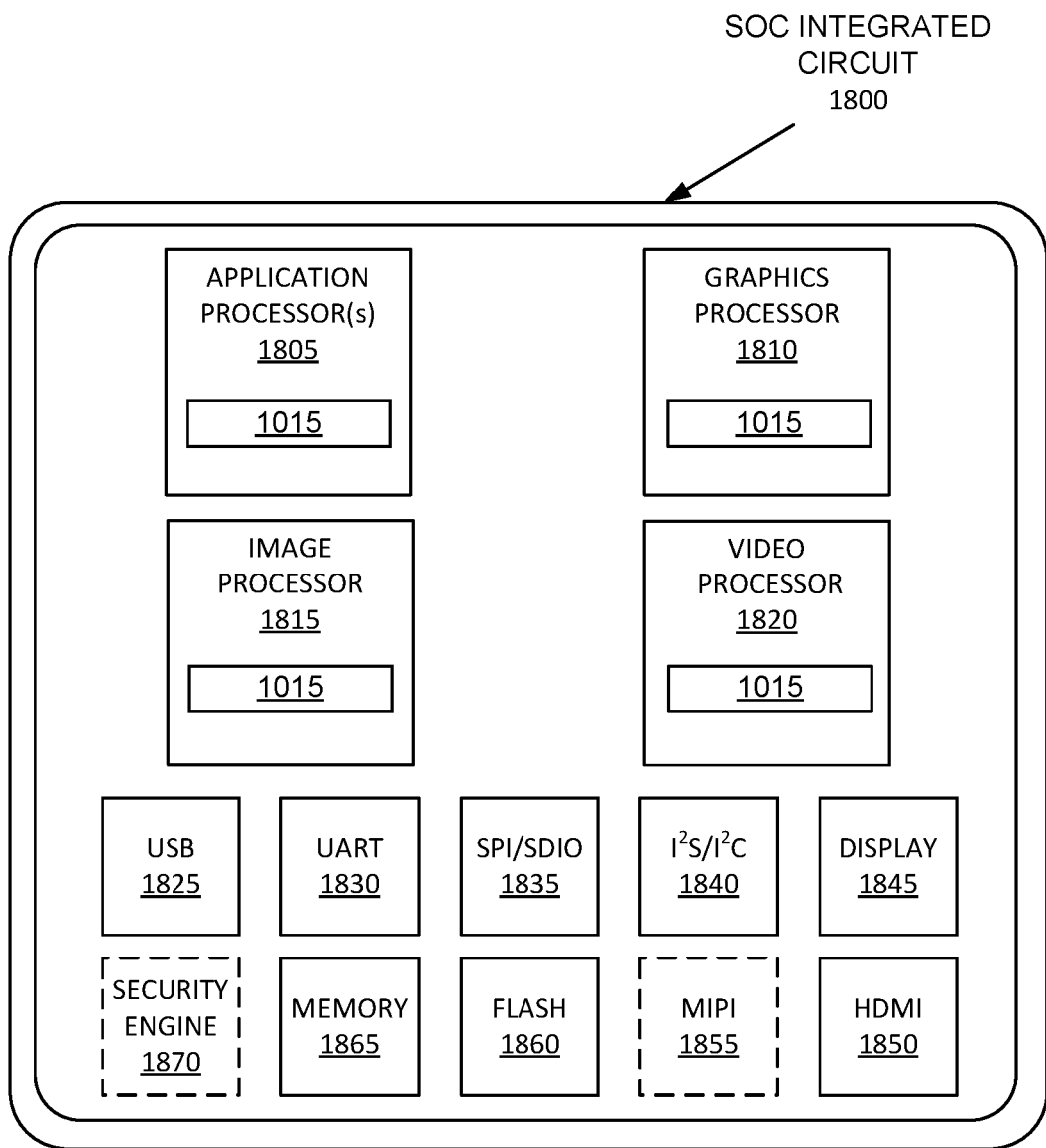
FIG. 18 illustrates exemplary integrated circuits and associated graphics processors that may be fabricated using one or more IP cores, according to various embodiments described herein.

FIG. 18 illustrates exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIG. 18 is a block diagram illustrating an exemplary system on a chip integrated circuit 1800 that may be fabricated using one or more IP cores, according to at least one embodiment. In at least one embodiment, integrated circuit 1800 includes one or more application processor(s) 1805 (e.g., CPUs), at least one graphics processor 1810, and may additionally include an image processor 1815 and/or a video processor 1820, any of which may be a modular IP core. In at least one embodiment, integrated circuit 1800 includes peripheral or bus logic including a USB controller 1825, UART controller 1830, an SPI/SDIO controller 1835, and an I.sup.2S/I.sup.2C controller 1840. In at least one embodiment, integrated circuit 1800 can include a display device 1845 coupled to one or more of a high-definition multimedia interface (HDMI) controller 1850 and a mobile industry processor interface (MIPI) display interface 1855. In at least one embodiment, storage may be provided by a flash memory subsystem 1860 including flash memory and a flash memory controller. In at least one embodiment, memory interface may be provided via a memory controller 1865 for access to SDRAM or SRAM memory devices. In at least one embodiment, some integrated circuits additionally include an embedded security engine 1870.

Inference and/or training logic 1015 are used to perform inferencing and/or training operations associated with one or more embodiments. Details regarding inference and/or training logic 1015 are provided below in conjunction with FIGS. 10 and/or 10B. In at least one embodiment, inference and/or training logic 1015 may be used in integrated circuit 1800 for inferencing or predicting operations based, at least in part, on weight parameters calculated using neural network training operations, neural network functions and/or architectures, or neural network use cases described herein.

For example, the inference and/or training logic 1015 can accept an input video stream and generate inferences for objects represented in the video stream as discussed herein. The image processor 1815 can be used to process video frames as they are received, in at least some embodiments.

Figure 19A:
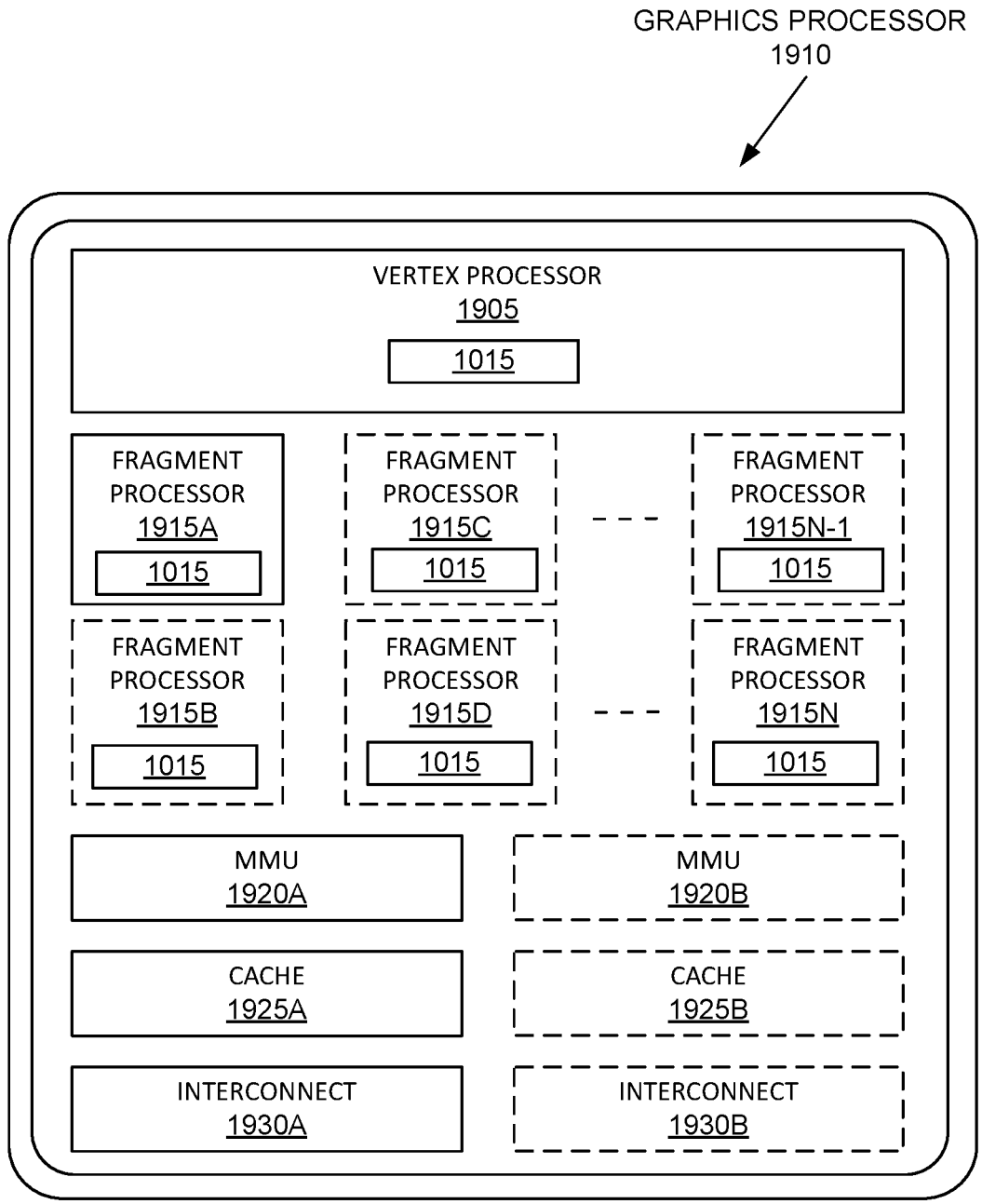
FIGS. 19A-19B illustrate exemplary integrated circuits and associated graphics processors that may be fabricated using one or more IP cores, according to various embodiments described herein.
Figure 19B:
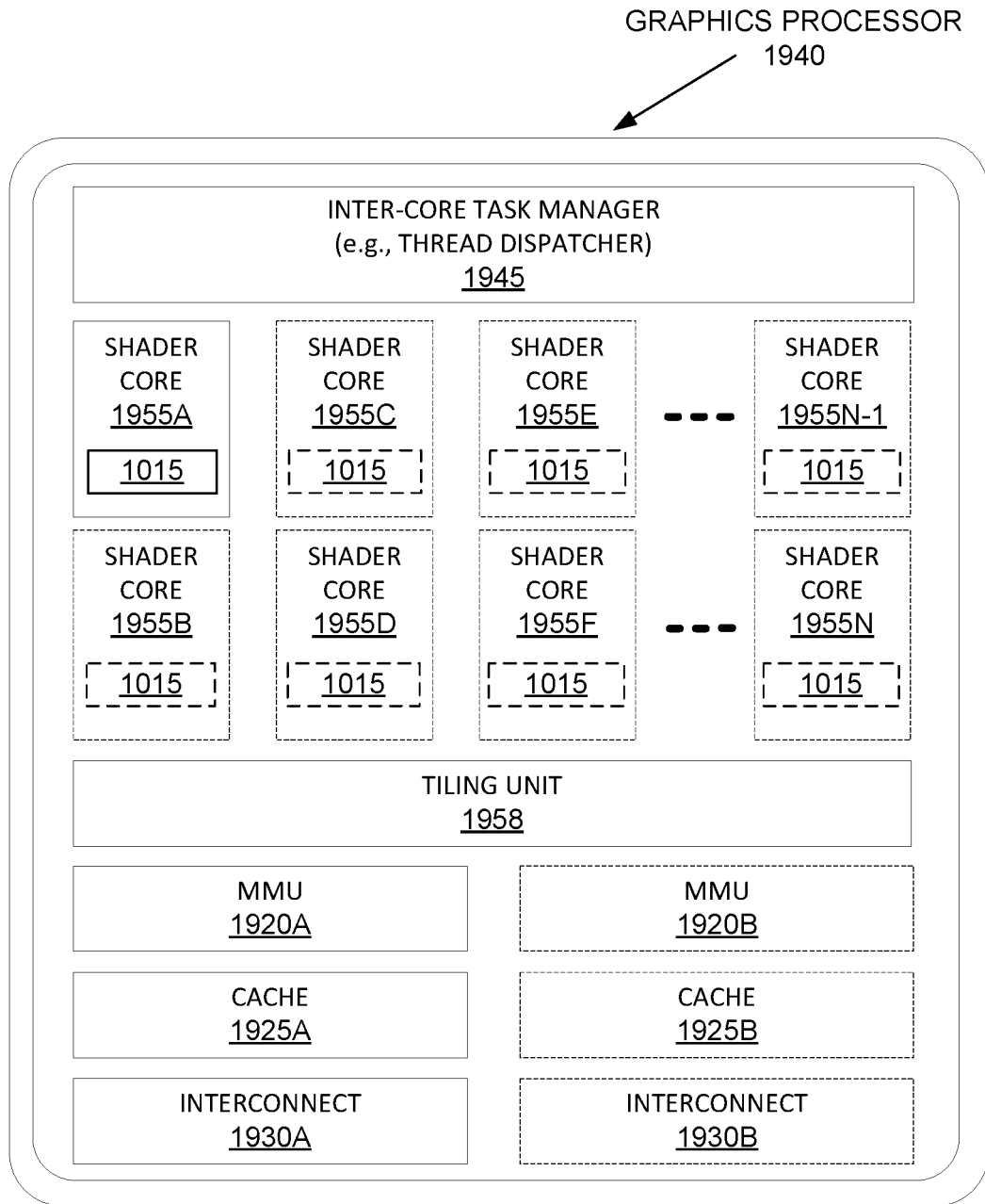

FIGS. 19A-19B illustrate exemplary integrated circuits and associated graphics processors that may be fabricated using one or more IP cores, according to various embodiments described herein. In addition to what is illustrated, other logic and circuits may be included in at least one embodiment, including additional graphics processors/cores, peripheral interface controllers, or general-purpose processor cores.

FIGS. 19A-19B are block diagrams illustrating exemplary graphics processors for use within an SoC, according to embodiments described herein. FIG. 19A illustrates an exemplary graphics processor 1910 of a system on a chip integrated circuit that may be fabricated using one or more IP cores, according to at least one embodiment. FIG. 19B illustrates an additional exemplary graphics processor 1940 of a system on a chip integrated circuit that may be fabricated using one or more IP cores, according to at least one embodiment. In at least one embodiment, graphics processor 1910 of FIG. 19A is a low power graphics processor core. In at least one embodiment, graphics processor 1940 of FIG. 19B is a higher performance graphics processor core. In at least one embodiment, each of graphics processors 1910, 1940 can be variants of graphics processor 1810 of FIG. 18.

In at least one embodiment, graphics processor 1910 includes a vertex processor 1905 and one or more fragment processor(s) 1915A-1915N (e.g., 1915A, 1915B, 1915C, 1915D, through 1915N-1, and 1915N). In at least one embodiment, graphics processor 1910 can execute different shader programs via separate logic, such that vertex processor 1905 is optimized to execute operations for vertex shader programs, while one or more fragment processor(s) 1915A-1915N execute fragment (e.g., pixel) shading operations for fragment or pixel shader programs. In at least one embodiment, vertex processor 1905 performs a vertex processing stage of a 3D graphics pipeline and generates primitives and vertex data. In at least one embodiment, fragment processor(s) 1915A-1915N use primitive and vertex data generated by vertex processor 1905 to produce a framebuffer that is displayed on a display device. In at least one embodiment, fragment processor(s) 1915A-1915N are optimized to execute fragment shader programs as provided for in an OpenGL API, which may be used to perform similar operations as a pixel shader program as provided for in a Direct 3D API.

In at least one embodiment, graphics processor 1910 additionally includes one or more memory management units (MMUs) 1920A-1920B, cache(s) 1925A-1925B, and circuit interconnect(s) 1930A-1930B. In at least one embodiment, one or more MMU(s) 1920A-1920B provide for virtual to physical address mapping for graphics processor 1910, including for vertex processor 1905 and/or fragment processor(s) 1915A-1915N, which may reference vertex or image/texture data stored in memory, in addition to vertex or image/texture data stored in one or more cache(s) 1925A-1925B. In at least one embodiment, one or more MMU(s) 1920A-1920B may be synchronized with other MMUs within system, including one or more MMUs associated with one or more application processor(s) 1805, image processors 1815, and/or video processors 1820 of FIG. 18, such that each processor 1805-1820 can participate in a shared or unified virtual memory system. In at least one embodiment, one or more circuit interconnect(s) 1930A-1930B enable graphics processor 1910 to interface with other IP cores within SoC, either via an internal bus of SoC or via a direct connection.

In at least one embodiment, graphics processor 1940 includes one or more MMU(s) 1920A-1920B, caches 1925A-1925B, and circuit interconnects 1930A-1930B of graphics processor 1910 of FIG. 19A. In at least one embodiment, graphics processor 1940 includes one or more shader core(s) 1955A-1955N (e.g., 1955A, 1955B, 1955C, 1955D, 1955E, 1955F, through 1955N-1, and 1955N), which provides for a unified shader core architecture in which a single core or type or core can execute all types of programmable shader code, including shader program code to implement vertex shaders, fragment shaders, and/or compute shaders. In at least one embodiment, a number of shader cores can vary. In at least one embodiment, graphics processor 1940 includes an inter-core task manager 1945, which acts as a thread dispatcher to dispatch execution threads to one or more shader cores 1955A-1955N and a tiling unit 1958 to accelerate tiling operations for tile-based rendering, in which rendering operations for a scene are subdivided in image space, for example to exploit local spatial coherence within a scene or to optimize use of internal caches.

Inference and/or training logic 1015 are used to perform inferencing and/or training operations associated with one or more embodiments. Details regarding inference and/or training logic 1015 are provided below in conjunction with FIGS. 10 and/or 10B. In at least one embodiment, inference and/or training logic 1015 may be used in integrated circuit 19A and/or 19B for inferencing or predicting operations based, at least in part, on weight parameters calculated using neural network training operations, neural network functions and/or architectures, or neural network use cases described herein. For example, the inference and/or training logic 1015 can accept an input video stream and generate inferences for objects represented in the video stream as discussed herein.

Figure 20A:
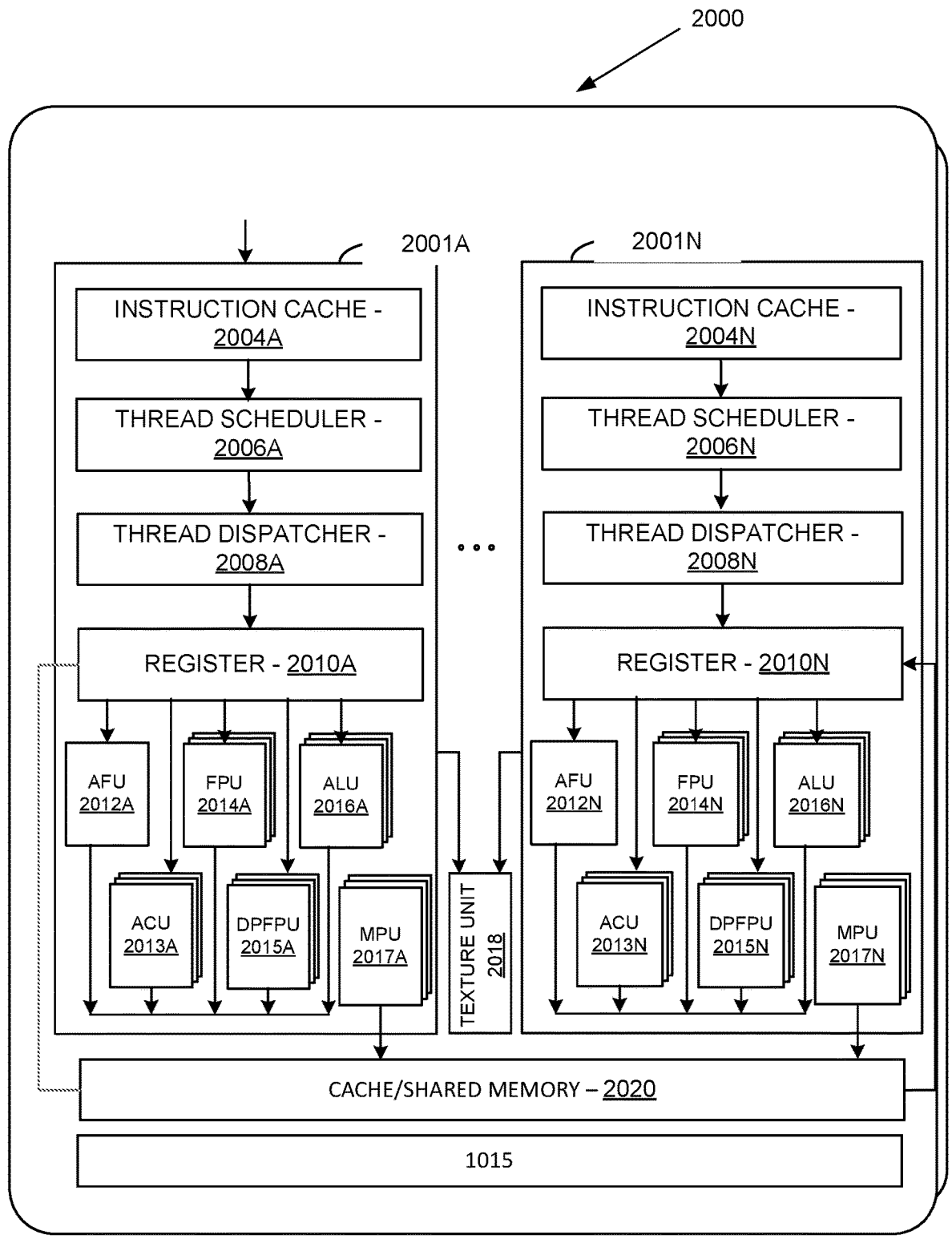
FIGS. 20A-20B illustrate additional exemplary graphics processor logic according to embodiments described herein.
Figure 20B:
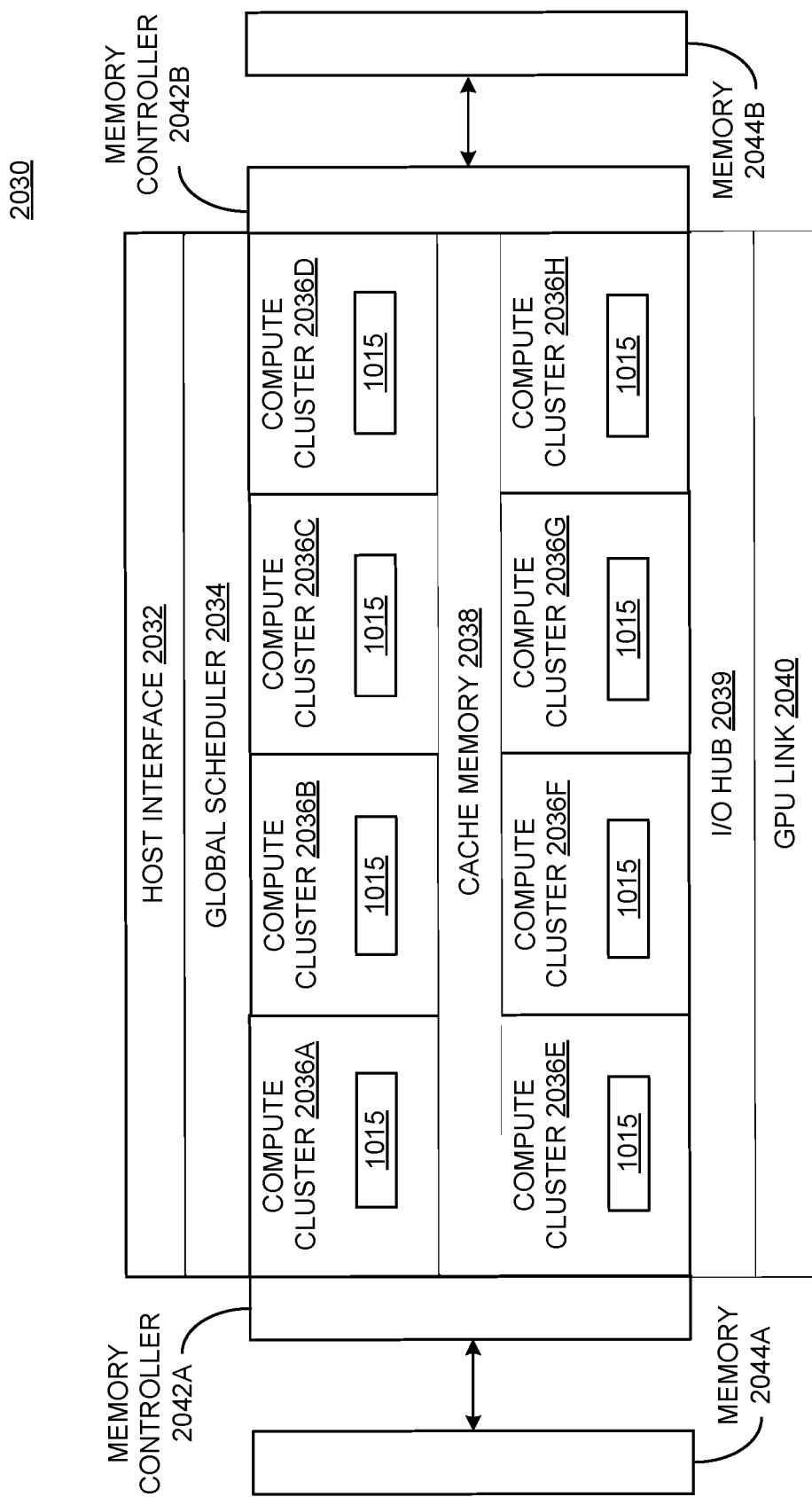

FIGS. 20A-20B illustrate additional exemplary graphics processor logic according to embodiments described herein. FIG. 20A illustrates a graphics core 2000 that may be included within graphics processor 1810 of FIG. 18, in at least one embodiment, and may be a unified shader core 1955A-1955N as in FIG. 19B in at least one embodiment. FIG. 20B illustrates a highly-parallel general-purpose graphics processing unit 2030 suitable for deployment on a multi-chip module in at least one embodiment.

In one embodiment, graphics core 2000 includes a shared instruction cache 2002, a texture unit 2018, and a cache/shared memory 2020 that are common to execution resources within graphics core 2000. In one embodiment, graphics core 2000 can include multiple slices 2001A-2001N or partition for each core, and a graphics processor can include multiple instances of graphics core 2000. Slices 2001A-2001N can include support logic including a local instruction cache 2004A-2004N, a thread scheduler 2006A-2006N, a thread dispatcher 2008A-2008N, and a set of registers 2010A-2010N. In one embodiment, slices 2001A-2001N can include a set of additional function units (AFUs 2012A-2012N), floating-point units (FPU 2014A-2014N), integer arithmetic logic units (ALUs 2016-2016N), address computational units (ACU 2013A-2013N), double-precision floating-point units (DPFPU 2015A-2015N), and matrix processing units (MPU 2017A-2017N).

In one embodiment, FPUs 2014A-2014N can perform single-precision (32-bit) and half-precision (16-bit) floating point operations, while DPFPUs 2015A-2015N perform double precision (64-bit) floating point operations. In one embodiment, ALUs 2016A-2016N can perform variable precision integer operations at 8-bit, 16-bit, and 32-bit precision, and can be configured for mixed precision operations. In one embodiment, MPUs 2017A-2017N can also be configured for mixed precision matrix operations, including half-precision floating point and 8-bit integer operations. In one embodiment, MPUs 2017-2017N can perform a variety of matrix operations to accelerate machine learning application frameworks, including enabling support for accelerated general matrix to matrix multiplication (GEMM). In one embodiment, AFUs 2012A-2012N can perform additional logic operations not supported by floating-point or integer units, including trigonometric operations (e.g., Sine, Cosine, etc.).

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in graphics core 2000 for inferencing or predicting operations based, at least in part, on weight parameters calculated using neural network training operations, neural network functions and/or architectures, or neural network use cases described herein.

FIG. 20B illustrates a general-purpose processing unit (GPGPU) 2030 that can be configured to enable highly-parallel compute operations to be performed by an array of graphics processing units, in at least one embodiment. In at least one embodiment, GPGPU 2030 can be linked directly to other instances of GPGPU 2030 to create a multi-GPU cluster to improve training speed for deep neural networks. In at least one embodiment, GPGPU 2030 includes a host interface 2032 to enable a connection with a host processor. In at least one embodiment, host interface 2032 is a PCI Express interface. In at least one embodiment, host interj ace 2032 can be a vendor specific communications interface or communications fabric. In at least one embodiment, GPGPU 2030 receives commands from a host processor and uses a global scheduler 2034 to distribute execution threads associated with those commands to a set of compute clusters 2036A-2036H. In at least one embodiment, compute clusters 2036A-2036H share a cache memory 2038. In at least one embodiment, cache memory 2038 can serve as a higher-level cache for cache memories within compute clusters 2036A-2036H.

In at least one embodiment, GPGPU 2030 includes memory 2044A-2044B coupled with compute clusters 2036A-2036H via a set of memory controllers 2042A-2042B. In at least one embodiment, memory 2044A-2044B can include various types of memory devices including dynamic random access memory (DRAM) or graphics random access memory, such as synchronous graphics random access memory (SGRAM), including graphics double data rate (GDDR) memory.

In at least one embodiment, compute clusters 2036A-2036H each include a set of graphics cores, such as graphics core 2000 of FIG. 20A, which can include multiple types of integer and floating point logic units that can perform computational operations at a range of precisions including suited for machine learning computations. For example, in at least one embodiment, at least a subset of floating point units in each of compute clusters 2036A-2036H can be configured to perform 16-bit or 32-bit floating point operations, while a different subset of floating point units can be configured to perform 64-bit floating point operations.

In at least one embodiment, multiple instances of GPGPU 2030 can be configured to operate as a compute cluster. In at least one embodiment, communication used by compute clusters 2036A-2036H for synchronization and data exchange varies across embodiments. In at least one embodiment, multiple instances of GPGPU 2030 communicate over host interface 2032. In at least one embodiment, GPGPU 2030 includes an I/O hub 2039 that couples GPGPU 2030 with a GPU link 2040 that enables a direct connection to other instances of GPGPU 2030. In at least one embodiment, GPU link 2040 is coupled to a dedicated GPU-to-GPU bridge that enables communication and synchronization between multiple instances of GPGPU 2030. In at least one embodiment GPU link 2040 couples with a high speed interconnect to transmit and receive data to other GPGPUs or parallel processors. In at least one embodiment, multiple instances of GPGPU 2030 are located in separate data processing systems and communicate via a network device that is accessible via host interface 2032. In at least one embodiment GPU link 2040 can be configured to enable a connection to a host processor in addition to or as an alternative to host interface 2032.

In at least one embodiment, GPGPU 2030 can be configured to train neural networks. In at least one embodiment, GPGPU 2030 can be used within a inferencing platform. In at least one embodiment, in which GPGPU 2030 is used for inferencing, GPGPU may include fewer compute clusters 2036A-2036H relative to when GPGPU is used for training a neural network. In at least one embodiment, memory technology associated with memory 2044A-2044B may differ between inferencing and training configurations, with higher bandwidth memory technologies devoted to training configurations. In at least one embodiment, inferencing configuration of GPGPU 2030 can support inferencing specific instructions. For example, in at least one embodiment, an inferencing configuration can provide support for one or more 8-bit integer dot product instructions, which may be used during inferencing operations for deployed neural networks.

Inference and/or training logic 1015 are used to perform inferencing and/or training operations associated with one or more embodiments. Details regarding inference and/or training logic 1015 are provided below in conjunction with FIGS. 10 and/or 10B. In at least one embodiment, inference and/or training logic 1015 may be used in GPGPU 2030 for inferencing or predicting operations based, at least in part, on weight parameters calculated using neural network training operations, neural network functions and/or architectures, or neural network use cases described herein.

Figure 21:
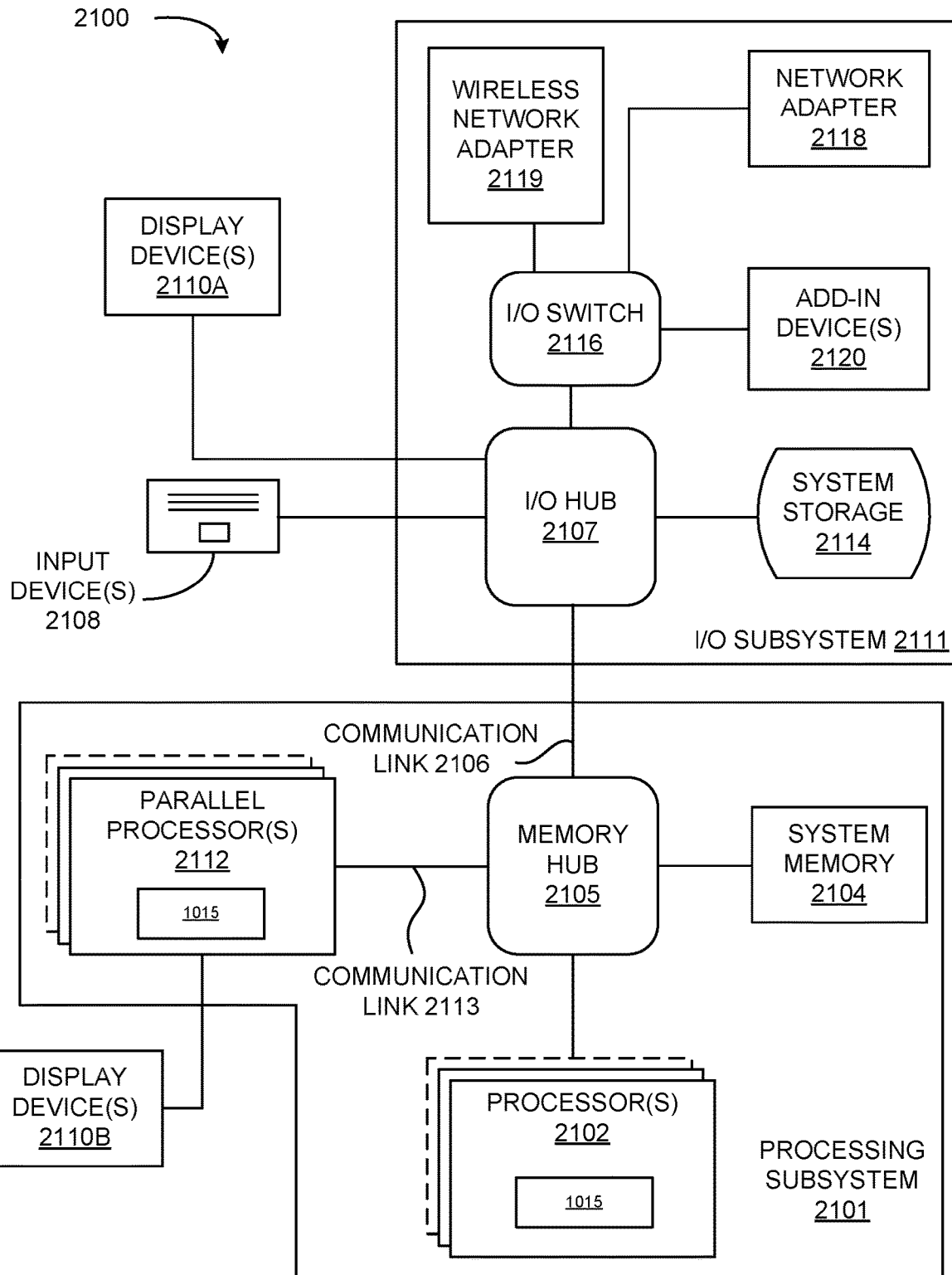
FIG. 21 illustrates a computer system, according to at least one embodiment.

FIG. 21 is a block diagram illustrating a computing system 2100 according to at least one embodiment. In at least one embodiment, computing system 2100 includes a processing subsystem 2101 having one or more processor(s) 2102 and a system memory 2104 communicating via an interconnection path that may include a memory hub 2105. In at least one embodiment, memory hub 2105 may be a separate component within a chipset component or may be integrated within one or more processor(s) 2102. In at least one embodiment, memory hub 2105 couples with an I/O subsystem 2111 via a communication link 2106. In at least one embodiment, I/O subsystem 2111 includes an I/O hub 2107 that can enable computing system 2100 to receive input from one or more input device(s) 2108. In at least one embodiment, I/O hub 2107 can enable a display controller, which may be included in one or more processor(s) 2102, to provide outputs to one or more display device(s) 2110A. In at least one embodiment, one or more display device(s) 2110A coupled with I/O hub 2107 can include a local, internal, or embedded display device.

In at least one embodiment, processing subsystem 2101 includes one or more parallel processor(s) 2112 coupled to memory hub 2105 via a bus or other communication link 2113. In at least one embodiment, communication link 2113 may be one of any number of standards based communication link technologies or protocols, such as, but not limited to PCI Express, or may be a vendor specific communications interface or communications fabric. In at least one embodiment, one or more parallel processor(s) 2112 form a computationally focused parallel or vector processing system that can include a large number of processing cores and/or processing clusters, such as a many integrated core (MIC) processor. In at least one embodiment, one or more parallel processor(s) 2112 form a graphics processing subsystem that can output pixels to one of one or more display device(s) 2110A coupled via I/O Hub 2107. In at least one embodiment, one or more parallel processor(s) 2112 can also include a display controller and display interface (not shown) to enable a direct connection to one or more display device(s) 2110B.

In at least one embodiment, a system storage unit 2114 can connect to I/O hub 2107 to provide a storage mechanism for computing system 2100. In at least one embodiment, an I/O switch 2116 can be used to provide an interface mechanism to enable connections between I/O hub 2107 and other components, such as a network adapter 2118 and/or wireless network adapter 2119 that may be integrated into a platform, and various other devices that can be added via one or more add-in device(s) 2120. In at least one embodiment, network adapter 2118 can be an Ethernet adapter or another wired network adapter. In at least one embodiment, wireless network adapter 2119 can include one or more of a Wi-Fi, Bluetooth, near field communication (NFC), or other network device that includes one or more wireless radios.

In at least one embodiment, computing system 2100 can include other components not explicitly shown, including USB or other port connections, optical storage drives, video capture devices, and the like, may also be connected to I/O hub 2107. In at least one embodiment, communication paths interconnecting various components in FIG. 21 may be implemented using any suitable protocols, such as PCI (Peripheral Component Interconnect) based protocols (e.g., PCI-Express), or other bus or point-to-point communication interfaces and/or protocol(s), such as NV-Link high-speed interconnect, or interconnect protocols.

In at least one embodiment, one or more parallel processor(s) 2112 incorporate circuitry optimized for graphics and video processing, including, for example, video output circuitry, and constitutes a graphics processing unit (GPU). In at least one embodiment, one or more parallel processor(s) 2112 incorporate circuitry optimized for general purpose processing. In at least embodiment, components of computing system 2100 may be integrated with one or more other system elements on a single integrated circuit. For example, in at least one embodiment, one or more parallel processor(s) 2112, memory hub 2105, processor(s) 2102, and I/O hub 2107 can be integrated into a system on chip (SoC) integrated circuit. In at least one embodiment, components of computing system 2100 can be integrated into a single package to form a system in package (SIP) configuration. In at least one embodiment, at least a portion of components of computing system 2100 can be integrated into a multi-chip module (MCM), which can be interconnected with other multi-chip modules into a modular computing system.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in system FIG. 2100 for inferencing or predicting operations based, at least in part, on weight parameters calculated using neural network training operations, neural network functions and/or architectures, or neural network use cases described herein.

Processors

Figure 22:
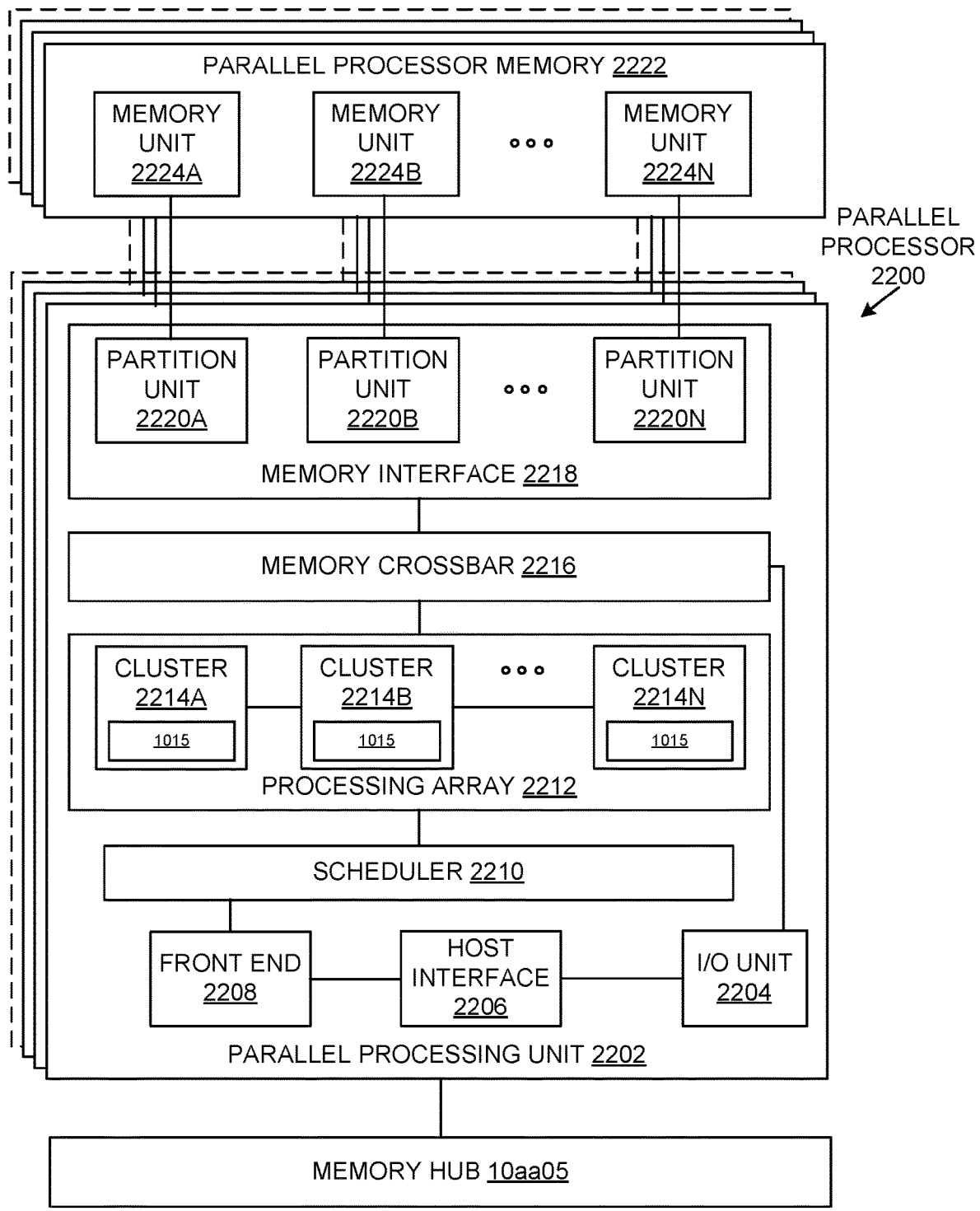
FIG. 22 illustrates a parallel processor, according to at least one embodiment.

FIG. 22 illustrates a parallel processor 2200 according to at least on embodiment. In at least one embodiment, various components of parallel processor 2200 may be implemented using one or more integrated circuit devices, such as programmable processors, application specific integrated circuits (ASICs), or field programmable gate arrays (FPGA). In at least one embodiment, illustrated parallel processor 2200 is a variant of one or more parallel processor(s) 2112 shown in FIG. 21 according to an exemplary embodiment.

In at least one embodiment, parallel processor 2200 includes a parallel processing unit 2202. In at least one embodiment, parallel processing unit 2202 includes an I/O unit 2204 that enables communication with other devices, including other instances of parallel processing unit 2202. In at least one embodiment, I/O unit 2204 may be directly connected to other devices. In at least one embodiment, I/O unit 2204 connects with other devices via use of a hub or switch interface, such as memory hub 2105. In at least one embodiment, connections between memory hub 2105 and I/O unit 2204 form a communication link 2113. In at least one embodiment, I/O unit 2204 connects with a host interface 2206 and a memory crossbar 2216, where host interface 2206 receives commands directed to performing processing operations and memory crossbar 2216 receives commands directed to performing memory operations.

In at least one embodiment, when host interface 2206 receives a command buffer via I/O unit 2204, host interface 2206 can direct work operations to perform those commands to a front end 2208. In at least one embodiment, front end 2208 couples with a scheduler 2210, which is configured to distribute commands or other work items to a processing cluster array 2212. In at least one embodiment, scheduler 2210 ensures that processing cluster array 2212 is properly configured, and in a valid state, before tasks are distributed to processing cluster array 2212 of processing cluster array 2212. In at least one embodiment, scheduler 2210 is implemented via firmware logic executing on a microcontroller. In at least one embodiment, microcontroller implemented scheduler 2210 is configurable to perform complex scheduling and work distribution operations at coarse and fine granularity, enabling rapid preemption and context switching of threads executing on processing array 2212. In at least one embodiment, host software can prove workloads for scheduling on processing array 2212 via one of multiple graphics processing doorbells. In at least one embodiment, workloads can then be automatically distributed across processing array 2212 by scheduler 2210 logic within a microcontroller including scheduler 2210.

In at least one embodiment, processing cluster array 2212 can include up to "N" processing clusters (e.g., cluster 2214A, cluster 2214B, through cluster 2214N). In at least one embodiment, each cluster 2214A-2214N of processing cluster array 2212 can execute a large number of concurrent threads. In at least one embodiment, scheduler 2210 can allocate work to clusters 2214A-2214N of processing cluster array 2212 using various scheduling and/or work distribution algorithms, which may vary depending on workload arising for each type of program or computation. In at least one embodiment, scheduling can be handled dynamically by scheduler 2210, or can be assisted in part by compiler logic during compilation of program logic configured for execution by processing cluster array 2212. In at least one embodiment, different clusters 2214A-2214N of processing cluster array 2212 can be allocated for processing different types of programs or for performing different types of computations.

In at least one embodiment, processing cluster array 2212 can be configured to perform various types of parallel processing operations. In at least one embodiment, processing cluster array 2212 is configured to perform general-purpose parallel compute operations. For example, in at least one embodiment, processing cluster array 2212 can include logic to execute processing tasks including filtering of video and/or audio data, performing modeling operations, including physics operations, and performing data transformations.

In at least one embodiment, processing cluster array 2212 is configured to perform parallel graphics processing operations. In at least one embodiment, processing cluster array 2212 can include additional logic to support execution of such graphics processing operations, including, but not limited to texture sampling logic to perform texture operations, as well as tessellation logic and other vertex processing logic. In at least one embodiment, processing cluster array 2212 can be configured to execute graphics processing related shader programs such as, but not limited to vertex shaders, tessellation shaders, geometry shaders, and pixel shaders. In at least one embodiment, parallel processing unit 2202 can transfer data from system memory via I/O unit 2204 for processing. In at least one embodiment, during processing, transferred data can be stored to on-chip memory (e.g., parallel processor memory 2222) during processing, then written back to system memory.

In at least one embodiment, when parallel processing unit 2202 is used to perform graphics processing, scheduler 2210 can be configured to divide a processing workload into approximately equal sized tasks, to better enable distribution of graphics processing operations to multiple clusters 2214A-2214N of processing cluster array 2212. In at least one embodiment, portions of processing cluster array 2212 can be configured to perform different types of processing. For example, in at least one embodiment, a first portion may be configured to perform vertex shading and topology generation, a second portion may be configured to perform tessellation and geometry shading, and a third portion may be configured to perform pixel shading or other screen space operations, to produce a rendered image for display. In at least one embodiment, intermediate data produced by one or more of clusters 2214A-2214N may be stored in buffers to allow intermediate data to be transmitted between clusters 2214A-2214N for further processing.

In at least one embodiment, processing cluster array 2212 can receive processing tasks to be executed via scheduler 2210, which receives commands defining processing tasks from front end 2208. In at least one embodiment, processing tasks can include indices of data to be processed, such as may include surface (patch) data, primitive data, vertex data, and/or pixel data, as well as state parameters and commands defining how data is to be processed (e.g., what program is to be executed). In at least one embodiment, scheduler 2210 may be configured to fetch indices corresponding to tasks or may receive indices from front end 2208. In at least one embodiment, front end 2208 can be configured to ensure processing cluster array 2212 is configured to a valid state before a workload specified by incoming command buffers (e.g., batch-buffers, push buffers, etc.) is initiated.

In at least one embodiment, each of one or more instances of parallel processing unit 2202 can couple with parallel processor memory 2222. In at least one embodiment, parallel processor memory 2222 can be accessed via memory crossbar 2216, which can receive memory requests from processing cluster array 2212 as well as I/O unit 2204. In at least one embodiment, memory crossbar 2216 can access parallel processor memory 2222 via a memory interface 2218. In at least one embodiment, memory interface 2218 can include multiple partition units (e.g., partition unit 2220A, partition unit 2220B, through partition unit 2220N) that can each couple to a portion (e.g., memory unit) of parallel processor memory 2222. In at least one embodiment, a number of partition units 2220A-2220N is configured to be equal to a number of memory units, such that a first partition unit 2220A has a corresponding first memory unit 2224A, a second partition unit 2220B has a corresponding memory unit 2224B, and an Nth partition unit 2220N has a corresponding Nth memory unit 2224N. In at least one embodiment, a number of partition units 2220A-2220N may not be equal to a number of memory devices.

In at least one embodiment, memory units 2224A-2224N can include various types of memory devices, including dynamic random access memory (DRAM) or graphics random access memory, such as synchronous graphics random access memory (SGRAM), including graphics double data rate (GDDR) memory. In at least one embodiment, memory units 2224A-2224N may also include 3D stacked memory, including but not limited to high bandwidth memory (HBM). In at least one embodiment, render targets, such as frame buffers or texture maps may be stored across memory units 2224A-2224N, allowing partition units 2220A-2220N to write portions of each render target in parallel to efficiently use available bandwidth of parallel processor memory 2222. In at least one embodiment, a local instance of parallel processor memory 2222 may be excluded in favor of a unified memory design that utilizes system memory in conjunction with local cache memory.

In at least one embodiment, any one of clusters 2214A-2214N of processing cluster array 2212 can process data that will be written to any of memory units 2224A-2224N within parallel processor memory 2222. In at least one embodiment, memory crossbar 2216 can be configured to transfer an output of each cluster 2214A-2214N to any partition unit 2220A-2220N or to another cluster 2214A-2214N, which can perform additional processing operations on an output. In at least one embodiment, each cluster 2214A-2214N can communicate with memory interface 2218 through memory crossbar 2216 to read from or write to various external memory devices. In at least one embodiment, memory crossbar 2216 has a connection to memory interface 2218 to communicate with I/O unit 2204, as well as a connection to a local instance of parallel processor memory 2222, enabling processing units within different processing clusters 2214A-2214N to communicate with system memory or other memory that is not local to parallel processing unit 2202. In at least one embodiment, memory crossbar 2216 can use virtual channels to separate traffic streams between clusters 2214A-2214N and partition units 2220A-2220N.

In at least one embodiment, multiple instances of parallel processing unit 2202 can be provided on a single add-in card, or multiple add-in cards can be interconnected. In at least one embodiment, different instances of parallel processing unit 2202 can be configured to inter-operate even if different instances have different numbers of processing cores, different amounts of local parallel processor memory, and/or other configuration differences. For example, in at least one embodiment, some instances of parallel processing unit 2202 can include higher precision floating point units relative to other instances. In at least one embodiment, systems incorporating one or more instances of parallel processing unit 2202 or parallel processor 2200 can be implemented in a variety of configurations and form factors, including but not limited to desktop, laptop, or handheld personal computers, servers, workstations, game consoles, and/or embedded systems.

Figure 23:
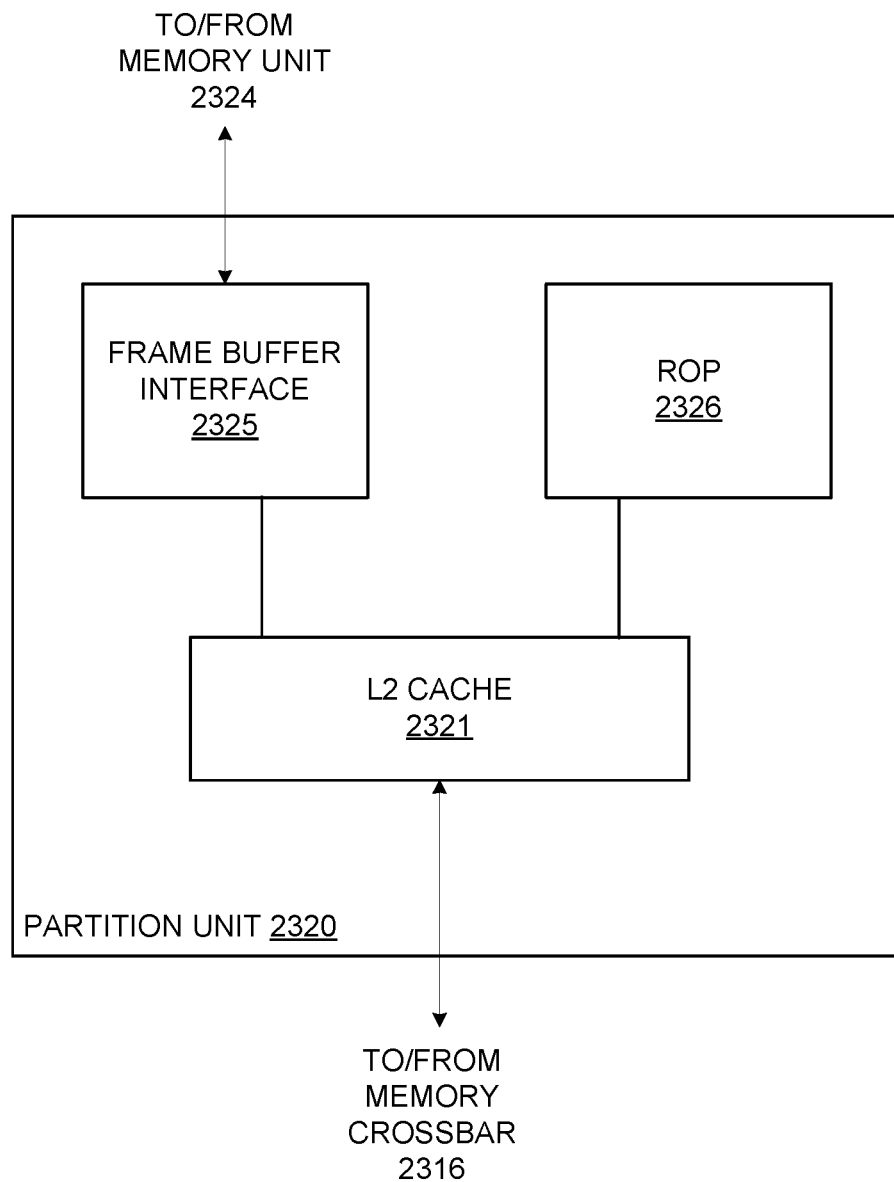
FIG. 23 illustrates a partition unit, according to at least one embodiment.

FIG. 23 is a block diagram of a partition unit 2320 according to at least one embodiment. In at least one embodiment, partition unit 2320 is an instance of one of partition units 2220A-2220N of FIG. 22. In at least one embodiment, partition unit 2320 includes an L2 cache 2321, a frame buffer interface 2325, and a ROP 2326 (raster operations unit). L2 cache 2321 is a read/write cache that is configured to perform load and store operations received from memory crossbar 2316 and ROP 2326. In at least one embodiment, read misses and urgent write-back requests are output by L2 cache 2321 to frame buffer interface 2325 for processing. In at least one embodiment, updates can also be sent to a frame buffer via frame buffer interface 2325 for processing. In at least one embodiment, frame buffer interface 2325 interfaces with one of memory units in parallel processor memory, such as memory units 2224A-2224N of FIG. 22 (e.g., within parallel processor memory 2322).

In at least one embodiment, ROP 2326 is a processing unit that performs raster operations such as stencil, z test, blending, and like. In at least one embodiment, ROP 2326 then outputs processed graphics data that is stored in graphics memory. In at least one embodiment, ROP 2326 includes compression logic to compress depth or color data that is written to memory and decompress depth or color data that is read from memory. In at least one embodiment, compression logic can be lossless compression logic that makes use of one or more of multiple compression algorithms. The type of compression that is performed by ROP 2326 can vary based on statistical characteristics of data to be compressed. For example, in at least one embodiment, delta color compression is performed on depth and color data on a per-tile basis.

In at least one embodiment, ROP 2326 is included within each processing cluster (e.g., cluster 2214A-2214N of FIG. 22) instead of within partition unit 2320. In at least one embodiment, read and write requests for pixel data are transmitted over memory crossbar 2316 instead of pixel fragment data. In at least one embodiment, processed graphics data may be displayed on a display device, such as one of one or more display device(s) 2110 of FIG. 21, routed for further processing by processor(s) 2102, or routed for further processing by one of processing entities within parallel processor 2200 of FIG. 22.

Figure 24:
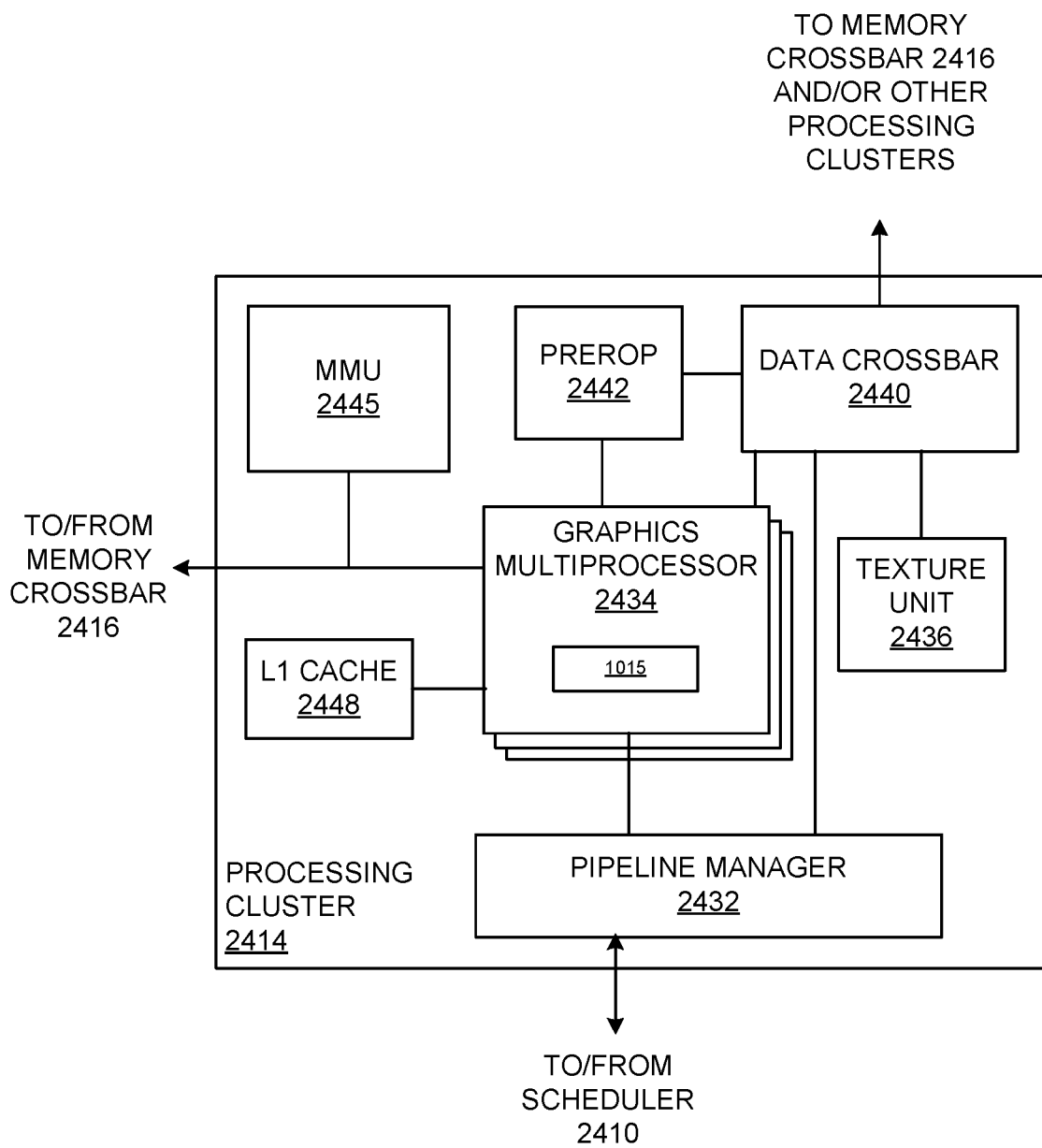
FIG. 24 illustrates a processing cluster, according to at least one embodiment.

FIG. 24 is a block diagram of a processing cluster 2414 within a parallel processing unit according to at least one embodiment. In at least one embodiment, a processing cluster is an instance of one of processing clusters 2214A-2214N of FIG. 22. In at least one embodiment, processing cluster 2414 can be configured to execute many threads in parallel, where the term "thread" refers to an instance of a particular program executing on a particular set of input data. In at least one embodiment, single-instruction, multiple-data (SIMD) instruction issue techniques are used to support parallel execution of a large number of threads without providing multiple independent instruction units. In at least one embodiment, single-instruction, multiple-thread (SIMT) techniques are used to support parallel execution of a large number of generally synchronized threads, using a common instruction unit configured to issue instructions to a set of processing engines within each one of processing clusters.

In at least one embodiment, operation of processing cluster 2414 can be controlled via a pipeline manager 2432 that distributes processing tasks to SIMT parallel processors. In at least one embodiment, pipeline manager 2432 receives instructions from scheduler 2210 of FIG. 22 and manages execution of those instructions via a graphics multiprocessor 2434 and/or a texture unit 2236. In at least one embodiment, graphics multiprocessor 2434 is an exemplary instance of a SIMT parallel processor. However, in at least one embodiment, various types of SIMT parallel processors of differing architectures may be included within processing cluster 2414. In at least one embodiment, one or more instances of graphics multiprocessor 2434 can be included within a processing cluster 2414. In at least one embodiment, graphics multiprocessor 2434 can process data and a data crossbar 2240 can be used to distribute processed data to one of multiple possible destinations, including other shader units. In at least one embodiment, pipeline manager 2432 can facilitate distribution of processed data by specifying destinations for processed data to be distributed via data crossbar 2440.

In at least one embodiment, each graphics multiprocessor 2434 within processing cluster 2414 can include an identical set of functional execution logic (e.g., arithmetic logic units, load-store units, etc.). In at least one embodiment, functional execution logic can be configured in a pipelined manner in which new instructions can be issued before previous instructions are complete. In at least one embodiment, functional execution logic supports a variety of operations including integer and floating point arithmetic, comparison operations, Boolean operations, bit-shifting, and computation of various algebraic functions. In at least one embodiment, the same functional-unit hardware can be leveraged to perform different operations and any combination of functional units may be present.

In at least one embodiment, instructions transmitted to processing cluster 2414 constitute a thread. In at least one embodiment, a set of threads executing across a set of parallel processing engines is a thread group. In at least one embodiment, the thread group executes a program on different input data. In at least one embodiment, each thread within a thread group can be assigned to a different processing engine within a graphics multiprocessor 2434. In at least one embodiment, a thread group may include fewer threads than a number of processing engines within graphics multiprocessor 2434. In at least one embodiment, when a thread group includes fewer threads than a number of processing engines, one or more of processing engines may be idle during cycles in which that thread group is being processed. In at least one embodiment, a thread group may also include more threads than a number of processing engines within graphics multiprocessor 2434. In at least one embodiment, when a thread group includes more threads than the number of processing engines within graphics multiprocessor 2434, processing can be performed over consecutive clock cycles. In at least one embodiment, multiple thread groups can be executed concurrently on a graphics multiprocessor 2434.

In at least one embodiment, graphics multiprocessor 2434 includes an internal cache memory to perform load and store operations. In at least one embodiment, graphics multiprocessor 2434 can forego an internal cache and use a cache memory (e.g., L1 cache 2448) within processing cluster 2214. In at least one embodiment, each graphics multiprocessor 2434 also has access to L2 caches within partition units (e.g., partition units 2220A-2220N of FIG. 22) that are shared among all processing clusters 2414 and may be used to transfer data between threads. In at least one embodiment, graphics multiprocessor 2434 may also access off-chip global memory, which can include one or more of local parallel processor memory and/or system memory. In at least one embodiment, any memory external to parallel processing unit may be used as global memory. In at least one embodiment, processing cluster 2414 includes multiple instances of graphics multiprocessor 2434 can share common instructions and data, which may be stored in L1 cache 2448.

In at least one embodiment, each processing cluster 2414 may include an MMU 2445 (memory management unit) that is configured to map virtual addresses into physical addresses. In at least one embodiment, one or more instances of MMU 2445 may reside within memory interface 2218 of FIG. 22. In at least one embodiment, MMU 2445 includes a set of page table entries (PTEs) used to map a virtual address to a physical address of a tile (talk more about tiling) and optionally a cache line index. In at least one embodiment, MMU 2445 may include address translation lookaside buffers (TLB) or caches that may reside within graphics multiprocessor 2434 or L1 cache or processing cluster 2414. In at least one embodiment, physical address is processed to distribute surface data access locality to allow efficient request interleaving among partition units. In at least one embodiment, cache line index may be used to determine whether a request for a cache line is a hit or miss.

In at least one embodiment, a processing cluster 2414 may be configured such that each graphics multiprocessor 2434 is coupled to a texture unit 2436 for performing texture mapping operations, such as may involve determining texture sample positions, reading texture data, and filtering texture data. In at least one embodiment, texture data is read from an internal texture L1 cache (not shown) or from an L1 cache within graphics multiprocessor 2434 and is fetched from an L2 cache, local parallel processor memory, or system memory, as needed. In at least one embodiment, each graphics multiprocessor 2434 outputs processed tasks to data crossbar 2440 to provide processed task to another processing cluster 2414 for further processing or to store processed task in an L2 cache, local parallel processor memory, or system memory via memory crossbar 2416. In at least one embodiment, preROP 2442 (pre-raster operations unit) is configured to receive data from graphics multiprocessor 2434, direct data to ROP units, which may be located with partition units as described herein (e.g., partition units 2220A-2220N of FIG. 22). In at least one embodiment, PreROP 2442 unit can perform optimizations for color blending, organize pixel color data, and perform address translations.

Inference and/or training logic 1015 are used to perform inferencing and/or training operations associated with one or more embodiments. Details regarding inference and/or training logic 1015 are provided below in conjunction with FIGS. 10 and/or 10B. In at least one embodiment, inference and/or training logic 1015 may be used in graphics processing cluster 2214 for inferencing or predicting operations based, at least in part, on weight parameters calculated using neural network training operations, neural network functions and/or architectures, or neural network use cases described herein.

Figure 25:
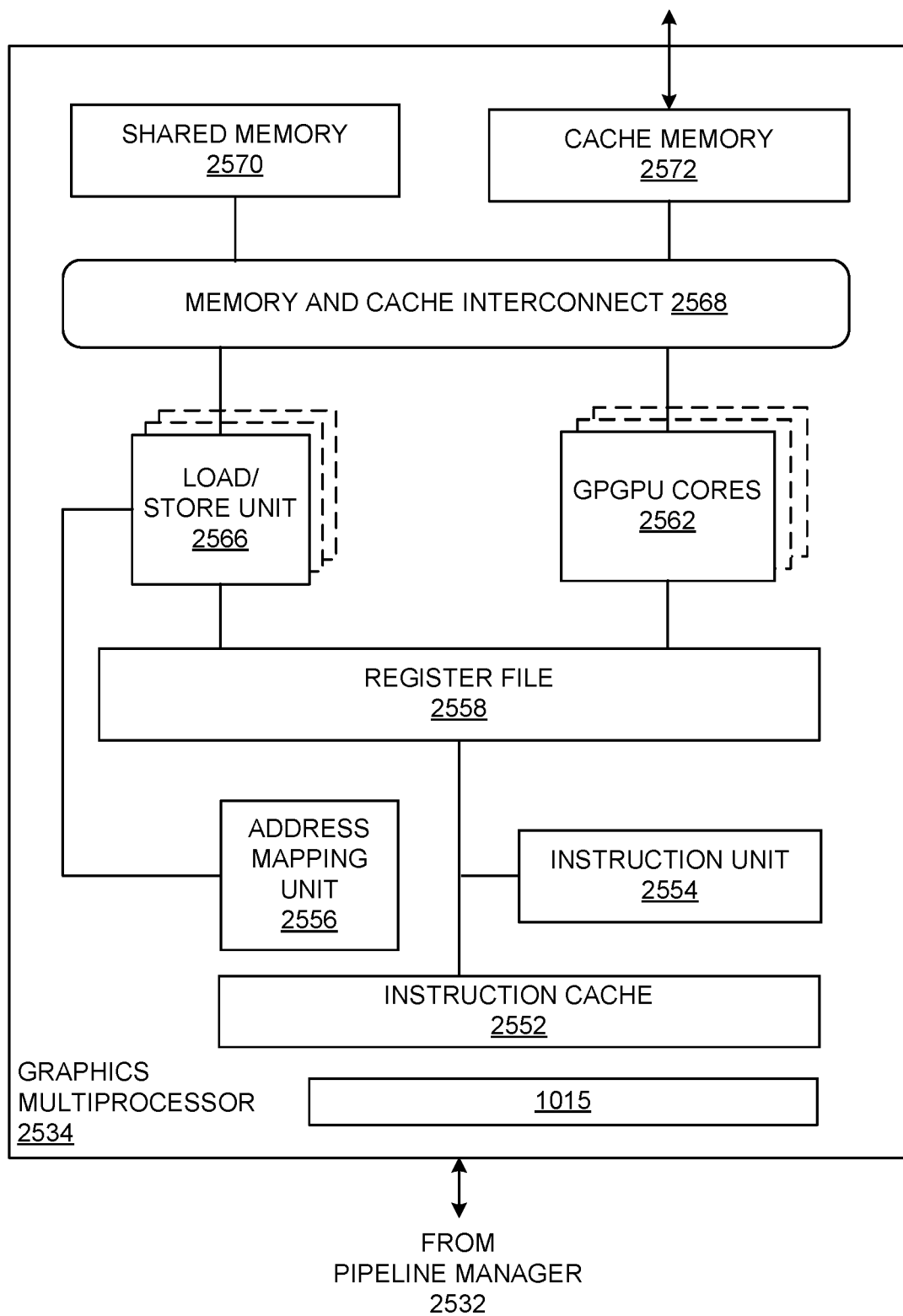
FIG. 25 illustrates a graphics multiprocessor, according to at least one embodiment.

FIG. 25 shows a graphics multiprocessor 2534 according to at least one embodiment. In at least one embodiment, graphics multiprocessor 2534 couples with pipeline manager 2532 of processing cluster 2514. In at least one embodiment, graphics multiprocessor 2534 has an execution pipeline including but not limited to an instruction cache 2552, an instruction unit 2554, an address mapping unit 2556, a register file 2558, one or more general purpose graphics processing unit (GPGPU) cores 2562, and one or more load/store units 2566. GPGPU cores 2562 and load/store units 2566 are coupled with cache memory 2572 and shared memory 2570 via a memory and cache interconnect 2568.

In at least one embodiment, instruction cache 2552 receives a stream of instructions to execute from pipeline manager 2532. In at least one embodiment, instructions are cached in instruction cache 2552 and dispatched for execution by instruction unit 2554. In at least one embodiment, instruction unit 2554 can dispatch instructions as thread groups (e.g., warps), with each thread of thread group assigned to a different execution unit within GPGPU core 2562. In at least one embodiment, an instruction can access any of a local, shared, or global address space by specifying an address within a unified address space. In at least one embodiment, address mapping unit 2556 can be used to translate addresses in a unified address space into a distinct memory address that can be accessed by load/store units 2566.

In at least one embodiment, register file 2558 provides a set of registers for functional units of graphics multiprocessor 2534. In at least one embodiment, register file 2558 provides temporary storage for operands connected to data paths of functional units (e.g., GPGPU cores 2562, load/store units 2566) of graphics multiprocessor 2534. In at least one embodiment, register file 2558 is divided between each of functional units such that each functional unit is allocated a dedicated portion of register file 2558. In one embodiment, register file 2558 is divided between different warps being executed by graphics multiprocessor 2534.

In at least one embodiment, GPGPU cores 2562 can each include floating point units (FPUs) and/or integer arithmetic logic units (ALUs) that are used to execute instructions of graphics multiprocessor 2534. GPGPU cores 2562 can be similar in architecture or can differ in architecture. In at least one embodiment, a first portion of GPGPU cores 2562 include a single precision FPU and an integer ALU while a second portion of GPGPU cores include a double precision FPU. In at least one embodiment, FPUs can implement the IEEE 754-2008 standard for floating point arithmetic or enable variable precision floating point arithmetic. In at least one embodiment, graphics multiprocessor 2534 can additionally include one or more fixed function or special function units to perform specific functions such as copy rectangle or pixel blending operations. In at least one embodiment one or more GPGPU cores can also include fixed or special function logic.

In at least one embodiment, GPGPU cores 2562 include SIMD logic capable of performing a single instruction on multiple sets of data. In one embodiment GPGPU cores 2562 can physically execute SIMD4, SIMD8, and SIMD16 instructions and logically execute SIMD1, SIMD2, and SIMD32 instructions. In at least one embodiment, SIMD instructions for GPGPU cores can be generated at compile time by a shader compiler or automatically generated when executing programs written and compiled for single program multiple data (SPMD) or SIMT architectures. In at least one embodiment, multiple threads of a program configured for an SIMT execution model can executed via a single SIMD instruction. For example, in at least one embodiment, eight SIMT threads that perform the same or similar operations can be executed in parallel via a single SIMD8 logic unit.

In at least one embodiment, memory and cache interconnect 2568 is an interconnect network that connects each functional unit of graphics multiprocessor 2534 to register file 2558 and to shared memory 2570. In at least one embodiment, memory and cache interconnect 2568 is a crossbar interconnect that allows load/store unit 2566 to implement load and store operations between shared memory 2570 and register file 2558. In at least one embodiment, register file 2558 can operate at a same frequency as GPGPU cores 2562, thus data transfer between GPGPU cores 2562 and register file 2558 is very low latency. In at least one embodiment, shared memory 2570 can be used to enable communication between threads that execute on functional units within graphics multiprocessor 2534. In at least one embodiment, cache memory 2572 can be used as a data cache for example, to cache texture data communicated between functional units and texture unit 2536. In at least one embodiment, shared memory 2570 can also be used as a program managed cached. In at least one embodiment, threads executing on GPGPU cores 2562 can programmatically store data within shared memory in addition to automatically cached data that is stored within cache memory 2572.

In at least one embodiment, a parallel processor or GPGPU as described herein is communicatively coupled to host/processor cores to accelerate graphics operations, machine-learning operations, pattern analysis operations, and various general purpose GPU (GPGPU) functions. In at least one embodiment, GPU may be communicatively coupled to the host processor/cores over a bus or other interconnect (e.g., a high speed interconnect such as PCIe or NVLink). In at least one embodiment, a GPU may be integrated on the same package or chip as cores and communicatively coupled to cores over an internal processor bus/interconnect (i.e., internal to a package or chip). In at least one embodiment, regardless of the manner in which the GPU is connected, processor cores may allocate work to a GPU in the form of sequences of commands/instructions contained in a work descriptor. In at least one embodiment, the GPU then uses dedicated circuitry/logic for efficiently processing these commands/instructions.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, inference and/or training logic 1015 may be used in graphics multiprocessor 2234 for inferencing or predicting operations based, at least in part, on weight parameters calculated using neural network training operations, neural network functions and/or architectures, or neural network use cases described herein.

Figure 26:
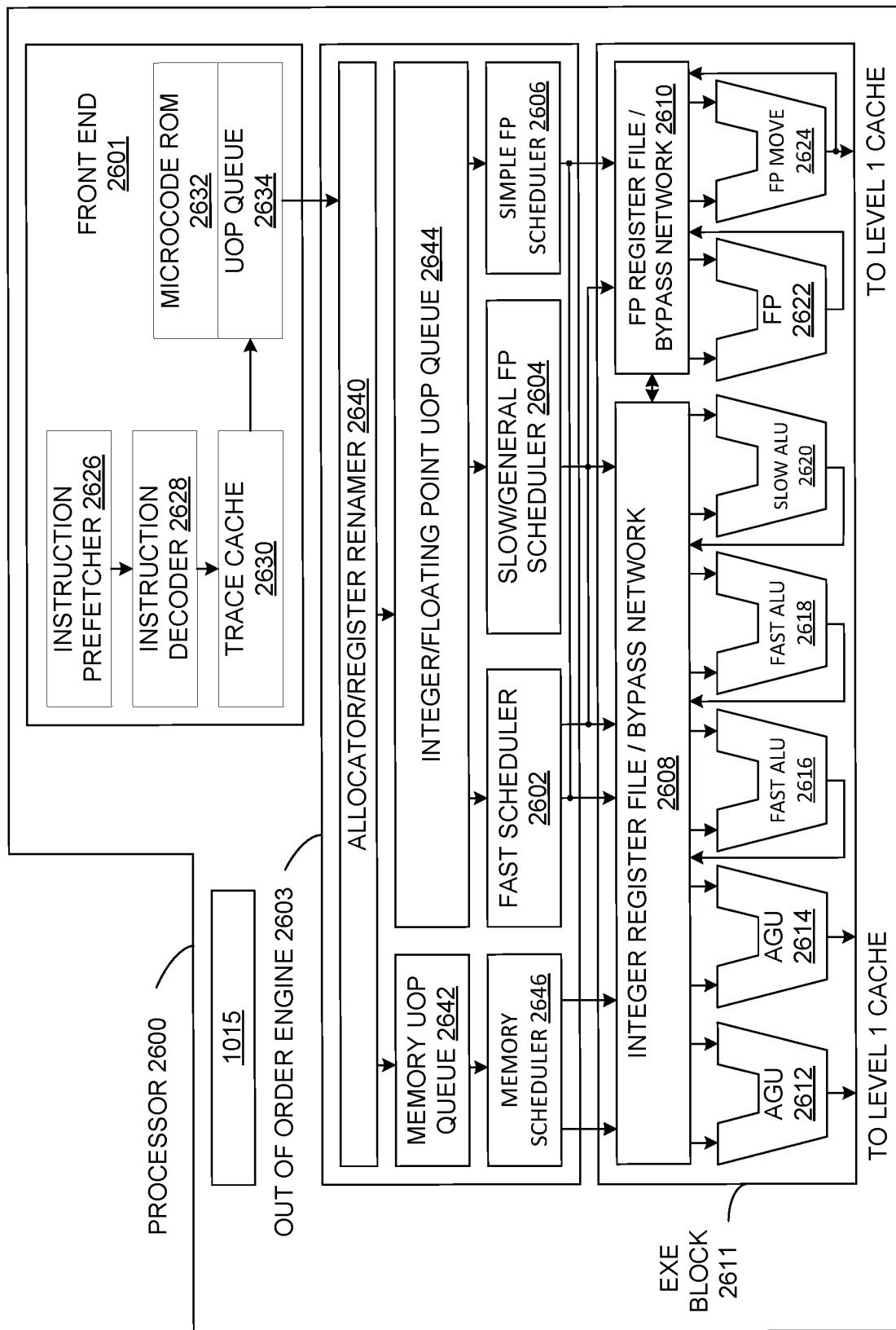
FIG. 26 is a block diagram illustrating a processor micro-architecture for a processor, according to at least one embodiment.

FIG. 26 is a block diagram illustrating micro-architecture for a processor 2600 that may include logic circuits to perform instructions, according to at least one embodiment. In at least one embodiment, processor 2600 may perform instructions, including x86 instructions, ARM instructions, specialized instructions for application-specific integrated circuits (ASICs), etc. In at least one embodiment, processor 2610 may include registers to store packed data, such as 64-bit wide MMX™ registers in microprocessors enabled with MMX technology from Intel Corporation of Santa Clara, Calif. In at least one embodiment, MMX registers, available in both integer and floating point forms, may operate with packed data elements that accompany single instruction, multiple data ("SIMD") and streaming SIMD extensions ("SSE") instructions. In at least one embodiment, 128-bit wide XMM registers relating to SSE2, SSE3, SSE4, AVX, or beyond (referred to generically as "SSEx") technology may hold such packed data operands. In at least one embodiment, processors 2610 may perform instructions to accelerate machine learning or deep learning algorithms, training, or inferencing.

In at least one embodiment, processor 2600 includes an in-order front end ("front end") 2601 to fetch instructions to be executed and prepare instructions to be used later in processor pipeline. In at least one embodiment, front end 2601 may include several units. In at least one embodiment, an instruction prefetcher 2626 fetches instructions from memory and feeds instructions to an instruction decoder 2628 which in turn decodes or interprets instructions. For example, in at least one embodiment, instruction decoder 2628 decodes a received instruction into one or more operations called "micro-instructions" or "micro-operations" (also called "micro ops" or "uops") that machine may execute. In at least one embodiment, instruction decoder 2628 parses instruction into an opcode and corresponding data and control fields that may be used by micro-architecture to perform operations in accordance with at least one embodiment. In at least one embodiment, a trace cache 2630 may assemble decoded uops into program ordered sequences or traces in a uop queue 2634 for execution. In at least one embodiment, when trace cache 2630 encounters a complex instruction, a microcode ROM 2632 provides uops needed to complete operation.

In at least one embodiment, some instructions may be converted into a single micro-op, whereas others need several micro-ops to complete full operation. In at least one embodiment, if more than four micro-ops are needed to complete an instruction, instruction decoder 2628 may access microcode ROM 2632 to perform instruction. In at least one embodiment, an instruction may be decoded into a small number of micro-ops for processing at instruction decoder 2628. In at least one embodiment, an instruction may be stored within microcode ROM 2632 should a number of micro-ops be needed to accomplish operation. In at least one embodiment, trace cache 2630 refers to an entry point programmable logic array ("PLA") to determine a correct micro-instruction pointer for reading microcode sequences to complete one or more instructions from microcode ROM 2632 in accordance with at least one embodiment. In at least one embodiment, after microcode ROM 2632 finishes sequencing micro-ops for an instruction, front end 2601 of the machine may resume fetching micro-ops from trace cache 2630.

In at least one embodiment, out-of-order execution engine ("out of order engine") 2603 may prepare instructions for execution. In at least one embodiment, out-of-order execution logic has a number of buffers to smooth out and re-order flow of instructions to optimize performance as they go down pipeline and get scheduled for execution. out-of-order execution engine 2603 includes, without limitation, an allocator/register renamer 2640, a memory uop queue 2642, an integer/floating point uop queue 2644, a memory scheduler 2646, a fast scheduler 2602, a slow/general floating point scheduler ("slow/general FP scheduler") 2604, and a simple floating point scheduler ("simple FP scheduler") 2606. In at least one embodiment, fast schedule 2602, slow/general floating point scheduler 2604, and simple floating point scheduler 2606 are also collectively referred to herein as "uop schedulers 2602, 2604, 2606." allocator/register renamer 2640 allocates machine buffers and resources that each uop needs in order to execute. In at least one embodiment, allocator/register renamer 2640 renames logic registers onto entries in a register file. In at least one embodiment, allocator/register renamer 2640 also allocates an entry for each uop in one of two uop queues, memory uop queue 2642 for memory operations and integer/floating point uop queue 2644 for non-memory operations, in front of memory scheduler 2646 and uop schedulers 2602, 2604, 2606. In at least one embodiment, uop schedulers 2602, 2604, 2606, determine when a uop is ready to execute based on readiness of their dependent input register operand sources and availability of execution resources uops need to complete their operation. In at least one embodiment, fast scheduler 2602 of at least one embodiment may schedule on each half of main clock cycle while slow/general floating point scheduler 2604 and simple floating point scheduler 2606 may schedule once per main processor clock cycle. In at least one embodiment, uop schedulers 2602, 2604, 2606 arbitrate for dispatch ports to schedule uops for execution.

In at least one embodiment, execution block b11 includes, without limitation, an integer register file/bypass network 2608, a floating point register file/bypass network ("FP register file/bypass network") 2610, address generation units ("AGUs") 2612 and 2614, fast Arithmetic Logic Units (ALUs) ("fast ALUs") 2616 and 2618, a slow Arithmetic Logic Unit ("slow ALU") 2620, a floating point ALU ("FP") 2622, and a floating point move unit ("FP move") 2624. In at least one embodiment, integer register file/bypass network 2608 and floating point register file/bypass network 2610 are also referred to herein as "register files 2608, 2610." In at least one embodiment, AGUSs 2612 and 2614, fast ALUs 2616 and 2618, slow ALU 2620, floating point ALU 2622, and floating point move unit 2624 are also referred to herein as "execution units 2612, 2614, 2616, 2618, 2620, 2622, and 2624." In at least one embodiment, execution block b11 may include, without limitation, any number (including zero) and type of register files, bypass networks, address generation units, and execution units, in any combination.

In at least one embodiment, register files 2608, 2610 may be arranged between uop schedulers 2602, 2604, 2606, and execution units 2612, 2614, 2616, 2618, 2620, 2622, and 2624. In at least one embodiment, integer register file/bypass network 2608 performs integer operations. In at least one embodiment, floating point register file/bypass network 2610 performs floating point operations. In at least one embodiment, each of register files 2608, 2610 may include, without limitation, a bypass network that may bypass or forward just completed results that have not yet been written into register file to new dependent uops. In at least one embodiment, register files 2608, 2610 may communicate data with each other. In at least one embodiment, integer register file/bypass network 2608 may include, without limitation, two separate register files, one register file for low-order thirty-two bits of data and a second register file for high order thirty-two bits of data. In at least one embodiment, floating point register file/bypass network 2610 may include, without limitation, 128-bit wide entries because floating point instructions typically have operands from 64 to 128 bits in width.

In at least one embodiment, execution units 2612, 2614, 2616, 2618, 2620, 2622, 2624 may execute instructions. In at least one embodiment, register files 2608, 2610 store integer and floating point data operand values that microinstructions need to execute. In at least one embodiment, processor 2600 may include, without limitation, any number and combination of execution units 2612, 2614, 2616, 2618, 2620, 2622, 2624. In at least one embodiment, floating point ALU 2622 and floating point move unit 2624, may execute floating point, MMX, SIMD, AVX and SSE, or other operations, including specialized machine learning instructions. In at least one embodiment, floating point ALU 2622 may include, without limitation, a 64-bit by 64-bit floating point divider to execute divide, square root, and remainder micro ops. In at least one embodiment, instructions involving a floating point value may be handled with floating point hardware. In at least one embodiment, ALU operations may be passed to fast ALUs 2616, 2618. In at least one embodiment, fast ALUS 2616, 2618 may execute fast operations with an effective latency of half a clock cycle. In at least one embodiment, most complex integer operations go to slow ALU 2620 as slow ALU 2620 may include, without limitation, integer execution hardware for long-latency type of operations, such as a multiplier, shifts, flag logic, and branch processing. In at least one embodiment, memory load/store operations may be executed by AGUS 2612, 2614. In at least one embodiment, fast ALU 2616, fast ALU 2618, and slow ALU 2620 may perform integer operations on 64-bit data operands. In at least one embodiment, fast ALU 2616, fast ALU 2618, and slow ALU 2620 may be implemented to support a variety of data bit sizes including sixteen, thirty-two, 128, 256, etc. In at least one embodiment, floating point ALU 2622 and floating point move unit 2624 may be implemented to support a range of operands having bits of various widths. In at least one embodiment, floating point ALU 2622 and floating point move unit 2624 may operate on 128-bit wide packed data operands in conjunction with SIMD and multimedia instructions.

In at least one embodiment, uop schedulers 2602, 2604, 2606, dispatch dependent operations before parent load has finished executing. In at least one embodiment, as uops may be speculatively scheduled and executed in processor 2600, processor 2600 may also include logic to handle memory misses. In at least one embodiment, if a data load misses in data cache, there may be dependent operations in flight in pipeline that have left scheduler with temporarily incorrect data. In at least one embodiment, a replay mechanism tracks and re-executes instructions that use incorrect data. In at least one embodiment, dependent operations might need to be replayed and independent ones may be allowed to complete. In at least one embodiment, schedulers and replay mechanism of at least one embodiment of a processor may also be designed to catch instruction sequences for text string comparison operations.

In at least one embodiment, term "registers" may refer to on-board processor storage locations that may be used as part of instructions to identify operands. In at least one embodiment, registers may be those that may be usable from outside of processor (from a programmer's perspective). In at least one embodiment, registers might not be limited to a particular type of circuit. Rather, in at least one embodiment, a register may store data, provide data, and perform functions described herein. In at least one embodiment, registers described herein may be implemented by circuitry within a processor using any number of different techniques, such as dedicated physical registers, dynamically allocated physical registers using register renaming, combinations of dedicated and dynamically allocated physical registers, etc. In at least one embodiment, integer registers store 32-bit integer data. A register file of at least one embodiment also contains eight multimedia SIMD registers for packed data.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment portions or all of inference and/or training logic 1015 may be incorporated into EXE Block 2611 and other memory or registers shown or not shown. For example, in at least one embodiment, training and/or inferencing techniques described herein may use one or more of ALUs illustrated in EXE Block 2611. Moreover, weight parameters may be stored in on-chip or off-chip memory and/or registers (shown or not shown) that configure ALUs of EXE Block 2611 to perform one or more machine learning algorithms, neural network architectures, use cases, or training techniques described herein.

Figure 27:
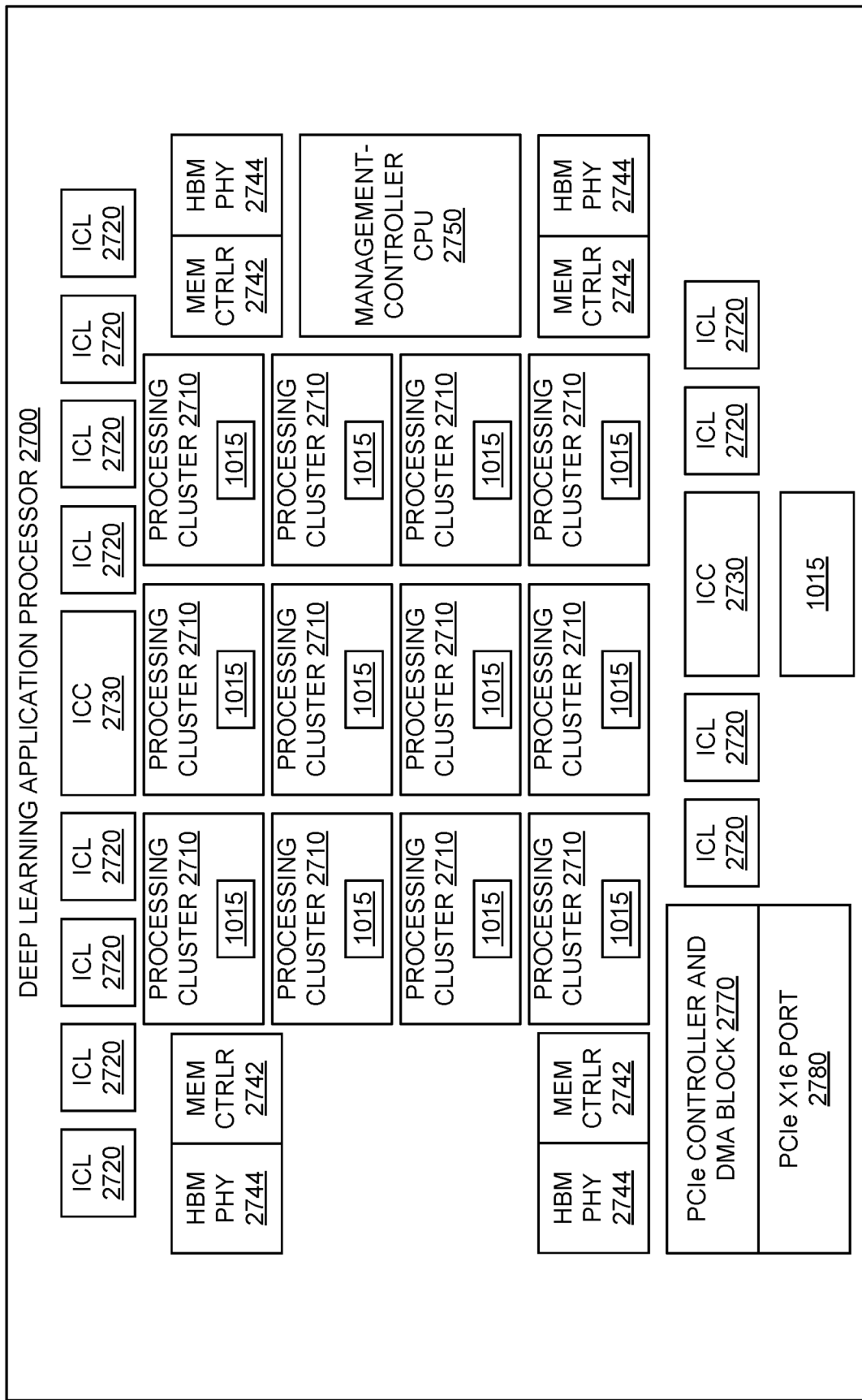
FIG. 27 illustrates a deep learning application processor, according to at least one embodiment.

FIG. 27 illustrates a deep learning application processor 2700, according to at least one embodiment. In at least one embodiment, deep learning application processor 2700 uses instructions that, if executed by deep learning application processor 2700, cause deep learning application processor 2700 to perform some or all of processes and techniques described throughout this disclosure. In at least one embodiment, deep learning application processor 2700 is an application-specific integrated circuit (ASIC). In at least one embodiment, application processor 2700 performs matrix multiply operations either "hard-wired" into hardware as a result of performing one or more instructions or both. In at least one embodiment, deep learning application processor 2700 includes, without limitation, processing clusters 2710(1)-2710(12), Inter-Chip Links ("ICLs") 2720(1)-2720(12), Inter-Chip Controllers ("ICCs") 2730(1)-2730(2), high bandwidth memory second generation ("HBM2") 2740(1)-2740(4), memory controllers ("Mem Ctrlrs") 2742(1)-2742(4), high bandwidth memory physical layer ("HBM PHY") 2744(1)-2744(4), a management-controller central processing unit ("management-controller CPU") 2750, a Serial Peripheral Interface, Inter-Integrated Circuit, and General Purpose Input/Output block ("SPI, I2C, GPIO") 2760, a peripheral component interconnect express controller and direct memory access block ("PCIe Controller and DMA") 2770, and a sixteen-lane peripheral component interconnect express port ("PCI Express×16") 2780.

In at least one embodiment, processing clusters 2710 may perform deep learning operations, including inference or prediction operations based on weight parameters calculated one or more training techniques, including those described herein. In at least one embodiment, each processing cluster 2710 may include, without limitation, any number and type of processors. In at least one embodiment, deep learning application processor 2700 may include any number and type of processing clusters 2700. In at least one embodiment, Inter-Chip Links 2720 are bi-directional. In at least one embodiment, Inter-Chip Links 2720 and Inter-Chip Controllers 2730 enable multiple deep learning application processors 2700 to exchange information, including activation information resulting from performing one or more machine learning algorithms embodied in one or more neural networks. In at least one embodiment, deep learning application processor 2700 may include any number (including zero) and type of ICLs 2720 and ICCs 2730.

In at least one embodiment, HBM2s 2740 provide a total of 32 Gigabytes (GB) of memory. HBM2 2740(*i*) is associated with both memory controller 2742(*i*) and HBM PHY 2744(*i*). In at least one embodiment, any number of HBM2s 2740 may provide any type and total amount of high bandwidth memory and may be associated with any number (including zero) and type of memory controllers 2742 and HBM PHYs 2744. In at least one embodiment, SPI, I2C, GPIO 2760, PCIe Controller and DMA 2770, and/or PCIe 2780 may be replaced with any number and type of blocks that enable any number and type of communication standards in any technically feasible fashion.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, deep learning application processor is used to train a machine learning model, such as a neural network, to predict or infer information provided to deep learning application processor 2700. In at least one embodiment, deep learning application processor 2700 is used to infer or predict information based on a trained machine learning model (e.g., neural network) that has been trained by another processor or system or by deep learning application processor 2700. In at least one embodiment, processor 2700 may be used to perform one or more neural network use cases described herein.

Figure 28:
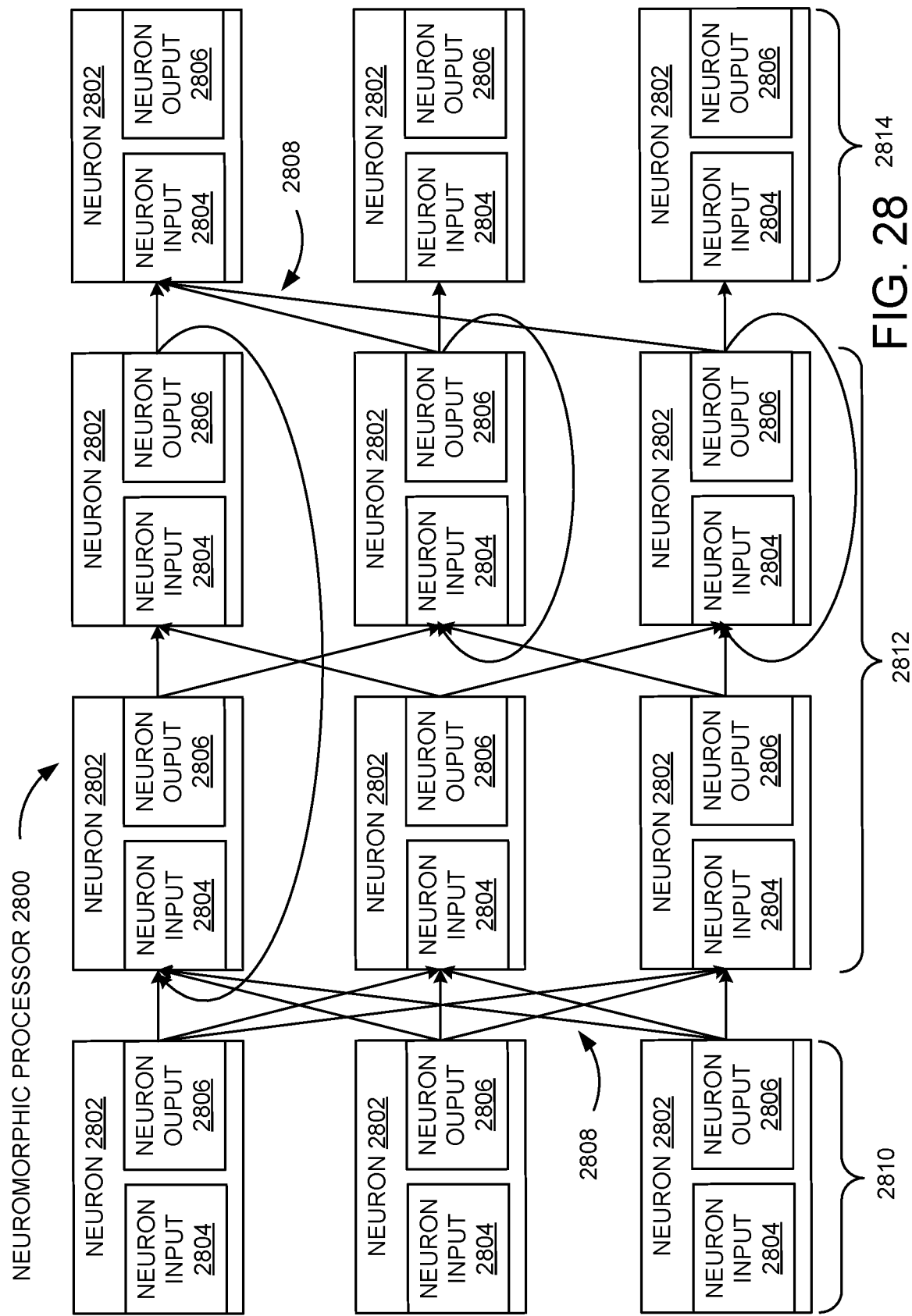
FIG. 28 is a block diagram illustrating an example neuromorphic processor, according to at least one embodiment.

FIG. 28 is a block diagram of a neuromorphic processor 2800, according to at least one embodiment. In at least one embodiment, neuromorphic processor 2800 may receive one or more inputs from sources external to neuromorphic processor 2800. In at least one embodiment, these inputs may be transmitted to one or more neurons 2802 within neuromorphic processor 2800. In at least one embodiment, neurons 2802 and components thereof may be implemented using circuitry or logic, including one or more arithmetic logic units (ALUs). In at least one embodiment, neuromorphic processor 2800 may include, without limitation, thousands or millions of instances of neurons 2802, but any suitable number of neurons 2802 may be used. In at least one embodiment, each instance of neuron 2802 may include a neuron input 2804 and a neuron output 2806. In at least one embodiment, neurons 2802 may generate outputs that may be transmitted to inputs of other instances of neurons 2802. For example, in at least one embodiment, neuron inputs 2804 and neuron outputs 2806 may be interconnected via synapses 2808.

In at least one embodiment, neurons 2802 and synapses 2808 may be interconnected such that neuromorphic processor 2800 operates to process or analyze information received by neuromorphic processor 2800. In at least one embodiment, neurons 2802 may transmit an output pulse (or "fire" or "spike") when inputs received through neuron input 2804 exceed a threshold. In at least one embodiment, neurons 2802 may sum or integrate signals received at neuron inputs 2804. For example, in at least one embodiment, neurons 2802 may be implemented as leaky integrate-and-fire neurons, wherein if a sum (referred to as a "membrane potential") exceeds a threshold value, neuron 2802 may generate an output (or "fire") using a transfer function such as a sigmoid or threshold function. In at least one embodiment, a leaky integrate-and-fire neuron may sum signals received at neuron inputs 2804 into a membrane potential and may also apply a decay factor (or leak) to reduce a membrane potential. In at least one embodiment, a leaky integrate-and-fire neuron may fire if multiple input signals are received at neuron inputs 2804 rapidly enough to exceed a threshold value (i.e., before a membrane potential decays too low to fire). In at least one embodiment, neurons 2802 may be implemented using circuits or logic that receive inputs, integrate inputs into a membrane potential, and decay a membrane potential. In at least one embodiment, inputs may be averaged, or any other suitable transfer function may be used. Furthermore, in at least one embodiment, neurons 2802 may include, without limitation, comparator circuits or logic that generate an output spike at neuron output 2806 when result of applying a transfer function to neuron input 2804 exceeds a threshold. In at least one embodiment, once neuron 2802 fires, it may disregard previously received input information by, for example, resetting a membrane potential to 0 or another suitable default value. In at least one embodiment, once membrane potential is reset to 0, neuron 2802 may resume normal operation after a suitable period of time (or refractory period).

In at least one embodiment, neurons 2802 may be interconnected through synapses 2808. In at least one embodiment, synapses 2808 may operate to transmit signals from an output of a first neuron 2802 to an input of a second neuron 2802. In at least one embodiment, neurons 2802 may transmit information over more than one instance of synapse 2808. In at least one embodiment, one or more instances of neuron output 2806 may be connected, via an instance of synapse 2808, to an instance of neuron input 2804 in same neuron 2802. In at least one embodiment, an instance of neuron 2802 generating an output to be transmitted over an instance of synapse 2808 may be referred to as a "pre-synaptic neuron" with respect to that instance of synapse 2808. In at least one embodiment, an instance of neuron 2802 receiving an input transmitted over an instance of synapse 2808 may be referred to as a "post-synaptic neuron" with respect to that instance of synapse 2808. Because an instance of neuron 2802 may receive inputs from one or more instances of synapse 2808, and may also transmit outputs over one or more instances of synapse 2808, a single instance of neuron 2802 may therefore be both a "pre-synaptic neuron" and "post-synaptic neuron," with respect to various instances of synapses 2808, in at least one embodiment.

In at least one embodiment, neurons 2802 may be organized into one or more layers. Each instance of neuron 2802 may have one neuron output 2806 that may fan out through one or more synapses 2808 to one or more neuron inputs 2804. In at least one embodiment, neuron outputs 2806 of neurons 2802 in a first layer 2810 may be connected to neuron inputs 2804 of neurons 2802 in a second layer 2812. In at least one embodiment, layer 2810 may be referred to as a "feed-forward layer." In at least one embodiment, each instance of neuron 2802 in an instance of first layer 2810 may fan out to each instance of neuron 2802 in second layer 2812. In at least one embodiment, first layer 2810 may be referred to as a "fully connected feed-forward layer." In at least one embodiment, each instance of neuron 2802 in an instance of second layer 2812 may fan out to fewer than all instances of neuron 2802 in a third layer 2814. In at least one embodiment, second layer 2812 may be referred to as a "sparsely connected feed-forward layer." In at least one embodiment, neurons 2802 in second layer 2812 may fan out to neurons 2802 in multiple other layers, including to neurons 2802 in (same) second layer 2812. In at least one embodiment, second layer 2812 may be referred to as a "recurrent layer." Neuromorphic processor 2800 may include, without limitation, any suitable combination of recurrent layers and feed-forward layers, including, without limitation, both sparsely connected feed-forward layers and fully connected feed-forward layers.

In at least one embodiment, neuromorphic processor 2800 may include, without limitation, a reconfigurable interconnect architecture or dedicated hard wired interconnects to connect synapse 2808 to neurons 2802. In at least one embodiment, neuromorphic processor 2800 may include, without limitation, circuitry or logic that allows synapses to be allocated to different neurons 2802 as needed based on neural network topology and neuron fan-in/out. For example, in at least one embodiment, synapses 2808 may be connected to neurons 2802 using an interconnect fabric, such as network-on-chip, or with dedicated connections. In at least one embodiment, synapse interconnections and components thereof may be implemented using circuitry or logic.

Figure 29:
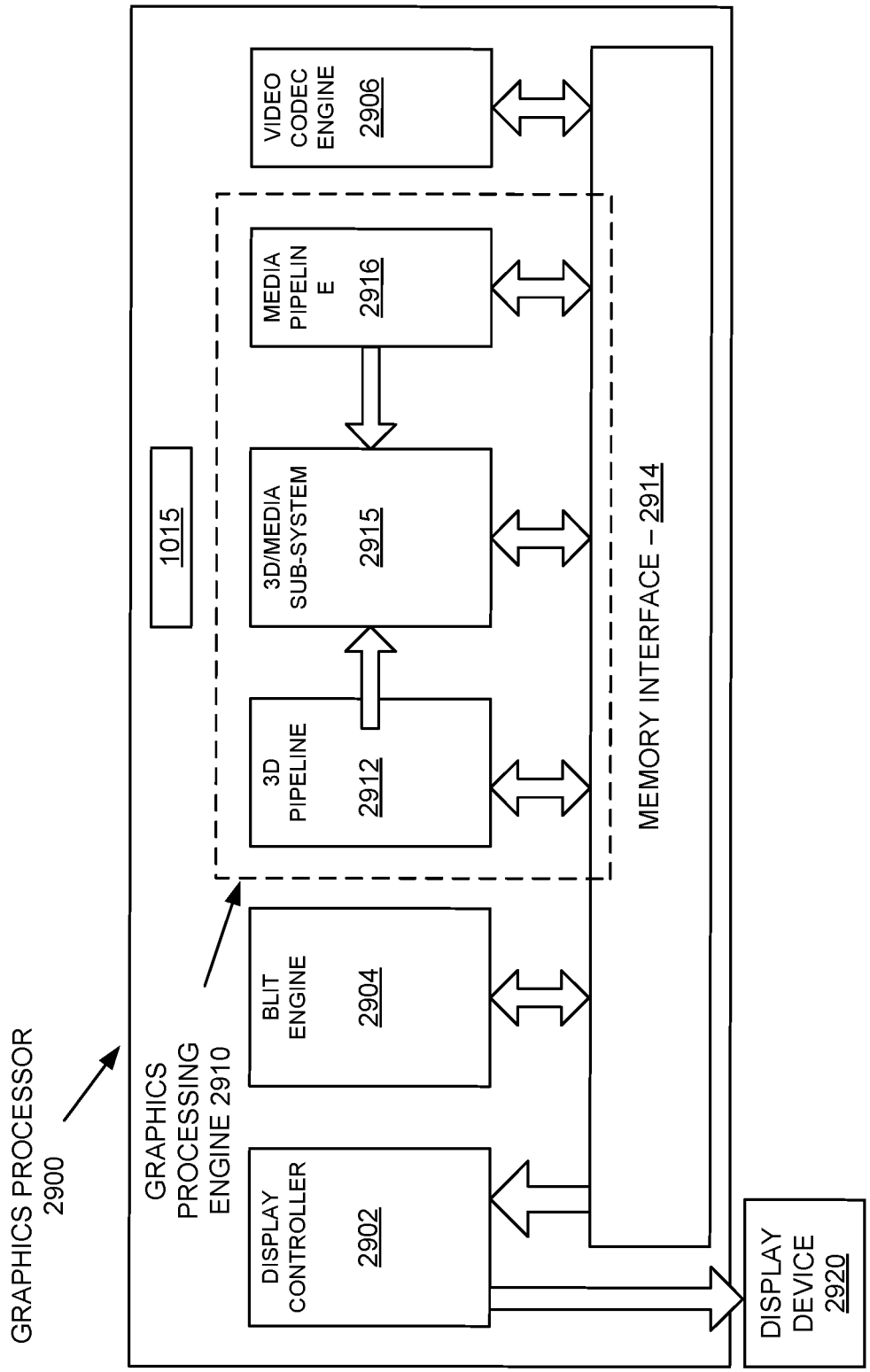
FIG. 29 illustrates at least portions of a graphics processor, according to one or more embodiments.

FIG. 29A is a block diagram of a graphics processor 2900, which may be a discrete graphics processing unit, or may be a graphics processor integrated with a plurality of processing cores. In at least one embodiment, graphics processor 2900 communicates via a memory mapped I/O interface to registers on graphics processor 2900 and with commands placed into memory. In at least one embodiment, graphics processor 2900 includes a memory interface 2914 to access memory. In at least one embodiment, memory interface 2914 is an interface to local memory, one or more internal caches, one or more shared external caches, and/or to system memory.

In at least one embodiment, graphics processor 2900 also includes a display controller 2902 to drive display output data to a display device 2920. In at least one embodiment, display controller 2902 includes hardware for one or more overlay planes for display device 2920 and composition of multiple layers of video or user interface elements. In at least one embodiment, display device 2920 can be an internal or external display device. In at least one embodiment, display device 2920 is a head mounted display device, such as a virtual reality (VR) display device or an augmented reality (AR) display device. In at least one embodiment, graphics processor 2900 includes a video codec engine 2906 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In at least one embodiment, graphics processor 2900 includes a block image transfer (BLIT) engine 2904 to perform two-dimensional (2D) rasterizer operations including, for example, bit-boundary block transfers. However, in at least one embodiment, 2D graphics operations are performed using one or more components of graphics processing engine (GPE) 2910. In at least one embodiment, GPE 2910 is a compute engine for performing graphics operations, including three-dimensional (3D) graphics operations and media operations.

In at least one embodiment, GPE 2910 includes a 3D pipeline 2912 for performing 3D operations, such as rendering three-dimensional images and scenes using processing functions that act upon 3D primitive shapes (e.g., rectangle, triangle, etc.). 3D pipeline 2912 includes programmable and fixed function elements that perform various tasks and/or spawn execution threads to a 3D/Media subsystem 2915. While 3D pipeline 2912 can be used to perform media operations, in at least one embodiment, GPE 2910 also includes a media pipeline 2916 that is used to perform media operations, such as video post-processing and image enhancement.

In at least one embodiment, media pipeline 2916 includes fixed function or programmable logic units to perform one or more specialized media operations, such as video decode acceleration, video de-interlacing, and video encode acceleration in place of, or on behalf of video codec engine 2906. In at least one embodiment, media pipeline 2916 additionally includes a thread spawning unit to spawn threads for execution on 3D/Media sub-system 2915. In at least one embodiment, spawned threads perform computations for media operations on one or more graphics execution units included in 3D/Media sub-system 2915.

In at least one embodiment, 3D/Media subsystem 2915 includes logic for executing threads spawned by 3D pipeline 2912 and media pipeline 2916. In at least one embodiment, 3D pipeline 2912 and media pipeline 2916 send thread execution requests to 3D/Media subsystem 2915, which includes thread dispatch logic for arbitrating and dispatching various requests to available thread execution resources. In at least one embodiment, execution resources include an array of graphics execution units to process 3D and media threads. In at least one embodiment, 3D/Media subsystem 2915 includes one or more internal caches for thread instructions and data. In at least one embodiment, subsystem 2915 also includes shared memory, including registers and addressable memory, to share data between threads and to store output data.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment portions or all of inference and/or training logic 1015 may be incorporated into graphics processor 2900. For example, in at least one embodiment, training and/or inferencing techniques described herein may use one or more of ALUs embodied in 3D pipeline 2912. Moreover, in at least one embodiment, inferencing and/or training operations described herein may be done using logic other than the logic illustrated in FIG. 10 or 10B. In at least one embodiment, weight parameters may be stored in on-chip or off-chip memory and/or registers (shown or not shown) that configure ALUs of graphics processor 2900 to perform one or more machine learning algorithms, neural network architectures, use cases, or training techniques described herein.

Figure 30:
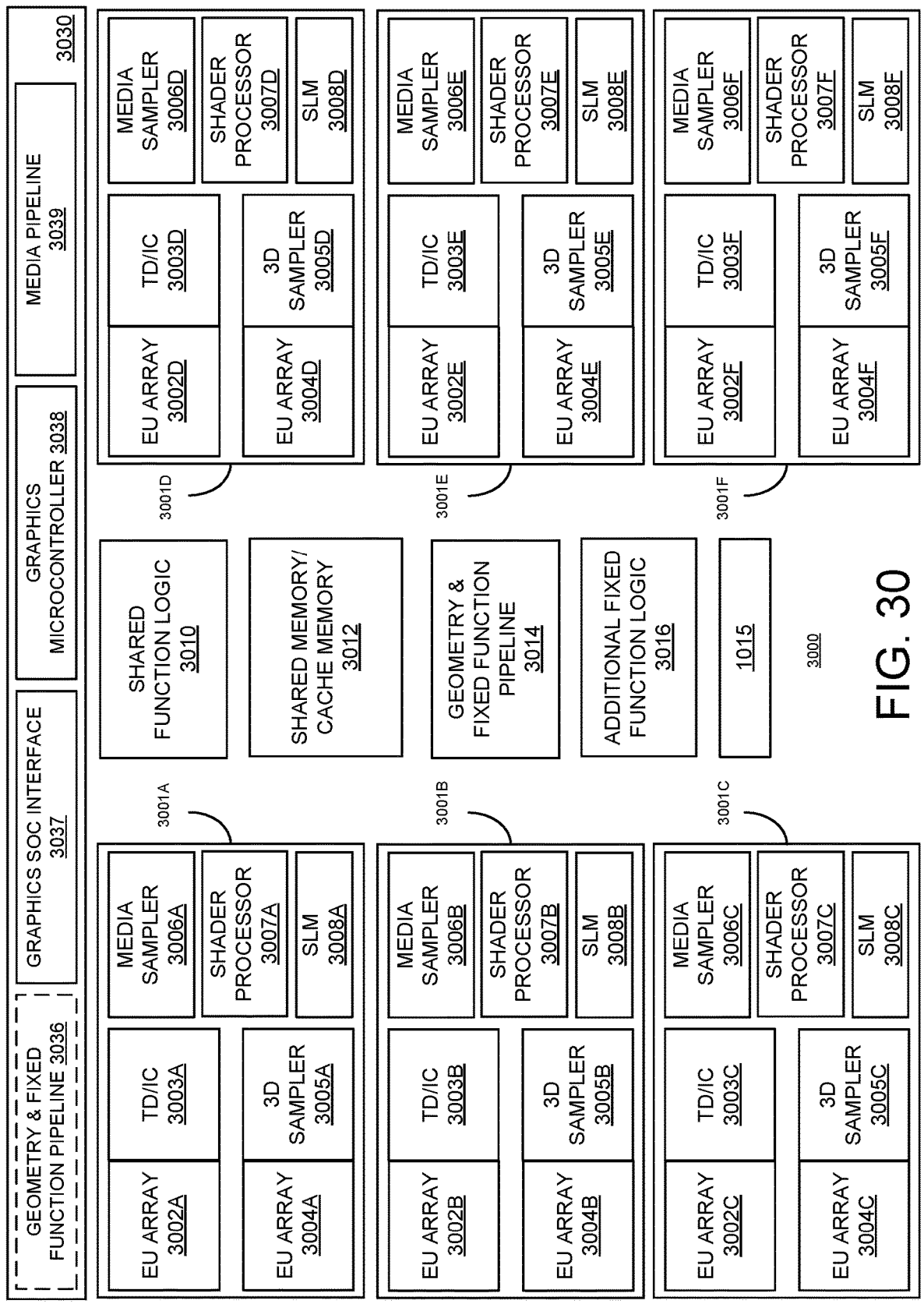
FIG. 30 is a block diagram of at least portions of a graphics processor core, according to at least one embodiment.

FIG. 30 is a block diagram of hardware logic of a graphics processor core 3000, according to at least one embodiment described herein. In at least one embodiment, graphics processor core 3000 is included within a graphics core array. In at least one embodiment, graphics processor core 3000, sometimes referred to as a core slice, can be one or multiple graphics cores within a modular graphics processor. In at least one embodiment, graphics processor core 3000 is exemplary of one graphics core slice, and a graphics processor as described herein may include multiple graphics core slices based on target power and performance envelopes. In at least one embodiment, each graphics core 3000 can include a fixed function block 3030 coupled with multiple sub-cores 3001A-3001F, also referred to as sub-slices, that include modular blocks of general-purpose and fixed function logic.

In at least one embodiment, fixed function block 3030 includes a geometry/fixed function pipeline 3036 that can be shared by all sub-cores in graphics processor 3000, for example, in lower performance and/or lower power graphics processor implementations. In at least one embodiment, geometry/fixed function pipeline 3036 includes a 3D fixed function pipeline, a video front-end unit, a thread spawner and thread dispatcher, and a unified return buffer manager, which manages unified return buffers.

In at least one embodiment fixed function block 3030 also includes a graphics SoC interface 3037, a graphics microcontroller 3038, and a media pipeline 3039. Graphics SoC interface 3037 provides an interface between graphics core 3000 and other processor cores within a system on a chip integrated circuit. In at least one embodiment, graphics microcontroller 3038 is a programmable sub-processor that is configurable to manage various functions of graphics processor 3000, including thread dispatch, scheduling, and pre-emption. In at least one embodiment, media pipeline 3039 includes logic to facilitate decoding, encoding, pre-processing, and/or post-processing of multimedia data, including image and video data. In at least one embodiment, media pipeline 3039 implement media operations via requests to compute or sampling logic within sub-cores 3001-3001F.

In at least one embodiment, SoC interface 3037 enables graphics core 3000 to communicate with general-purpose application processor cores (e.g., CPUs) and/or other components within an SoC, including memory hierarchy elements such as a shared last level cache memory, system RAM, and/or embedded on-chip or on-package DRAM. In at least one embodiment, SoC interface 3037 can also enable communication with fixed function devices within an SoC, such as camera imaging pipelines, and enables use of and/or implements global memory atomics that may be shared between graphics core 3000 and CPUs within an SoC. In at least one embodiment, SoC interface 3037 can also implement power management controls for graphics core 3000 and enable an interface between a clock domain of graphic core 3000 and other clock domains within an SoC. In at least one embodiment, SoC interface 3037 enables receipt of command buffers from a command streamer and global thread dispatcher that are configured to provide commands and instructions to each of one or more graphics cores within a graphics processor. In at least one embodiment, commands and instructions can be dispatched to media pipeline 3039, when media operations are to be performed, or a geometry and fixed function pipeline (e.g., geometry and fixed function pipeline 3036, geometry and fixed function pipeline 3014) when graphics processing operations are to be performed.

In at least one embodiment, graphics microcontroller 3038 can be configured to perform various scheduling and management tasks for graphics core 3000. In at least one embodiment, graphics microcontroller 3038 can perform graphics and/or compute workload scheduling on various graphics parallel engines within execution unit (EU) arrays 3002A-3002F, 3004A-3004F within sub-cores 3001A-3001F. In at least one embodiment, host software executing on a CPU core of an SoC including graphics core 3000 can submit workloads one of multiple graphic processor doorbells, which invokes a scheduling operation on an appropriate graphics engine. In at least one embodiment, scheduling operations include determining which workload to run next, submitting a workload to a command streamer, pre-empting existing workloads running on an engine, monitoring progress of a workload, and notifying host software when a workload is complete. In at least one embodiment, graphics microcontroller 3038 can also facilitate low-power or idle states for graphics core 3000, providing graphics core 3000 with an ability to save and restore registers within graphics core 3000 across low-power state transitions independently from an operating system and/or graphics driver software on a system.

In at least one embodiment, graphics core 3000 may have greater than or fewer than illustrated sub-cores 3001A-3001F, up to N modular sub-cores. For each set of N sub-cores, in at least one embodiment, graphics core 3000 can also include shared function logic 3010, shared and/or cache memory 3012, a geometry/fixed function pipeline 3014, as well as additional fixed function logic 3016 to accelerate various graphics and compute processing operations. In at least one embodiment, shared function logic 3010 can include logic units (e.g., sampler, math, and/or inter-thread communication logic) that can be shared by each N sub-cores within graphics core 3000. Shared and/or cache memory 3012 can be a last-level cache for N sub-cores 3001A-3001F within graphics core 3000 and can also serve as shared memory that is accessible by multiple sub-cores. In at least one embodiment, geometry/fixed function pipeline 3014 can be included instead of geometry/fixed function pipeline 3036 within fixed function block 3030 and can include the same or similar logic units.

In at least one embodiment, graphics core 3000 includes additional fixed function logic 3016 that can include various fixed function acceleration logic for use by graphics core 3000. In at least one embodiment, additional fixed function logic 3016 includes an additional geometry pipeline for use in position-only shading. In position-only shading, at least two geometry pipelines exist, whereas in a full geometry pipeline within geometry/fixed function pipeline 3016, 3036, and a cull pipeline, which is an additional geometry pipeline which may be included within additional fixed function logic 3016. In at least one embodiment, cull pipeline is a trimmed down version of a full geometry pipeline. In at least one embodiment, a full pipeline and a cull pipeline can execute different instances of an application, each instance having a separate context. In at least one embodiment, position only shading can hide long cull runs of discarded triangles, enabling shading to be completed earlier in some instances. For example, in at least one embodiment, cull pipeline logic within additional fixed function logic 3016 can execute position shaders in parallel with a main application and generally generates critical results faster than a full pipeline, as cull pipeline fetches and shades position attribute of vertices, without performing rasterization and rendering of pixels to a frame buffer. In at least one embodiment, cull pipeline can use generated critical results to compute visibility information for all triangles without regard to whether those triangles are culled. In at least one embodiment, full pipeline (which in this instance may be referred to as a replay pipeline) can consume visibility information to skip culled triangles to shade only visible triangles that are finally passed to a rasterization phase.

In at least one embodiment, additional fixed function logic 3016 can also include machine-learning acceleration logic, such as fixed function matrix multiplication logic, for implementations including optimizations for machine learning training or inferencing.

In at least one embodiment, within each graphics sub-core 3001A-3001F includes a set of execution resources that may be used to perform graphics, media, and compute operations in response to requests by graphics pipeline, media pipeline, or shader programs. In at least one embodiment, graphics sub-cores 3001A-3001F include multiple EU arrays 3002A-3002F, 3004A-3004F, thread dispatch and inter-thread communication (TD/IC) logic 3003A-3003F, a 3D (e.g., texture)

sampler 3005A-3005F, a media sampler 3006A-3006F, a shader processor 3007A-3007F, and shared local memory (SLM) 3008A-3008F. EU arrays 3002A-3002F, 3004A-3004F each include multiple execution units, which are general-purpose graphics processing units capable of performing floating-point and integer/fixed-point logic operations in service of a graphics, media, or compute operation, including graphics, media, or compute shader programs. In at least one embodiment, TD/IC logic 3003A-3003F performs local thread dispatch and thread control operations for execution units within a sub-core and facilitate communication between threads executing on execution units of a sub-core. In at least one embodiment, 3D sampler 3005A-3005F can read texture or other 3D graphics related data into memory. In at least one embodiment, 3D sampler can read texture data differently based on a configured sample state and texture format associated with a given texture. In at least one embodiment, media sampler 3006A-3006F can perform similar read operations based on a type and format associated with media data. In at least one embodiment, each graphics sub-core 3001A-3001F can alternately include a unified 3D and media sampler. In at least one embodiment, threads executing on execution units within each of sub-cores 3001A-3001F can make use of shared local memory 3008A-3008F within each sub-core, to enable threads executing within a thread group to execute using a common pool of on-chip memory.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, portions or all of inference and/or training logic 1015 may be incorporated into graphics processor 3010. For example, in at least one embodiment, training and/or inferencing techniques described herein may use one or more of ALUs embodied in 3D pipeline 3010, graphics microcontroller 3038, geometry & fixed function pipeline 3014 and 3036, or other logic in FIG. 29B. Moreover, in at least one embodiment, inferencing and/or training operations described herein may be done using logic other than the logic illustrated in FIG. 10 or 10B. In at least one embodiment, weight parameters may be stored in on-chip or off-chip memory and/or registers (shown or not shown) that configure ALUs of graphics processor 3000 to perform one or more machine learning algorithms, neural network architectures, use cases, or training techniques described herein.

Figure 31A:
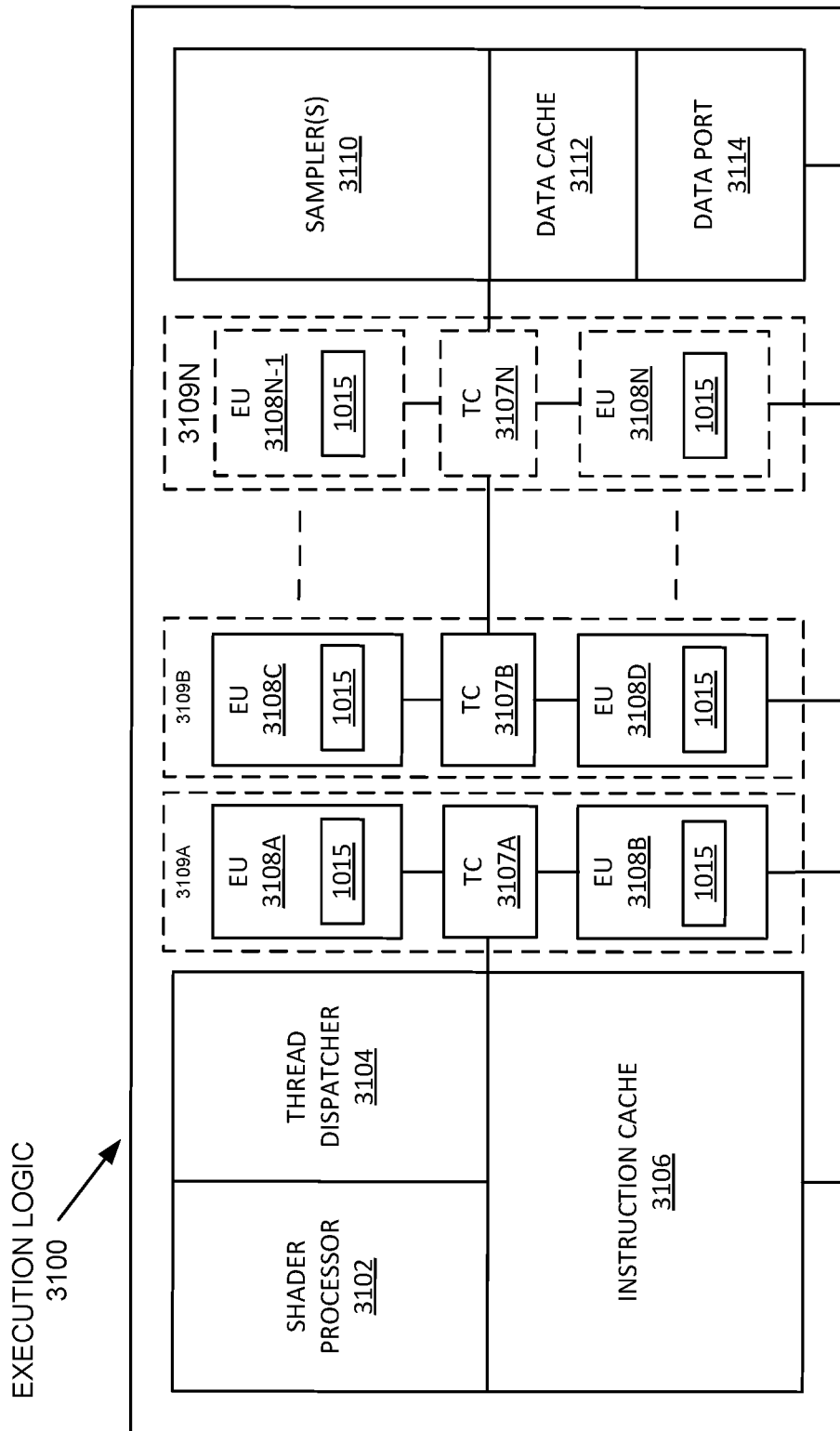
FIGS. 31A and 31B illustrate thread execution logic, according to at least one embodiment.
Figure 31B:
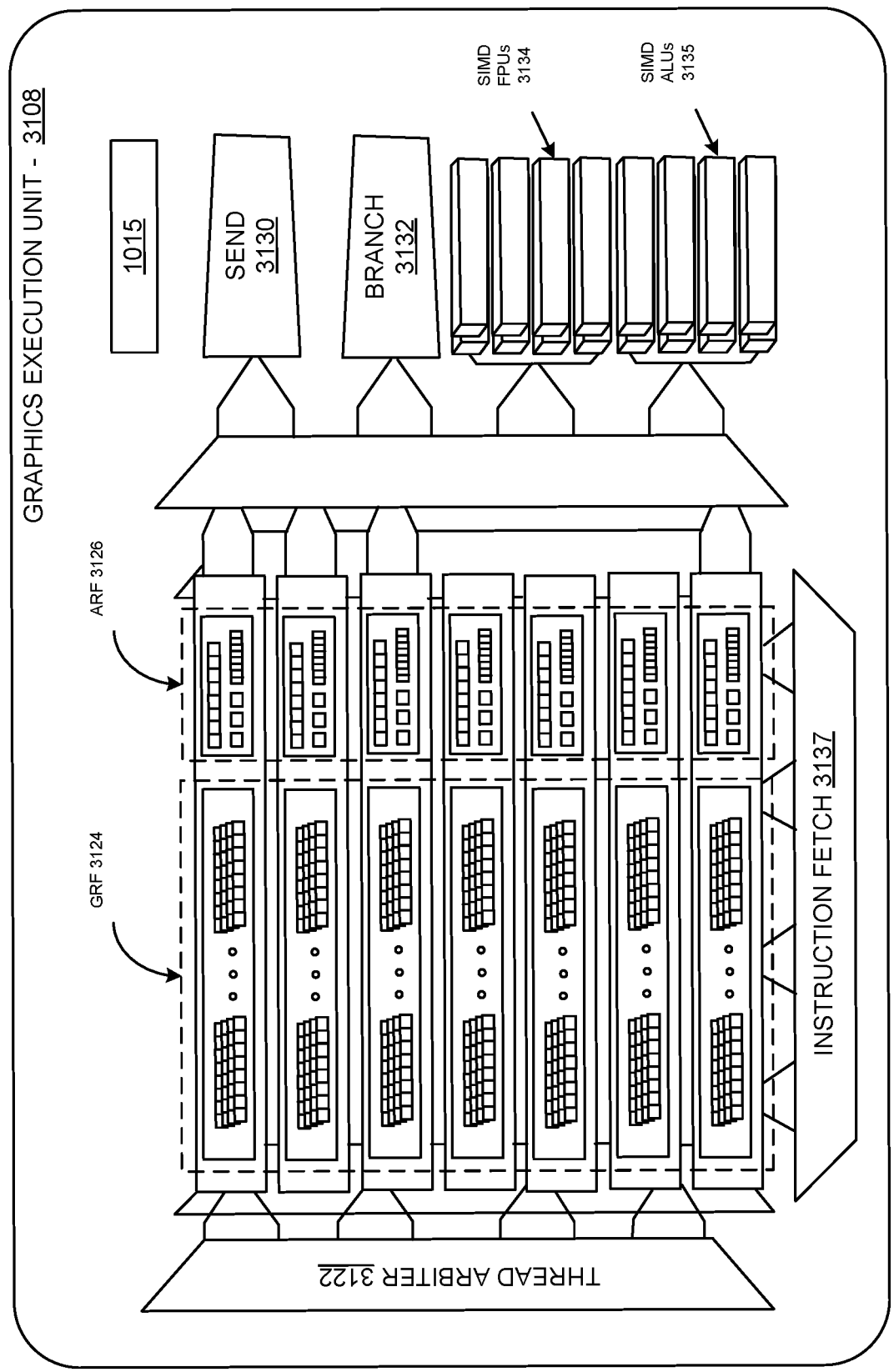

FIGS. 31A-31B illustrate thread execution logic 3100 including an array of processing elements of a graphics processor core according to at least one embodiment. FIG. 31A illustrates at least one embodiment, in which thread execution logic 3100 is used. FIG. 31B illustrates exemplary internal details of an execution unit, according to at least one embodiment.

As illustrated in FIG. 31A, in at least one embodiment, thread execution logic 3100 includes a shader processor 3102, a thread dispatcher 3104, instruction cache 3106, a scalable execution unit array including a plurality of execution units 3108A-3108N, a sampler 3110, a data cache 3112, and a data port 3114. In at least one embodiment a scalable execution unit array can dynamically scale by enabling or disabling one or more execution units (e.g., any of execution unit 3108A, 3108B, 3108C, 3108D, through 3108N-1 and 3108N) based on computational requirements of a workload, for example. In at least one embodiment, scalable execution units are interconnected via an interconnect fabric that links to each execution unit. In at least one embodiment, thread execution logic 3100 includes one or more connections to memory, such as system memory or cache memory, through one or more of instruction cache 3106, data port 3114, sampler 3110, and execution units 3108A-3108N. In at least one embodiment, each execution unit (e.g., 3108A) is a stand-alone programmable general-purpose computational unit that is capable of executing multiple simultaneous hardware threads while processing multiple data elements in parallel for each thread. In at least one embodiment, array of execution units 3108A-3108N is scalable to include any number individual execution units.

In at least one embodiment, execution units 3108A-3108N are primarily used to execute shader programs. In at least one embodiment, shader processor 3102 can process various shader programs and dispatch execution threads associated with shader programs via a thread dispatcher 3104. In at least one embodiment, thread dispatcher 3104 includes logic to arbitrate thread initiation requests from graphics and media pipelines and instantiate requested threads on one or more execution units in execution units 3108A-3108N. For example, in at least one embodiment, a geometry pipeline can dispatch vertex, tessellation, or geometry shaders to thread execution logic for processing. In at least one embodiment, thread dispatcher 3104 can also process runtime thread spawning requests from executing shader programs.

In at least one embodiment, execution units 3108A-3108N support an instruction set that includes native support for many standard 3D graphics shader instructions, such that shader programs from graphics libraries (e.g., Direct 3D and OpenGL) are executed with minimal translation. In at least one embodiment, execution units support vertex and geometry processing (e.g., vertex programs, geometry programs, vertex shaders), pixel processing (e.g., pixel shaders, fragment shaders) and general-purpose processing (e.g., compute and media shaders). In at least one embodiment, each of execution units 3108A-3108N, which include one or more arithmetic logic units (ALUs), is capable of multi-issue single instruction multiple data (SIMD) execution and multi-threaded operation enables an efficient execution environment despite higher latency memory accesses. In at least one embodiment, each hardware thread within each execution unit has a dedicated high-bandwidth register file and associated independent thread-state. In at least one embodiment, execution is multi-issue per clock to pipelines capable of integer, single and double precision floating point operations, SIMD branch capability, logical operations, transcendental operations, and other miscellaneous operations. In at least one embodiment, while waiting for data from memory or one or more shared functions, dependency logic within execution units 3108A-3108N causes a waiting thread to sleep until requested data has been returned. In at least one embodiment, while a waiting thread is sleeping, hardware resources may be devoted to processing other threads. For example, in at least one embodiment, during a delay associated with a vertex shader operation, an execution unit can perform operations for a pixel shader, fragment shader, or another type of shader program, including a different vertex shader.

In at least one embodiment, each execution unit in execution units 3108A-3108N operates on arrays of data elements. In at least one embodiment, the number of data elements is "execution size," or the number of channels for an instruction. In at least one embodiment, an execution channel is a logical unit of execution for data element access, masking, and flow control within instructions. In at least one embodiment, a number of channels may be independent of a number of physical Arithmetic Logic Units (ALUs) or Floating Point Units (FPUs) for a particular graphics processor. In at least one embodiment, execution units 3108A-3108N support integer and floating-point data types.

In at least one embodiment, an execution unit instruction set includes SIMD instructions. In at least one embodiment, various data elements can be stored as a packed data type in a register and an execution unit will process various elements based on the data size of those elements. For example, in at least one embodiment, when operating on a 256-bit wide vector, 256 bits of a vector are stored in a register and an execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, in at least one embodiment, different vector widths and register sizes are possible.

In at least one embodiment, one or more execution units can be combined into a fused execution unit 3109A-3109N having thread control logic (3107A-3107N) that is common to fused EUs. In at least one embodiment, multiple EUs can be fused into an EU group. In at least one embodiment, each EU in fused EU group can be configured to execute a separate SIMD hardware thread. The number of EUs in a fused EU group can vary according to various embodiments. In at least one embodiment, various SIMD widths can be performed per-EU, including but not limited to SIMD8, SIMD16, and SIMD32. In at least one embodiment, each fused graphics execution unit 3109A-3109N includes at least two execution units. For example, in at least one embodiment, fused execution unit 3109A includes a first EU 3108A, second EU 3108B, and thread control logic 3107A that is common to first EU 3108A and second EU 3108B. In at least one embodiment, thread control logic 3107A controls threads executed on fused graphics execution unit 3109A, allowing each EU within fused execution units 3109A-3109N to execute using a common instruction pointer register.

In at least one embodiment, one or more internal instruction caches (e.g., 3106) are included in thread execution logic 3100 to cache thread instructions for execution units. In at least one embodiment, one or more data caches (e.g., 3112) are included to cache thread data during thread execution. In at least one embodiment, a sampler 3110 is included to provide texture sampling for 3D operations and media sampling for media operations. In at least one embodiment, sampler 3110 includes specialized texture or media sampling functionality to process texture or media data during the sampling process before providing sampled data to an execution unit.

During execution, in at least one embodiment, graphics and media pipelines send thread initiation requests to thread execution logic 3100 via thread spawning and dispatch logic. In at least one embodiment, once a group of geometric objects has been processed and rasterized into pixel data, pixel processor logic (e.g., pixel shader logic, fragment shader logic, etc.) within shader processor 3102 is invoked to further compute output information and cause results to be written to output surfaces (e.g., color buffers, depth buffers, stencil buffers, etc.). In at least one embodiment, a pixel shader or fragment shader calculates values of various vertex attributes that are to be interpolated across a rasterized object. In at least one embodiment, pixel processor logic within shader processor 3102 then executes an application programming interface (API)-supplied pixel or fragment shader program. In at least one embodiment, to execute a shader program, shader processor 3102 dispatches threads to an execution unit (e.g., 3108A) via thread dispatcher 3104. In at least one embodiment, shader processor 3102 uses texture sampling logic in sampler 3110 to access texture data in texture maps stored in memory. In at least one embodiment, arithmetic operations on texture data and input geometry data compute pixel color data for each geometric fragment, or discards one or more pixels from further processing.

In at least one embodiment, data port 3114 provides a memory access mechanism for thread execution logic 3100 to output processed data to memory for further processing on a graphics processor output pipeline. In at least one embodiment, data port 3114 includes or couples to one or more cache memories (e.g., data cache 3112) to cache data for memory access via a data port.

As illustrated in FIG. 31B, in at least one embodiment, a graphics execution unit 3108 can include an instruction fetch unit 3137, a general register file array (GRF) 3124, an architectural register file array (ARF) 3126, a thread arbiter 3122, a send unit 3130, a branch unit 3132, a set of SIMD floating point units (FPUs) 3134, and In at least one embodiment a set of dedicated integer SIMD ALUs 3135. In at least one embodiment, GRF 3124 and ARF 3126 includes a set of general register files and architecture register files associated with each simultaneous hardware thread that may be active in graphics execution unit 3108. In at least one embodiment, per thread architectural state is maintained in ARF 3126, while data used during thread execution is stored in GRF 3124. In at least one embodiment, execution state of each thread, including instruction pointers for each thread, can be held in thread-specific registers in ARF 3126.

In at least one embodiment, graphics execution unit 3108 has an architecture that is a combination of Simultaneous Multi-Threading (SMT) and fine-grained Interleaved Multi-Threading (IMT). In at least one embodiment, architecture has a modular configuration that can be fine-tuned at design time based on a target number of simultaneous threads and number of registers per execution unit, where execution unit resources are divided across logic used to execute multiple simultaneous threads.

In at least one embodiment, graphics execution unit 3108 can co-issue multiple instructions, which may each be different instructions. In at least one embodiment, thread arbiter 3122 of graphics execution unit thread 3108 can dispatch instructions to one of send unit 3130, branch unit 3142, or SIMD FPU(s) 3134 for execution. In at least one embodiment, each execution thread can access 128 general-purpose registers within GRF 3124, where each register can store 32 bytes, accessible as a SIMD 8-element vector of 32-bit data elements. In at least one embodiment, each execution unit thread has access to 4 Kbytes within GRF 3124, although embodiments are not so limited, and greater or fewer register resources may be provided in other embodiments. In at least one embodiment, up to seven threads can execute simultaneously, although the number of threads per execution unit can also vary according to embodiments. In at least one embodiment, in which seven threads may access 4 Kbytes, GRF 3124 can store a total of 28 Kbytes. In at least one embodiment, flexible addressing modes can permit registers to be addressed together to build effectively wider registers or to represent strided rectangular block data structures.

In at least one embodiment, memory operations, sampler operations, and other longer-latency system communications are dispatched via "send" instructions that are executed by message passing send unit 3130. In at least one embodiment, branch instructions are dispatched to a dedicated branch unit 3132 to facilitate SIMD divergence and eventual convergence.

In at least one embodiment graphics execution unit 3108 includes one or more SIMD floating point units (FPU(s)) 3134 to perform floating-point operations. In at least one embodiment, FPU(s) 3134 also support integer computation. In at least one embodiment FPU(s) 3134 can SIMD execute up to M number of 32-bit floating-point (or integer) operations, or SIMD execute up to 2M 16-bit integer or 16-bit floating-point operations. In at least one embodiment, at least one of the FPU(s) provides extended math capability to support high-throughput transcendental math functions and double precision 64-bit floating-point. In at least one embodiment, a set of 8-bit integer SIMD ALUs 3135 are also present, and may be specifically optimized to perform operations associated with machine learning computations.

In at least one embodiment, arrays of multiple instances of graphics execution unit 3108 can be instantiated in a graphics sub-core grouping (e.g., a sub-slice). In at least one embodiment execution unit 3108 can execute instructions across a plurality of execution channels. In at least one embodiment, each thread executed on graphics execution unit 3108 is executed on a different channel.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, portions or all of inference and/or training logic 1015 may be incorporated into execution logic 3100. Moreover, in at least one embodiment, inferencing and/or training operations described herein may be done using logic other than the logic illustrated in FIG. 10 or 10B. In at least one embodiment, weight parameters may be stored in on-chip or off-chip memory and/or registers (shown or not shown) that configure ALUs of execution logic 3100 to perform one or more machine learning algorithms, neural network architectures, use cases, or training techniques described herein.

Figure 32:
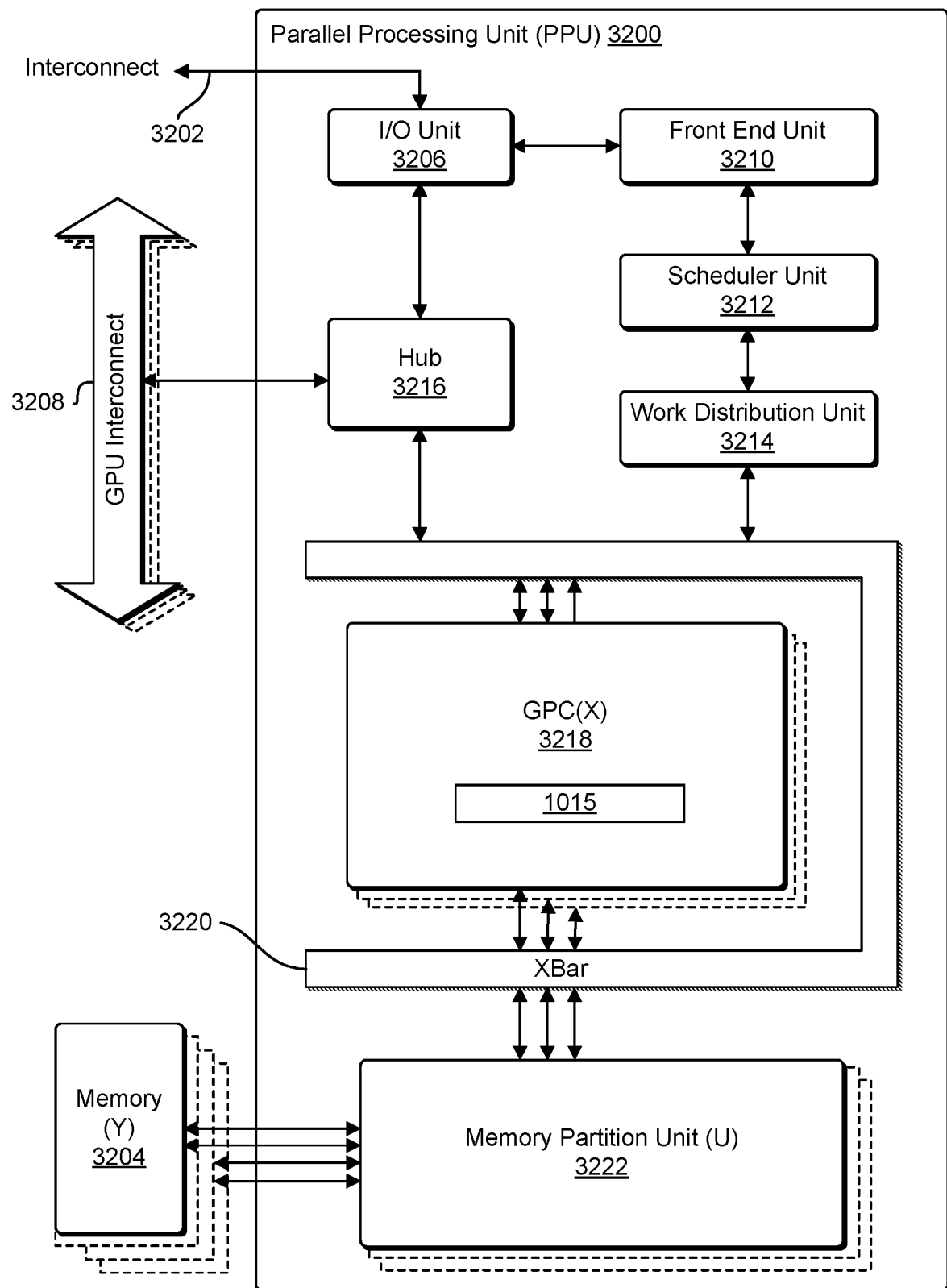
FIG. 32 illustrates a parallel processing unit ("PPU"), according to at least one embodiment.

FIG. 32 illustrates a parallel processing unit ("PPU") 3200, according to at least one embodiment. In at least one embodiment, PPU 3200 is configured with machine-readable code that, if executed by PPU 3200, causes PPU 3200 to perform some or all of processes and techniques described throughout this disclosure. In at least one embodiment, PPU 3200 is a multi-threaded processor that is implemented on one or more integrated circuit devices and that utilizes multithreading as a latency-hiding technique designed to process computer-readable instructions (also referred to as machine-readable instructions or simply instructions) on multiple threads in parallel. In at least one embodiment, a thread refers to a thread of execution and is an instantiation of a set of instructions configured to be executed by PPU 3200. In at least one embodiment, PPU 3200 is a graphics processing unit ("GPU") configured to implement a graphics rendering pipeline for processing three-dimensional ("3D") graphics data in order to generate two-dimensional ("2D") image data for display on a display device such as a liquid crystal display ("LCD") device. In at least one embodiment, PPU 3200 is utilized to perform computations such as linear algebra operations and machine-learning operations. FIG. 32 illustrates an example parallel processor for illustrative purposes only and should be construed as a non-limiting example of processor architectures contemplated within scope of this disclosure and that any suitable processor may be employed to supplement and/or substitute for same.

In at least one embodiment, one or more PPUs 3200 are configured to accelerate High Performance Computing ("HPC"), data center, and machine learning applications. In at least one embodiment, PPU 3200 is configured to accelerate deep learning systems and applications including following non-limiting examples: autonomous vehicle platforms, deep learning, high-accuracy speech, image, text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and more.

In at least one embodiment, PPU 3200 includes, without limitation, an Input/Output ("I/O") unit 3206, a front-end unit 3210, a scheduler unit 3212, a work distribution unit 3214, a hub 3216, a crossbar ("Xbar") 3220, one or more general processing clusters ("GPCs") 3218, and one or more partition units ("memory partition units") 3222. In at least one embodiment, PPU 3200 is connected to a host processor or other PPUs 3200 via one or more high-speed GPU interconnects ("GPU interconnects") 3208. In at least one embodiment, PPU 3200 is connected to a host processor or other peripheral devices via an interconnect 3202. In at least one embodiment, PPU 3200 is connected to a local memory comprising one or more memory devices ("memory") 3204. In at least one embodiment, memory devices 3204 include, without limitation, one or more dynamic random access memory ("DRAM") devices. In at least one embodiment, one or more DRAM devices are configured and/or configurable as high-bandwidth memory ("HBM") subsystems, with multiple DRAM dies stacked within each device.

In at least one embodiment, high-speed GPU interconnect 3208 may refer to a wire-based multi-lane communications link that is used by systems to scale and include one or more PPUs 3200 combined with one or more central processing units ("CPUs"), supports cache coherence between PPUs 3200 and CPUs, and CPU mastering. In at least one embodiment, data and/or commands are transmitted by high-speed GPU interconnect 3208 through hub 3216 to/from other units of PPU 3200 such as one or more copy engines, video encoders, video decoders, power management units, and other components which may not be explicitly illustrated in FIG. 32.

In at least one embodiment, I/O unit 3206 is configured to transmit and receive communications (e.g., commands, data) from a host processor (not illustrated in FIG. 32) over system bus 3202. In at least one embodiment, I/O unit 3206 communicates with host processor directly via system bus 3202 or through one or more intermediate devices such as a memory bridge. In at least one embodiment, I/O unit 3206 may communicate with one or more other processors, such as one or more of PPUs 3200 via system bus 3202. In at least one embodiment, I/O unit 3206 implements a Peripheral Component Interconnect Express ("PCIe") interface for communications over a PCIe bus. In at least one embodiment, I/O unit 3206 implements interfaces for communicating with external devices.

In at least one embodiment, I/O unit 3206 decodes packets received via system bus 3202. In at least one embodiment, at least some packets represent commands configured to cause PPU 3200 to perform various operations. In at least one embodiment, I/O unit 3206 transmits decoded commands to various other units of PPU 3200 as specified by commands. In at least one embodiment, commands are transmitted to front-end unit 3210 and/or transmitted to hub 3216 or other units of PPU 3200 such as one or more copy engines, a video encoder, a video decoder, a power management unit, etc. (not explicitly illustrated in FIG. 32). In at least one embodiment, I/O unit 3206 is configured to route communications between and among various logical units of PPU 3200.

In at least one embodiment, a program executed by host processor encodes a command stream in a buffer that provides workloads to PPU 3200 for processing. In at least one embodiment, a workload comprises instructions and data to be processed by those instructions. In at least one embodiment, the buffer is a region in a memory that is accessible (e.g., read/write) by both host processor and PPU 3200. A host interface unit may be configured to access buffer in a system memory connected to system bus 3202 via memory requests transmitted over system bus 3202 by I/O unit 3206. In at least one embodiment, host processor writes command stream to buffer and then transmits a pointer to start of command stream to PPU 3200 such that front-end unit 3210 receives pointers to one or more command streams and manages one or more command streams, reading commands from command streams and forwarding commands to various units of PPU 3200.

In at least one embodiment, front-end unit 3210 is coupled to scheduler unit 3212 that configures various GPCs 3218 to process tasks defined by one or more command streams. In at least one embodiment, scheduler unit 3212 is configured to track state information related to various tasks managed by scheduler unit 3212 where state information may indicate which of GPCs 3218 a task is assigned to, whether task is active or inactive, a priority level associated with task, and so forth. In at least one embodiment, scheduler unit 3212 manages execution of a plurality of tasks on one or more of GPCs 3218.

In at least one embodiment, scheduler unit 3212 is coupled to work distribution unit 3214 that is configured to dispatch tasks for execution on GPCs 3218. In at least one embodiment, work distribution unit 3214 tracks a number of scheduled tasks received from scheduler unit 3212 and work distribution unit 3214 manages a pending task pool and an active task pool for each of GPCs 3218. In at least one embodiment, pending task pool comprises a number of slots (e.g., 32 slots) that contain tasks assigned to be processed by a particular GPC 3218; active task pool may comprise a number of slots (e.g., 4 slots) for tasks that are actively being processed by GPCs 3218 such that as one of GPCs 3218 completes execution of a task, that task is evicted from active task pool for GPC 3218 and one of other tasks from pending task pool is selected and scheduled for execution on GPC 3218. In at least one embodiment, if an active task is idle on GPC 3218, such as while waiting for a data dependency to be resolved, then active task is evicted from GPC 3218 and returned to pending task pool while another task in pending task pool is selected and scheduled for execution on GPC 3218.

In at least one embodiment, work distribution unit 3214 communicates with one or more GPCs 3218 via XBar 3220. In at least one embodiment, XBar 3220 is an interconnect network that couples many of units of PPU 3200 to other units of PPU 3200 and can be configured to couple work distribution unit 3214 to a particular GPC 3218. In at least one embodiment, one or more other units of PPU 3200 may also be connected to XBar 3220 via hub 3216.

In at least one embodiment, tasks are managed by scheduler unit 3212 and dispatched to one of GPCs 3218 by work distribution unit 3214. GPC 3218 is configured to process task and generate results. In at least one embodiment, results may be consumed by other tasks within GPC 3218, routed to a different GPC 3218 via XBar 3220, or stored in memory 3204. In at least one embodiment, results can be written to memory 3204 via partition units 3222, which implement a memory interface for reading and writing data to/from memory 3204. In at least one embodiment, results can be transmitted to another PPU 3204 or CPU via high-speed GPU interconnect 3208. In at least one embodiment, PPU 3200 includes, without limitation, a number U of partition units 3222 that is equal to number of separate and distinct memory devices 3204 coupled to PPU 3200. In at least one embodiment, partition unit 3222 will be described in more detail below in conjunction with FIG. 34.

In at least one embodiment, a host processor executes a driver kernel that implements an application programming interface ("API") that enables one or more applications executing on host processor to schedule operations for execution on PPU 3200. In at least one embodiment, multiple compute applications are simultaneously executed by PPU 3200 and PPU 3200 provides isolation, quality of service ("QoS"), and independent address spaces for multiple compute applications. In at least one embodiment, an application generates instructions (e.g., in form of API calls) that cause driver kernel to generate one or more tasks for execution by PPU 3200 and driver kernel outputs tasks to one or more streams being processed by PPU 3200. In at least one embodiment, each task comprises one or more groups of related threads, which may be referred to as a warp. In at least one embodiment, a warp comprises a plurality of related threads (e.g., 32 threads) that can be executed in parallel. In at least one embodiment, cooperating threads can refer to a plurality of threads including instructions to perform task and that exchange data through shared memory. In at least one embodiment, threads and cooperating threads are described in more detail, in accordance with at least one embodiment, in conjunction with FIG. 34.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, deep learning application processor is used to train a machine learning model, such as a neural network, to predict or infer information provided to PPU 3200. In at least one embodiment, deep learning application processor 3200 is used to infer or predict information based on a trained machine learning model (e.g., neural network) that has been trained by another processor or system or by PPU 3200. In at least one embodiment, PPU 3200 may be used to perform one or more neural network use cases described herein.

Figure 33:
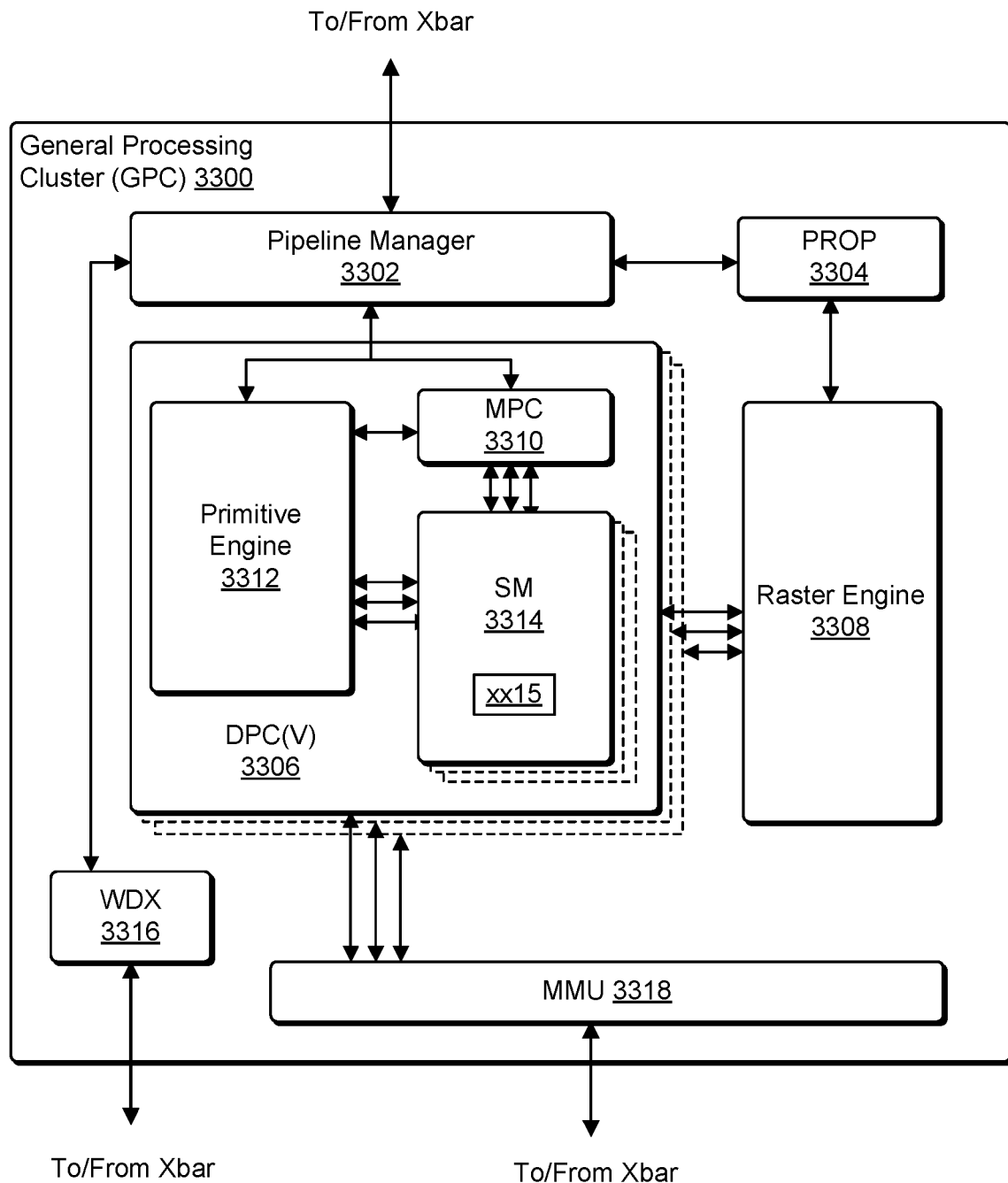
FIG. 33 illustrates a general processing cluster ("GPC"), according to at least one embodiment.

FIG. 33 illustrates a general processing cluster ("GPC") 3300, according to at least one embodiment. In at least one embodiment, GPC 3300 is GPC 3218 of FIG. 32. In at least one embodiment, each GPC 3300 includes, without limitation, a number of hardware units for processing tasks and each GPC 3300 includes, without limitation, a pipeline manager 3302, a pre-raster operations unit ("PROP") 3304, a raster engine 3308, a work distribution crossbar ("WDX") 3316, a memory management unit ("MMU") 3318, one or more Data Processing Clusters ("DPCs") 3306, and any suitable combination of parts.

In at least one embodiment, operation of GPC 3300 is controlled by pipeline manager 3302. In at least one embodiment, pipeline manager 3302 manages configuration of one or more DPCs 3306 for processing tasks allocated to GPC 3300. In at least one embodiment, pipeline manager 3302 configures at least one of one or more DPCs 3306 to implement at least a portion of a graphics rendering pipeline.

In at least one embodiment, DPC 3306 is configured to execute a vertex shader program on a programmable streaming multi-processor ("SM") 3314. In at least one embodiment, pipeline manager 3302 is configured to route packets received from a work distribution unit to appropriate logical units within GPC 3300, in at least one embodiment, and some packets may be routed to fixed function hardware units in PROP 3304 and/or raster engine 3308 while other packets may be routed to DPCs 3306 for processing by a primitive engine 3312 or SM 3314. In at least one embodiment, pipeline manager 3302 configures at least one of DPCs 3306 to implement a neural network model and/or a computing pipeline.

In at least one embodiment, PROP unit 3304 is configured, in at least one embodiment, to route data generated by raster engine 3308 and DPCs 3306 to a Raster Operations ("ROP") unit in partition unit 3222, described in more detail above in conjunction with FIG. 32. In at least one embodiment, PROP unit 3304 is configured to perform optimizations for color blending, organize pixel data, perform address translations, and more. In at least one embodiment, raster engine 3308 includes, without limitation, a number of fixed function hardware units configured to perform various raster operations, in at least one embodiment, and raster engine 3308 includes, without limitation, a setup engine, a coarse raster engine, a culling engine, a clipping engine, a fine raster engine, a tile coalescing engine, and any suitable combination thereof. In at least one embodiment, setup engine receives transformed vertices and generates plane equations associated with geometric primitive defined by vertices; plane equations are transmitted to coarse raster engine to generate coverage information (e.g., an x, y coverage mask for a tile) for primitive; output of coarse raster engine is transmitted to culling engine where fragments associated with primitive that fail a z-test are culled, and transmitted to a clipping engine where fragments lying outside a viewing frustum are clipped. In at least one embodiment, fragments that survive clipping and culling are passed to fine raster engine to generate attributes for pixel fragments based on plane equations generated by setup engine. In at least one embodiment, output of raster engine 3308 comprises fragments to be processed by any suitable entity such as by a fragment shader implemented within DPC 3306.

In at least one embodiment, each DPC 3306 included in GPC 3300 comprise, without limitation, an M-Pipe Controller ("MPC") 3310; primitive engine 3312; one or more SMs 3314; and any suitable combination thereof. In at least one embodiment, MPC 3310 controls operation of DPC 3306, routing packets received from pipeline manager 3302 to appropriate units in DPC 3306. In at least one embodiment, packets associated with a vertex are routed to primitive engine 3312, which is configured to fetch vertex attributes associated with vertex from memory; in contrast, packets associated with a shader program may be transmitted to SM 3314.

In at least one embodiment, SM 3314 comprises, without limitation, a programmable streaming processor that is configured to process tasks represented by a number of threads. In at least one embodiment, SM 3314 is multi-threaded and configured to execute a plurality of threads (e.g., 32 threads) from a particular group of threads concurrently and implements a Single-Instruction, Multiple-Data ("SIMD") architecture where each thread in a group of threads (e.g., a warp) is configured to process a different set of data based on same set of instructions. In at least one embodiment, all threads in group of threads execute same instructions. In at least one embodiment, SM 3314 implements a Single-Instruction, Multiple Thread ("SIMT") architecture wherein each thread in a group of threads is configured to process a different set of data based on same set of instructions, but where individual threads in group of threads are allowed to diverge during execution. In at least one embodiment, a program counter, call stack, and execution state is maintained for each warp, enabling concurrency between warps and serial execution within warps when threads within warp diverge. In another embodiment, a program counter, call stack, and execution state are maintained for each individual thread, enabling equal concurrency between all threads, within and between warps. In at least one embodiment, execution state is maintained for each individual thread and threads executing same instructions may be converged and executed in parallel for better efficiency. At least one embodiment of SM 3314 is described in more detail below.

In at least one embodiment, MMU 3318 provides an interface between GPC 3300 and memory partition unit (e.g., partition unit 3222 of FIG. 32) and MMU 3318 provides translation of virtual addresses into physical addresses, memory protection, and arbitration of memory requests. In at least one embodiment, MMU 3318 provides one or more translation lookaside buffers ("TLBs") for performing translation of virtual addresses into physical addresses in memory.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, deep learning application processor is used to train a machine learning model, such as a neural network, to predict or infer information provided to GPC 3300. In at least one embodiment, GPC 3300 is used to infer or predict information based on a trained machine learning model (e.g., neural network) that has been trained by another processor or system or by GPC 3300. In at least one embodiment, GPC 3300 may be used to perform one or more neural network use cases described herein.

Figure 34:
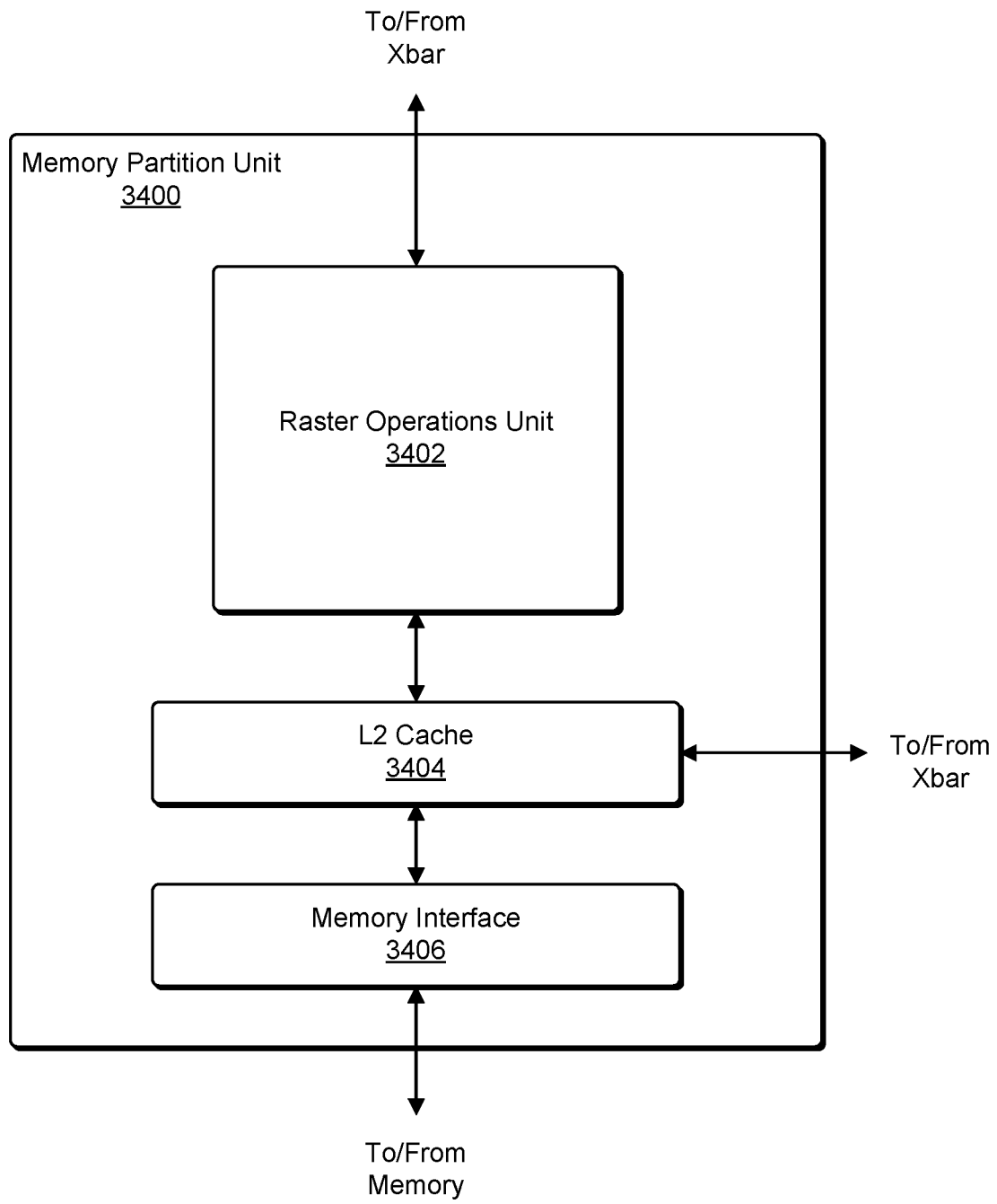
FIG. 34 illustrates a memory partition unit of a parallel processing unit ("PPU"), according to at least one embodiment.

FIG. 34 illustrates a memory partition unit 3400 of a parallel processing unit ("PPU"), in accordance with at least one embodiment. In at least one embodiment, memory partition unit 3400 includes, without limitation, a Raster Operations ("ROP") unit 3402; a level two ("L2") cache 3404; a memory interface 3406; and any suitable combination thereof. Memory interface 3406 is coupled to memory. Memory interface 3406 may implement 32, 64, 128, 1024-bit data buses, or like, for high-speed data transfer. In at least one embodiment, PPU incorporates U memory interfaces 3406, one memory interface 3406 per pair of partition units 3400, where each pair of partition units 3400 is connected to a corresponding memory device. For example, in at least one embodiment, PPU may be connected to up to Y memory devices, such as high bandwidth memory stacks or graphics double-data-rate, version 5, synchronous dynamic random access memory ("GDDR5 SDRAM").

In at least one embodiment, memory interface 3406 implements a high bandwidth memory second generation ("HBM2") memory interface and Y equals half U. In at least one embodiment, HBM2 memory stacks are located on same physical package as PPU, providing substantial power and area savings compared with conventional GDDR5 SDRAM systems. In at least one embodiment, each HBM2 stack includes, without limitation, four memory dies and Y equals 4, with each HBM2 stack including two 128-bit channels per die for a total of 8 channels and a data bus width of 1024 bits. In at least one embodiment, memory supports Single-Error Correcting Double-Error Detecting ("SECDED") Error Correction Code ("ECC") to protect data. ECC provides higher reliability for compute applications that are sensitive to data corruption.

In at least one embodiment, PPU implements a multi-level memory hierarchy. In at least one embodiment, memory partition unit 3400 supports a unified memory to provide a single unified virtual address space for central processing unit ("CPU") and PPU memory, enabling data sharing between virtual memory systems. In at least one embodiment frequency of accesses by a PPU to memory located on other processors is traced to ensure that memory pages are moved to physical memory of PPU that is accessing pages more frequently. In at least one embodiment, high-speed GPU interconnect 3208 supports address translation services allowing PPU to directly access a CPU's page tables and providing full access to CPU memory by PPU.

In at least one embodiment, copy engines transfer data between multiple PPUs or between PPUs and CPUs. In at least one embodiment, copy engines can generate page faults for addresses that are not mapped into page tables and memory partition unit 3400 then services page faults, mapping addresses into page table, after which copy engine performs transfer. In at least one embodiment, memory is pinned (i.e., non-pageable) for multiple copy engine operations between multiple processors, substantially reducing available memory. In at least one embodiment, with hardware page faulting, addresses can be passed to copy engines without regard as to whether memory pages are resident, and copy process is transparent.

Data from memory 3204 of FIG. 32 or other system memory is fetched by memory partition unit 3400 and stored in L2 cache 3404, which is located on-chip and is shared between various GPCs, in accordance with at least one embodiment. Each memory partition unit 3400, in at least one embodiment, includes, without limitation, at least a portion of L2 cache associated with a corresponding memory device. In at least one embodiment, lower level caches are implemented in various units within GPCs. In at least one embodiment, each of SMs 3314 may implement a level one ("L1") cache wherein L1 cache is private memory that is dedicated to a particular SM 3314 and data from L2 cache 3404 is fetched and stored in each of L1 caches for processing in functional units of SMs 3314. In at least one embodiment, L2 cache 3404 is coupled to memory interface 3406 and XBar 3220.

ROP unit 3402 performs graphics raster operations related to pixel color, such as color compression, pixel blending, and more, in at least one embodiment. ROP unit 3402, in at least one embodiment, implements depth testing in conjunction with raster engine 3308, receiving a depth for a sample location associated with a pixel fragment from culling engine of raster engine 3308. In at least one embodiment, depth is tested against a corresponding depth in a depth buffer for a sample location associated with fragment. In at least one embodiment, if fragment passes depth test for sample location, then ROP unit 3402 updates depth buffer and transmits a result of depth test to raster engine 3308. It will be appreciated that number of partition units 3400 may be different than number of GPCs and, therefore, each ROP unit 3402 can, in at least one embodiment, be coupled to each of GPCs. In at least one embodiment, ROP unit 3402 tracks packets received from different GPCs and determines which that a result generated by ROP unit 3402 is routed to through XBar 3220.

Figure 35:
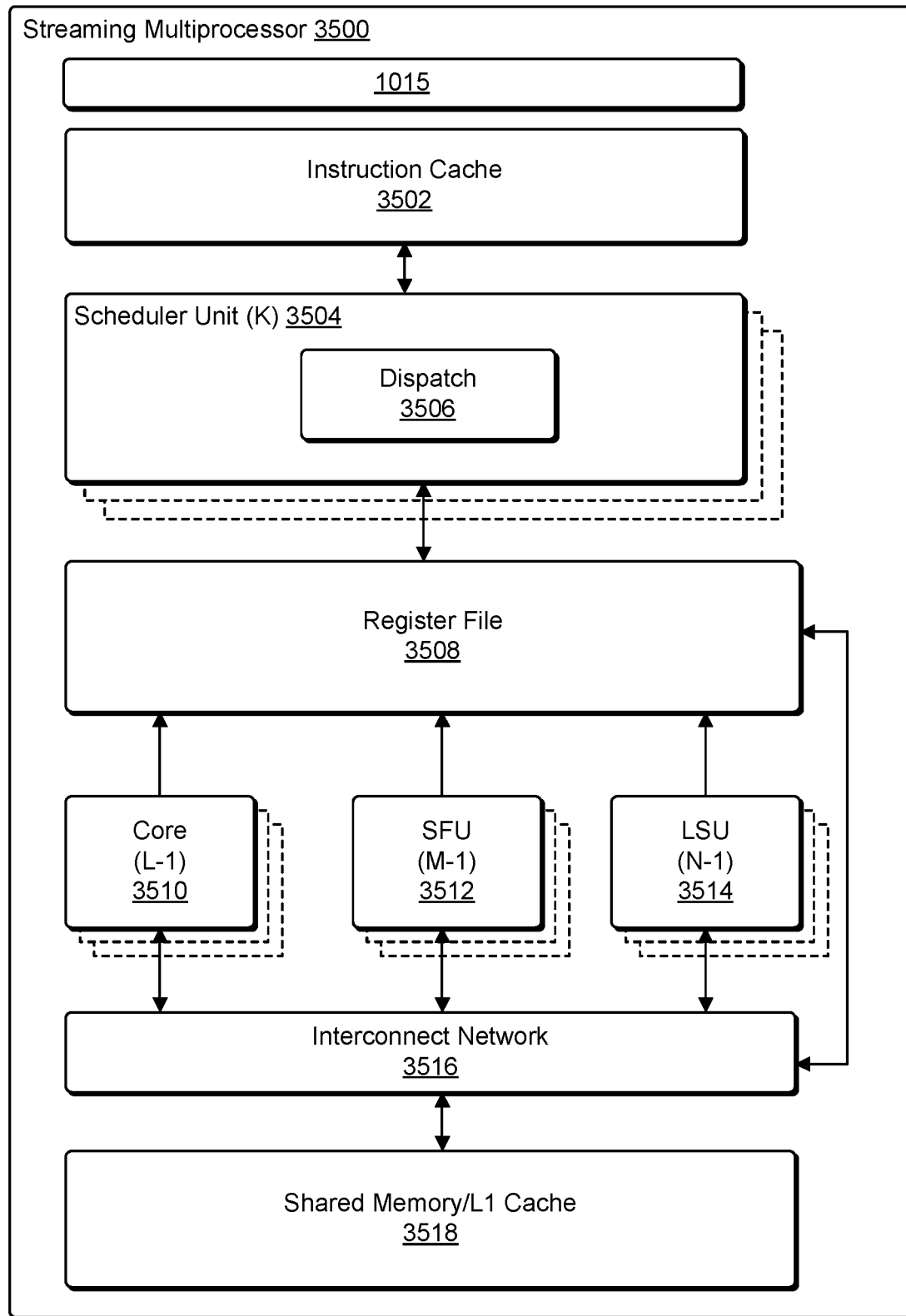
FIG. 35 illustrates a streaming multi-processor, according to at least one embodiment.

FIG. 35 illustrates a streaming multi-processor ("SM") 3500, according to at least one embodiment. In at least one embodiment, SM 3500 is SM of FIG. 33. In at least one embodiment, SM 3500 includes, without limitation, an instruction cache 3502; one or more scheduler units 3504; a register file 3508; one or more processing cores ("cores") 3510; one or more special function units ("SFUs") 3512; one or more load/store units ("LSUs") 3514; an interconnect network 3516; a shared memory/level one ("L1") cache 3518; and any suitable combination thereof. In at least one embodiment, a work distribution unit dispatches tasks for execution on general processing clusters ("GPCs") of parallel processing units ("PPUs") and each task is allocated to a particular Data Processing Cluster ("DPC") within a GPC and, if task is associated with a shader program, task is allocated to one of SMs 3500. In at least one embodiment, scheduler unit 3504 receives tasks from work distribution unit and manages instruction scheduling for one or more thread blocks assigned to SM 3500. In at least one embodiment, scheduler unit 3504 schedules thread blocks for execution as warps of parallel threads, wherein each thread block is allocated at least one warp. In at least one embodiment, each warp executes threads. In at least one embodiment, scheduler unit 3504 manages a plurality of different thread blocks, allocating warps to different thread blocks and then dispatching instructions from plurality of different cooperative groups to various functional units (e.g., processing cores 3510, SFUs 3512, and LSUs 3514) during each clock cycle.

In at least one embodiment, Cooperative Groups may refer to a programming model for organizing groups of communicating threads that allows developers to express granularity at which threads are communicating, enabling expression of richer, more efficient parallel decompositions. In at least one embodiment, cooperative launch APIs support synchronization amongst thread blocks for execution of parallel algorithms. In at least one embodiment, applications of conventional programming models provide a single, simple construct for synchronizing cooperating threads: a barrier across all threads of a thread block (e.g., syncthreads( ) function). However, In at least one embodiment, programmers may define groups of threads at smaller than thread block granularities and synchronize within defined groups to enable greater performance, design flexibility, and software reuse in form of collective group-wide function interfaces. In at least one embodiment, Cooperative Groups enables programmers to define groups of threads explicitly at sub-block (i.e., as small as a single thread) and multi-block granularities, and to perform collective operations such as synchronization on threads in a cooperative group. A programming model supports clean composition across software boundaries, so that libraries and utility functions can synchronize safely within their local context without having to make assumptions about convergence. In at least one embodiment, Cooperative Groups primitives enable new patterns of cooperative parallelism, including, without limitation, producer-consumer parallelism, opportunistic parallelism, and global synchronization across an entire grid of thread blocks.

In at least one embodiment, a dispatch unit 3506 is configured to transmit instructions to one or more of functional units and scheduler unit 3504 includes, without limitation, two dispatch units 3506 that enable two different instructions from same warp to be dispatched during each clock cycle. In at least one embodiment, each scheduler unit 3504 includes a single dispatch unit 3506 or additional dispatch units 3506.

In at least one embodiment, each SM 3500, in at least one embodiment, includes, without limitation, register file 3508 that provides a set of registers for functional units of SM 3500. In at least one embodiment, register file 3508 is divided between each of functional units such that each functional unit is allocated a dedicated portion of register file 3508. In at least one embodiment, register file 3508 is divided between different warps being executed by SM 3500 and register file 3508 provides temporary storage for operands connected to data paths of functional units. In at least one embodiment, each SM 3500 comprises, without limitation, a plurality of L processing cores 3510. In at least one embodiment, SM 3500 includes, without limitation, a large number (e.g., 128 or more) of distinct processing cores 3510. In at least one embodiment, each processing core 3510, in at least one embodiment, includes, without limitation, a fully-pipelined, single-precision, double-precision, and/or mixed precision processing unit that includes, without limitation, a floating point arithmetic logic unit and an integer arithmetic logic unit. In at least one embodiment, floating point arithmetic logic units implement IEEE 754-2008 standard for floating point arithmetic. In at least one embodiment, processing cores 3510 include, without limitation, 64 single-precision (32-bit) floating point cores, 64 integer cores, 32 double-precision (64-bit) floating point cores, and 8 tensor cores.

Tensor cores are configured to perform matrix operations in accordance with at least one embodiment. In at least one embodiment, one or more tensor cores are included in processing cores 3510. In at least one embodiment, tensor cores are configured to perform deep learning matrix arithmetic, such as convolution operations for neural network training and inferencing. In at least one embodiment, each tensor core operates on a 4×4 matrix and performs a matrix multiply and accumulate operation $D=A\times B+C$, where A, B, C, and D are 4×4 matrices.

In at least one embodiment, matrix multiply inputs A and B are 16-bit floating point matrices and accumulation matrices C and D are 16-bit floating point or 32-bit floating point matrices. In at least one embodiment, tensor cores operate on 16-bit floating point input data with 32-bit floating point accumulation. In at least one embodiment, 16-bit floating point multiply uses 64 operations and results in a full precision product that is then accumulated using 32-bit floating point addition with other intermediate products for a 4×4×4 matrix multiply. Tensor cores are used to perform much larger two-dimensional or higher dimensional matrix operations, built up from these smaller elements, in at least one embodiment. In at least one embodiment, an API, such as CUDA 9 C++ API, exposes specialized matrix load, matrix multiply and accumulate, and matrix store operations to efficiently use tensor cores from a CUDA-C++ program. In at least one embodiment, at CUDA level, warp-level interface assumes 16×16 size matrices spanning all 32 threads of warp.

In at least one embodiment, each SM 3500 comprises, without limitation, M SFUs 3512 that perform special functions (e.g., attribute evaluation, reciprocal square root, and like). In at least one embodiment, SFUs 3512 include, without limitation, a tree traversal unit configured to traverse a hierarchical tree data structure. In at least one embodiment, SFUs 3512 include, without limitation, a texture unit configured to perform texture map filtering operations. In at least one embodiment, texture units are configured to load texture maps (e.g., a 2D array of texels) from memory and sample texture maps to produce sampled texture values for use in shader programs executed by SM 3500. In at least one embodiment, texture maps are stored in shared memory/L1 cache 3518. In at least one embodiment, texture units implement texture operations such as filtering operations using mip-maps (e.g., texture maps of varying levels of detail), in accordance with at least one embodiment. In at least one embodiment, each SM 3500 includes, without limitation, two texture units.

Each SM 3500 comprises, without limitation, N LSUs 3514 that implement load and store operations between shared memory/L1 cache 3518 and register file 3508, in at least one embodiment. Each SM 3500 includes, without limitation, interconnect network 3516 that connects each of functional units to register file 3508 and LSU 3514 to register file 3508 and shared memory/L1 cache 3518 in at least one embodiment. In at least one embodiment, interconnect network 3516 is a crossbar that can be configured to connect any of functional units to any of registers in register file 3508 and connect LSUs 3514 to register file 3508 and memory locations in shared memory/L1 cache 3518.

In at least one embodiment, shared memory/L1 cache 3518 is an array of on-chip memory that allows for data storage and communication between SM 3500 and primitive engine and between threads in SM 3500, in at least one embodiment. In at least one embodiment, shared memory/L1 cache 3518 comprises, without limitation, 128 KB of storage capacity and is in path from SM 3500 to partition unit. In at least one embodiment, shared memory/L1 cache 3518, in at least one embodiment, is used to cache reads and writes. In at least one embodiment, one or more of shared memory/L1 cache 3518, L2 cache, and memory are backing stores.

Combining data cache and shared memory functionality into a single memory block provides improved performance for both types of memory accesses, in at least one embodiment. In at least one embodiment, capacity is used or is usable as a cache by programs that do not use shared memory, such as if shared memory is configured to use half of capacity, texture and load/store operations can use remaining capacity. Integration within shared memory/L1 cache 3518 enables shared memory/L1 cache 3518 to function as a high-throughput conduit for streaming data while simultaneously providing high-bandwidth and low-latency access to frequently reused data, in accordance with at least one embodiment. In at least one embodiment, when configured for general purpose parallel computation, a simpler configuration can be used compared with graphics processing. In at least one embodiment, fixed function graphics processing units are bypassed, creating a much simpler programming model. In general purpose parallel computation configuration, work distribution unit assigns and distributes blocks of threads directly to DPCs, in at least one embodiment. In at least one embodiment, threads in a block execute same program, using a unique thread ID in calculation to ensure each thread generates unique results, using SM 3500 to execute program and perform calculations, shared memory/L1 cache 3518 to communicate between threads, and LSU 3514 to read and write global memory through shared memory/L1 cache 3518 and memory partition unit. In at least one embodiment, when configured for general purpose parallel computation, SM 3500 writes commands that scheduler unit 3504 can use to launch new work on DPCs.

In at least one embodiment, PPU is included in or coupled to a desktop computer, a laptop computer, a tablet computer, servers, supercomputers, a smart-phone (e.g., a wireless, hand-held device), personal digital assistant ("PDA"), a digital camera, a vehicle, a head mounted display, a handheld electronic device, and more. In at least one embodiment, PPU is embodied on a single semiconductor substrate. In at least one embodiment, PPU is included in a system-on-a-chip ("SoC") along with one or more other devices such as additional PPUs, memory, a reduced instruction set computer ("RISC") CPU, a memory management unit ("MMU"), a digital-to-analog converter ("DAC"), and like.

In at least one embodiment, PPU may be included on a graphics card that includes one or more memory devices. A graphics card may be configured to interface with a PCIe slot on a motherboard of a desktop computer. In at least one embodiment, PPU may be an integrated graphics processing unit ("iGPU") included in chipset of motherboard.

Inference and/or training logic 1015 are used to perform inferencing and/or training operations associated with one or more embodiments. Details regarding inference and/or training logic 1015 are provided below in conjunction with FIGS. 10A and/or 10B. In at least one embodiment, deep learning application processor is used to train a machine learning model, such as a neural network, to predict or infer information provided to SM 3500. In at least one embodiment, SM 3500 is used to infer or predict information based on a trained machine learning model (e.g., neural network) that has been trained by another processor or system or by SM 3500. In at least one embodiment, SM 3500 may be used to perform one or more neural network use cases described herein.

In at least one embodiment, a single semiconductor platform may refer to a sole unitary semiconductor-based integrated circuit or chip. In at least one embodiment, multi-chip modules may be used with increased connectivity which simulate on-chip operation, and make substantial improvements over utilizing a conventional central processing unit ("CPU") and bus implementation. In at least one embodiment, various modules may also be situated separately or in various combinations of semiconductor platforms per desires of user.

In at least one embodiment, computer programs in form of machine-readable executable code or computer control logic algorithms are stored in main memory 1604 and/or secondary storage. Computer programs, if executed by one or more processors, enable system 1600 to perform various functions in accordance with at least one embodiment. Memory 1604, storage, and/or any other storage are possible examples of computer-readable media. In at least one embodiment, secondary storage may refer to any suitable storage device or system such as a hard disk drive and/or a removable storage drive, representing a floppy disk drive, a magnetic tape drive, a compact disk drive, digital versatile disk ("DVD") drive, recording device, universal serial bus ("USB") flash memory, etc. In at least one embodiment, architecture and/or functionality of various previous figures are implemented in context of CPU 1602; parallel processing system 1612; an integrated circuit capable of at least a portion of capabilities of both CPU 1602; parallel processing system 1612; a chipset (e.g., a group of integrated circuits designed to work and sold as a unit for performing related functions, etc.); and any suitable combination of integrated circuit(s).

In at least one embodiment, architecture and/or functionality of various previous figures are implemented in context of a general computer system, a circuit board system, a game console system dedicated for entertainment purposes, an application-specific system, and more. In at least one embodiment, computer system 1600 may take form of a desktop computer, a laptop computer, a tablet computer, servers, supercomputers, a smart-phone (e.g., a wireless, hand-held device), personal digital assistant ("PDA"), a digital camera, a vehicle, a head mounted display, a hand-held electronic device, a mobile phone device, a television, workstation, game consoles, embedded system, and/or any other type of logic.

In at least one embodiment, parallel processing system 1612 includes, without limitation, a plurality of parallel processing units ("PPUs") 1614 and associated memories 1616. In at least one embodiment, PPUs 1614 are connected to a host processor or other peripheral devices via an interconnect 1618 and a switch 1620 or multiplexer. In at least one embodiment, parallel processing system 1612 distributes computational tasks across PPUs 1614 which can be parallelizable. For example, as part of distribution of computational tasks across multiple graphics processing unit ("GPU") thread blocks. In at least one embodiment, memory is shared and accessible (e.g., for read and/or write access) across some or all of PPUs 1614, although such shared memory may incur performance penalties relative to use of local memory and registers resident to a PPU 1614. In at least one embodiment, operation of PPUs 1614 is synchronized through use of a command such as syncthreads( ), wherein all threads in a block (e.g., executed across multiple PPUs 1614) to reach a certain point of execution of code before procoding.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context. Terms "comprising," "having," "including," and "containing" are to be construed as open-ended terms (meaning "including, but not limited to,") unless otherwise noted. term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). The number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors. For example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. The terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. process of obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or inter-process communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. One or more processors, comprising:
    circuitry to use one or more neural networks to determine a location of one or more unlabeled versions of one or more objects depicted within two or more first frames of a video based, at least in part, on motion of one or more labeled versions of the one or more objects depicted within one or more second frames of the video, wherein the two or more first frames comprise a larger subset of frames of the video than the one or more second frames.

2. The one or more processors of claim 1, wherein the circuitry is further configured to:
    apply one or more decay parameters to prior state information maintained for the one or more neural networks and used for identifying the one or more objects, a weighting of the prior state information being reduced according to the one or more decay parameters.

3. The one or more processors of claim 2, wherein the circuitry is further configured to:
    store the prior state information external to the one or more neural networks and provide the prior state information to the one or more neural networks for each set of input to the one or more neural networks.

4. The one or more processors processer of claim 2, wherein the circuitry is further configured to:
    obtain a continuous stream of video data; and
    provide individual frames of the video data to the one or more neural networks for use in identifying one or more digital representations and updating the prior state information.

5. The one or more processors of claim 1, wherein the circuitry is further configured to:
    determine one or more decay parameters using a hyper-optimization process and a selected decay function.

6. The one or more processors of claim 1, wherein the one or more neural networks are trained using sequences of sparse video data, individual sequences including at least one labeled version of the one or more objects depicted within the one or more second frames of the video, and wherein the one or more second frames of the video are used to simulate state information and the two or more first frames of the video are used to update the state information and identify one or more digital representations of the one or more objects represented in the individual sequence.

7. The one or more processors of claim 1, wherein the one or more neural networks include at least one recurrent neural network (RNN) and one or more decay parameters are determined according to an exponential decay function.

8. A system comprising:
    one or more processors to be configured to use one or more neural networks to determine a location of one or more unlabeled versions of one or more objects depicted within two or more first frames of a video based, at least in part, on motion of one or more labeled versions of the one or more objects depicted within one or more second frames of the video, wherein the two or more first frames comprise a larger subset of frames of the video than the one or more second frames; and
    one or more memories to store the one or more neural networks for determining the location.

9. The system of claim 8, wherein the one or more processors are further to be configured to:
    apply one or more decay parameters to prior state information maintained for the one or more neural networks and used for identifying one or more digital representations, a weighting of the prior state information being reduced according to the one or more decay parameters.

10. The system of claim 9, wherein the one or more processors are further to be configured to:
    store the prior state information external to the one or more neural networks and provide the prior state information to the one or more neural networks for each set of input to the one or more neural networks.

11. The system of claim 9, wherein the one or more processors are further to be configured to:
    obtain a continuous stream of video data; and
    provide individual frames of the video data to the one or more neural networks for use in identifying the one or more digital representations and updating the prior state information.

12. The system of claim 8, wherein the one or more processors are further to be configured to:
    determine one or more decay parameters using a hyper-optimization process and a selected decay function.

13. The system of claim 8, wherein the one or more neural networks are trained using sequences of sparse video data, individual sequences including at least one labeled version of the one or more objects depicted within one of the one or more second frames of the video, and wherein the one or more second frames of the video are used to simulate state information and the two or more first frames of the video are used to update the state information and identify one or more digital representations of the one or more objects represented in the individual sequence.

14. The system of claim 8, wherein the one or more neural networks include at least one recurrent neural network (RNN) and one or more decay parameters are determined according to an exponential decay function.

15. One or more processors, comprising:
    circuitry to use one or more neural networks to determine a location of one or more digital representations of one or more objects depicted within two or more first frames of a video based, at least in part, on motion of one or more labeled versions of the one or more digital representations of the one or more objects depicted within one or more second frames of the video, wherein the two or more first frames comprise a larger subset of frames of the video than the one or more second frames.

16. The one or more processors of claim 15, wherein the circuitry is further to be configured to:
    apply one or more decay parameters to prior state information maintained for the one or more neural networks and used for identifying the one or more digital representations, a weighting of the prior state information being reduced according to the one or more decay parameters.

17. The one or more processors of claim 16, wherein the circuitry is further to be configured to:
store the prior state information external to the one or more neural networks and provide the prior state information to the one or more neural networks for each set of input to the one or more neural networks.

18. The one or more processors of claim 16, wherein the circuitry is further to be configured to:
obtain a continuous stream of video data; and
provide individual frames of the video data to the one or more neural networks for use in identifying the one or more digital representations and updating the prior state information.

19. The one or more processors of claim 15, wherein the circuitry is further to be configured to:
determine one or more decay parameters using a hyper-optimization process and a selected decay function.

20. The one or more processors of claim 15, wherein the one or more neural networks are trained using sequences of sparse video data, individual sequences including at least one labeled version of the one or more objects depicted within one of the one or more second frames of the video, and wherein the one or more second frames of the video are used to simulate state information and the two or more first frames of the video are used to update the state information and identify one or more digital representations of the one or more objects represented in the individual sequence.

21. The one or more processors of claim 15, wherein the one or more neural networks include at least one recurrent neural network (RNN) and one or more decay parameters are determined according to an exponential decay function.

22. A system, comprising:
one or more processors to calculate parameters corresponding to one or more neural networks to determine a location of one or more unlabeled versions of one or more objects depicted within two or more first frames of a video based, at least in part, on motion of one or more labeled versions of the one or more objects depicted within one or more second frames of the video, wherein the two or more first frames comprise a larger subset of frames of the video than the one or more second frames; and
one or more memories to store the parameters.

23. The system of claim 22, wherein the one or more processors are further to be configured to:
apply one or more decay parameters to prior state information maintained for the one or more neural networks, a weighting of the prior state information being reduced according to the one or more decay parameters.

24. The system of claim 23, wherein the one or more processors are further to be configured to:
store the prior state information external to the one or more neural networks and provide the prior state information to the one or more neural networks for each set of input to the one or more neural networks.

25. The system of claim 23, wherein the one or more processors are further to be configured to:
obtain a continuous stream of video data; and
provide individual frames of the video data to the one or more neural networks for
use in identifying one or more digital representations of the one or more objects, as well as for use in updating the prior state information.

26. The system of claim 22, wherein the one or more processors are further to be configured to:
determine one or more decay parameters using a hyper-optimization process and a selected decay function.

27. The system of claim 22, wherein the one or more neural networks are trained using sequences of sparse video data, individual sequences including at least one labeled version of the one or more objects depicted within one of the one or more second frames of the video, and wherein the one or more second frames of the video are used to simulate state information and the two or more first frames of the video are used to update the state information and identify one or more digital representations of the one or more objects represented in the individual sequence.

28. The system of claim 22, wherein the one or more neural networks include at least one recurrent neural network (RNN) and one or more decay parameters are determined according to an exponential decay function.

29. A vehicle, comprising:
a camera;
a drive assembly configured to maneuver the vehicle; and
a navigation system configured to provide navigation instructions to the drive
assembly, the navigation system providing video data captured by the camera to a one or more processors, comprising circuitry to use one or more neural networks to determine a location of one or more unlabeled versions of one or more digital representations of one or more objects depicted within two or more first frames of a video based, at least in part, on motion of one or more labeled versions of the one or more digital representations of the one or more objects depicted within one or more second frames of the video, wherein the two or more first frames comprise a larger subset of frames of the video than the one or more second frames.

30. The vehicle of claim 29, wherein the one or more processors of the navigation system are further to be configured to:
apply one or more decay parameters to prior state information maintained for the one or more neural networks and used for identifying the one or more digital representations, a weighting of the prior state information being reduced according to the one or more decay parameters.

31. The vehicle of claim 30, wherein the one or more processors of the navigation system are further to be configured to:
store the prior state information external to the one or more neural networks and provide the prior state information to the one or more neural networks for each set of input to the one or more neural networks.

32. The vehicle of claim 30, wherein the one or more processors of the navigation system are further to be configured to:
obtain a continuous stream of video data; and
provide individual frames of the video data to the one or more neural networks for use in identifying the one or more digital representations and updating the prior state information.

33. The vehicle of claim 29, wherein the one or more processors of the navigation system are further to be configured to:
determine one or more decay parameters using a hyper-optimization process and a selected decay function.

34. The vehicle of claim 29, wherein the one or more neural networks are trained using sequences of sparse video data, individual sequences including at least one labeled version of the one or more objects depicted within one of the one or more second frames of the video, and wherein the one or more second frames of the video are used to simulate state information and the two or more first frames of the video are used to update the state information and identify one or more digital representations of the one or more objects represented in the individual sequence.

35. The vehicle of claim 29, wherein the one or more neural networks include at least one recurrent neural network (RNN) and one or more decay parameters are determined according to an exponential decay function.

* * * * *